United States Patent
Luo et al.

(10) Patent No.: US 12,432,295 B2
(45) Date of Patent: Sep. 30, 2025

(54) METHOD, ELECTRONIC DEVICE, AND SYSTEM FOR CREATING APPLICATION SHORTCUT

(71) Applicant: HUAWEI TECHNOLOGIES CO., LTD., Guangdong (CN)

(72) Inventors: Puliang Luo, Wuhan (CN); Meng Yan, Wuhan (CN); Haiyang Shan, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/907,098

(22) PCT Filed: Mar. 4, 2021

(86) PCT No.: PCT/CN2021/079079
§ 371 (c)(1),
(2) Date: Sep. 23, 2022

(87) PCT Pub. No.: WO2021/196970
PCT Pub. Date: Oct. 7, 2021

(65) Prior Publication Data
US 2024/0295945 A1    Sep. 5, 2024

(30) Foreign Application Priority Data
Mar. 31, 2020    (CN) .......................... 202010247758.0

(51) Int. Cl.
*G06F 3/04817*    (2022.01)
*G06F 3/0486*    (2013.01)
*H04M 1/72409*    (2021.01)

(52) U.S. Cl.
CPC .... *H04M 1/72409* (2021.01); *G06F 3/04817* (2013.01); *G06F 3/0486* (2013.01)

(58) Field of Classification Search
CPC .............. G06F 3/04817; G06F 3/0486; H04M 1/72409
(Continued)

(56) References Cited

U.S. PATENT DOCUMENTS 5,835,721 A * 11/1998 Donahue ............. H04L 43/0811
709/227
10,747,832 B2 * 8/2020 Hashimoto ........... G06F 16/248
(Continued)

FOREIGN PATENT DOCUMENTS

CN    104536802 A    4/2015
CN    105335176 A    2/2016
(Continued)

OTHER PUBLICATIONS

Samsung flow-Easily connect PC and Android, URL:https://zhuanlan.zhihu.com/p/88172164, Nov. 22, 2019, with the English Translaion, 34 pages.
(Continued)

*Primary Examiner* — Rinna Yi

(57) ABSTRACT

Embodiments of the present disclosure disclose a method for creating an application shortcut, an electronic device, and a system, to resolve a problem of creating an application shortcut in a user interface of a host operating system for an application program in a guest operating system. The system provided in embodiments may include: an application information encapsulating module, an application information sending module, an application information parsing module, an application shortcut creating module, a virtual application process module, an application program startup processing module, an application program display module, and an application window mirror display module.

15 Claims, 29 Drawing Sheets

TO
FIG. 3B

(58) Field of Classification Search
USPC .......................................................... 715/835
See application file for complete search history.

(56) References Cited

U.S. PATENT DOCUMENTS

| | | | | |
|---|---|---|---|---|
| 2007/0101297 | A1* | 5/2007 | Forstall | ................. G06F 3/0482 |
| | | | | 715/835 |
| 2011/0209064 | A1 | 8/2011 | Jorgensen et al. | |
| 2012/0260288 | A1* | 10/2012 | Fujiki | ................. G06F 3/04842 |
| | | | | 725/39 |
| 2014/0195926 | A1* | 7/2014 | Hussain | .............. G06F 3/04886 |
| | | | | 715/750 |
| 2014/0203999 | A1* | 7/2014 | Shim | ....................... G06F 9/451 |
| | | | | 345/2.2 |
| 2015/0009152 | A1 | 1/2015 | Tang et al. | |
| 2015/0020013 | A1* | 1/2015 | Kim | ..................... G06F 3/0488 |
| | | | | 715/769 |
| 2016/0191621 | A1* | 6/2016 | Oh | ..................... H04L 67/1095 |
| | | | | 709/205 |
| 2017/0109119 | A1* | 4/2017 | Park | ........................ G09G 5/14 |
| 2018/0232195 | A1* | 8/2018 | Jaegal | ................. G06F 3/04845 |
| 2018/0246634 | A1 | 8/2018 | Suh et al. | |
| 2018/0373394 | A1* | 12/2018 | Wilson | ................. G06F 3/0481 |

FOREIGN PATENT DOCUMENTS

| | | |
|---|---|---|
| CN | 106055327 A | 10/2016 |
| CN | 108781235 A | 11/2018 |
| CN | 110069184 A | 7/2019 |
| IN | 109739450 A | 5/2019 |
| IN | 110417992 A | 11/2019 |
| KR | 20180099352 A | 9/2018 |

OTHER PUBLICATIONS

Use the relay to continue working on other devices, URL:https://support.apple.com/zh-tw/HT209455, https://support.apple.com/zh-tw/HT209455, Dec. 2, 2022, with the English Translaion, 6 pages.

Samsung Flow App, URL:https://www.samsung.com/us/support/owners/app/samsung-flow, Copyright 1995-2023 Samsung All Rights Reserved, 4 pages.

* cited by examiner

METHOD, ELECTRONIC DEVICE, AND SYSTEM FOR CREATING APPLICATION SHORTCUT

CROSS-REFERENCE TO RELATED APPLICATIONS

This application is a national stage of International Application No. PCT/CN2021/079079, filed on Mar. 4, 2021, which claims priority to Chinese Patent Application No. 202010247758.0, filed on Mar. 31, 2020. Both of the aforementioned applications are hereby incorporated by reference in their entireties.

TECHNICAL FIELD

This application relates to the field of computer software, and in particular, to a method, an electronic device, and a system for creating an application shortcut across operating systems.

BACKGROUND

Currently, in the market, mainstream desktop operating systems include Windows®, Linux®, and macOS®, and mainstream mobile operating systems include iOS® and Android®. An application shortcut is a method provided by an operating system to quickly start a program or open a file or a folder, which is a quick connection to an application program. The application shortcut may be created when the application program is installed. A manner in which a user starts an application program varies with different operating systems. For example, in the Windows® operating system, the user may quickly start an application program by double-clicking an application icon on a desktop. On the desktop of the Windows® operating system, the application icon refers to a display icon of an application shortcut. Generally, on the desktop, a small arrow pointing to the upper right is displayed at a lower left corner of the application icon, to indicate that the icon is an application shortcut. In addition, the user may alternatively quickly start an application program by single-clicking an application icon in a start menu and a quick launch bar. In other operating systems, there are application shortcuts as well. In the macOS® operating systems, an application shortcut may also be referred to as an alias. In the macOS® operating systems, an application program may be started by double-clicking an application icon on a desktop, single-clicking an application icon in a dock bar, single-clicking an application icon on a launchpad (launchpad), or in another manner. In the Linux® operating system, an application shortcut may also be referred to as a soft link. On a mobile phone end, for example, in the Android R or iOS® operating system, the user may quickly start an application program by single-tapping an application icon on a mobile phone desktop.

Because running mechanisms of an application program in different operating systems are different from each other, there are barriers in communication and interaction between different operating systems, and it is difficult to implement simple and effective coordination and interface convergence in many aspects. Therefore, generally, an application program in an operating system A cannot be directly installed or run in an operating system B. For example, an application program in the Android® operating system cannot be directly installed or run in the Windows® operating system.

If the application program in the Android® operating system is expected to be installed and run in the Windows® operating system, an "emulation" or "virtual" manner, for example, a technology such as an Android® emulator (Android® Emulator) or a virtual machine, may be used for implementation. For example, the user may first start an Android® emulator in the Windows® operating system, to run an Android® subsystem, and then start the corresponding application program from the Android® subsystem. For another example, the user may connect a mobile phone to a computer, and operate and display a mobile phone application program on the computer. However, generally, in the Android® emulator/virtual machine/mobile phone operation interface, the user may start an application program by single-clicking an application icon, while on the Windows® desktop, the user starts an application program by double-clicking an application shortcut. This may cause the user to feel confused about experience of using the application shortcut clicking manners (single-clicking/double-clicking).

SUMMARY

This application provides a method, an electronic device, and a system for creating an application shortcut, to resolve a problem of creating an application shortcut in a user interface of a host operating system for an application program in a guest operating system and starting the application program in the guest operating system by using the application shortcut in the host operating system.

The foregoing and other objectives are achieved by features in independent claims. Further implementations are embodied in dependent claims, the specification, and drawings.

According to a first aspect, an embodiment of the present disclosure provides a method for creating an application shortcut. The method includes: A first electronic device establishes a first connection to a second electronic device. The first electronic device displays a first user interface. The first user interface includes a first display area, and display content in the first display area is the same as display content on a display screen of the second electronic device. The second electronic device obtains first application information of a first application program. The first application program is installed on the second electronic device, and the first application information may include one or more of the following items: an application package name, an application icon, or an application name. Then, the second electronic device sends the first application information to the first electronic device through the first connection. The first electronic device creates a first application shortcut based on the first application information. The first application shortcut is an application shortcut corresponding to the first application program, the first application shortcut is displayed in a second display area of the first user interface, and the second display area is a display area different from the first display area.

By implementing the method in the first aspect, the first electronic device may create the first application shortcut, and when the first electronic device detects that the first application shortcut is opened in an interaction operation manner of the first electronic device, the first electronic device sends a startup instruction to the second electronic device, and the second electronic device may start the first application program that is installed on the second electronic device and that corresponds to the first application shortcut. For example, in an example, in a Windows® operating system of the first electronic device, a user needs to open an application shortcut by double-clicking an application icon, while in an Android® operating system of the second electronic device, the user needs to open an application shortcut by single-tapping an application icon. According to the method in the first aspect, the first application shortcut pointing to the first application program installed on the second electronic device is generated on the first electronic device, and when the first application shortcut in the first user interface of the first electronic device is opened in a double-clicking manner, the first application program on the second electronic device is started.

With reference to the first aspect, in some embodiments, the method may further include: The first electronic device detects, in the first user interface, a first user operation that acts on the first application shortcut. Then, the first electronic device sends a first instruction to the second electronic device through the first connection. The first instruction is used to trigger the second electronic device to start the first application program. In addition, the first electronic device receives, through the first connection, first data sent from the second electronic device. The first data is used to indicate a user interface of the first application program. The first electronic device displays the user interface of the first application program in the first display area based on the first data. The user interface of the first application program is also displayed on the display screen of the second electronic device.

With reference to the first aspect, in some embodiments, the method further includes: The first electronic device detects a second user operation of dragging the application icon of the first application program displayed in the first display area to the second display area. Then, the first electronic device sends a request for obtaining the first application information to the second electronic device through the first connection in response to the second user operation. For example, in an example, the second user operation may be that the user drags the application icon in a mirror user interface of the second electronic device, that is, the first display area, to an edge of the first display area. In this case, an information receiving process is triggered. The process may use a virtual application process supporting running of the mirror user interface to send synchronization information to the Windows® operating system of the first electronic device. The synchronization information may include: coordinate information of the application icon departing from the edge of the mirror user interface, and application information such as the application package name and application icon data. Then, after the Windows® operating system receives the synchronization information, coordinate position information of a junction with the mirror user interface on a Windows® desktop side is calculated based on the coordinate information and a relative position of the mirror user interface on a Windows® desktop. The coordinate position is defined as a departure position. Then, the first electronic device draws and displays the dragged application icon from the departure position, and then dynamically draws and displays the application icon based on a position of a mouse pointer and a moving track of the mouse pointer, to form a display effect of a dragging animation. When the user drags the application icon to a position on the Windows® desktop and releases the mouse pointer, the first electronic device sends the request for obtaining the first application information to the second electronic device through the first connection. Then, the first electronic device creates and generates, on the Windows® desktop based on the first application information, the application shortcut corresponding to the application icon. The application shortcut may be opened by double-clicking. The second user operation is not limited to the dragging operation, and may alternatively be another user operation manner, such as a voice command or a gesture operation.

With reference to the first aspect, in some embodiments, the method further includes: The first electronic device detects a third user operation of dragging the application icon of the first application program displayed in the first display area to a first area in the first display area. Then, the first electronic device sends a request for obtaining the first application information to the second electronic device through the first connection in response to the third user operation. In an example, the user may drag the application icon in the mirror user interface to the first area in the first display area, and then release the mouse. The first area herein may be a hot area. The dragging operation may be referred to as a third user operation. The third user operation is not limited to the dragging operation, and may alternatively be a voice command, a gesture operation, or the like. In response to the third user operation, a pop-up box may appear in the mirror user interface, asking the user whether it is necessary to create an application shortcut for a selected application program. After the user selects "yes", the first electronic device sends the request for obtaining the first application information to the second electronic device through the first connection. Then, the first electronic device creates and generates, on the desktop of the first electronic device based on the first application information, the application shortcut corresponding to the application icon. The application shortcut may be opened by double-clicking.

With reference to the first aspect, in some embodiments, the second electronic device detects a fourth user operation of dragging the application icon of the first application program displayed on the display screen of the second electronic device to a second area on the display screen of the second electronic device. Then, the second electronic device sends the first application information to the first electronic device through the first connection in response to the fourth user operation. For example, in an example, the user may drag the application icon on the second electronic device to the second area by a finger on a second electronic device side, and then release pressing of the finger. The second area may be a hot area. The dragging operation may be referred to as a fourth user operation. The fourth user operation is not limited to the dragging operation, and may alternatively be another user operation manner, such as a voice command or a gesture operation. In response to the fourth user operation, a pop-up box may appear on a desktop of the second electronic device, asking the user whether it is necessary to create an application shortcut for a selected application program. After the user selects "yes", the second electronic device may send the first application information corresponding to the application program to the first electronic device. Then, the first electronic device creates and generates, on the desktop of the first electronic device based on the first application information, the application shortcut corresponding to the application icon. The application shortcut may be opened by double-clicking.

With reference to the first aspect, in some embodiments, the method may further include: The first electronic device displays a first list. Indication information of one or more first application programs is displayed in the first list. The first electronic device detects, in the first list, a fifth user operation of selecting indication information of the first application program. Then, the first electronic device sends a request for obtaining the first application information to the second electronic device through the first connection in response to the fifth user operation. The first application information is application information of the first application program indicated by the indication information, selected by the fifth user operation, of the first application program. In an example, in this application, auxiliary management software "mobile phone assistant" may be used to manage and select an Android® application shortcut that needs to be created on the Windows® desktop. A management interface of the application program "mobile phone assistant" is displayed on the first electronic device, and the management interface of the "mobile phone assistant" may include such a window in which the user may autonomously select an application program for which an application shortcut needs to be created. The selection operation of the user may be referred to as a fifth user operation. When the management interface of the application program "mobile phone assistant" is displayed on the first electronic device, the fifth user operation may occur on the first electronic device. The management interface of the "mobile phone assistant" may include a selection bar of application programs, which is also referred to as a first list, and displays icons and names that correspond to the application programs, to facilitate identification and differentiation of the user. Correspondingly, there are check boxes on the right of the icons and the names of the application programs. The check boxes are options for the user to select a plurality of items, and the user may select one or more of the options. The check boxes are on-off options. When a check box is selected, an identification block "☐" of the check box is marked with "√". When the identification block displayed with the mark "√" is single-clicked, this option is canceled. In addition, an "all" check box may be further set. When the "all" check box is selected, all the options are selected. There may be a scrollbar on a right side of the window of the selection bar, and an option that is not displayed in the current window may be viewed by pulling down or pulling up the scrollbar. Buttons such as "ok" and "cancel" are set in a lower part of the window of the selection bar, and the buttons may be single-clicked to perform related operations. A setting in the selection bar may be made effective by single-clicking the "ok" button, and the setting may be canceled by single-clicking the "cancel" button. In the dialog box that is in the management interface of the "mobile phone assistant" and that is configured to create a desktop application shortcut, after a corresponding option for which an application shortcut needs to be created is selected, the "ok" button is clicked to generate, on the Windows® desktop, an application shortcut corresponding to an Android® application program. The application shortcut newly generated on the Windows® desktop of the first electronic device may be opened by mouse double-clicking, to start a corresponding application program in the Android® operating system of the second electronic device.

With reference to the first aspect, in some embodiments, the method may further include: The second electronic device displays a first list. Indication information of one or more first application programs is displayed in the first list. The second electronic device detects, in the first list, a fifth user operation of selecting indication information of the first application program. Then, the second electronic device sends the first application information and a request for creating the first application shortcut to the first electronic device through the first connection in response to the fifth user operation. The first application information is application information of the first application program indicated by the indication information, selected by the fifth user operation, of the first application program. In an example, in this application, auxiliary management software "mobile phone assistant" may be used to manage and select an Android® application shortcut that needs to be created on the Windows® desktop. A management interface of the application program "mobile phone assistant" is displayed on the second electronic device, and the management interface of the "mobile phone assistant" may include such a window in which the user may autonomously select an application program for which an application shortcut needs to be created. When the management interface of the application program "mobile phone assistant" is displayed on the second electronic device, the user operation may occur on the second electronic device. The management interface of the "mobile phone assistant" may include a selection bar of application programs, which is also referred to as a first list, and displays icons and names that correspond to the application programs, to facilitate identification and differentiation of the user. Correspondingly, there are check boxes on the right of the icons and the names of the application programs. The check boxes are options for the user to select a plurality of items, and the user may select one or more of the options. The check boxes are on-off options. When a check box is selected, an identification block "☐" of the check box is marked with "√". When the identification block displayed with the mark "√" is single-tapped, this option is canceled. In addition, an "all" check box may be further set. When the "all" check box is selected, all the options are selected. There may be a scrollbar on a right side of the window of the selection bar, and an option that is not displayed in the current window may be viewed by pulling down or pulling up the scrollbar. Buttons such as "ok" and "cancel" are set in a lower part of the window of the selection bar, and the buttons may be single-tapped to perform related operations. A setting in the selection bar may be made effective by single-tapping the "ok" button, and the setting may be canceled by single-tapping the "cancel" button. In the dialog box that is in the management interface of the "mobile phone assistant" and that is configured to create a desktop application shortcut, after a corresponding option for which an application shortcut needs to be created is selected, the "ok" button is tapped to generate, on the Windows® desktop, an application shortcut corresponding to an Android® application program. The application shortcut newly generated on the Windows® desktop of the first electronic device may be opened by mouse double-clicking, to start a corresponding application program in the Android® operating system of the second electronic device.

With reference to the first aspect, in some embodiments, when detecting that the first electronic device establishes the first connection to the second electronic device for the first time, the second electronic device sends the first application information to the first electronic device through the first connection. In an example, when detecting that a computer establishes a connection to a mobile phone for the first time by using a data cable, the mobile phone sends application information, such as application package names, application names, and application icons, of a plurality of application programs on the mobile phone to a computer end, to request to create application shortcuts of the application programs.

With reference to the first aspect, in some embodiments, when detecting that the first application program is installed or updated, the second electronic device may send the first application information to the first electronic device through the first connection. In an example, the computer is connected to the mobile phone, and each time the mobile phone detects that a new application program is installed or updated, the mobile phone sends, to the computer end, application information of the application program, such as an application package name, an application name, and an application icon, to request to create an application shortcut of the application program.

With reference to the first aspect, in some embodiments, the first application shortcut includes a first identifier, and the first identifier is used to indicate that an application program represented by the first application shortcut is the first application program installed on the second electronic device. In an example, the first identifier may be a small icon in a style of a mobile phone, and is displayed at an upper right corner of an application icon of the first application shortcut, to indicate that the application icon is an application shortcut of an application program on the second electronic device. The mark of the first identifier helps the user to quickly identify the application shortcut from the second electronic device, and distinguish from a native application shortcut on the first electronic device. The first identifier may be a text, or may be a pattern. A form of the first identifier is not limited in this application.

With reference to the first aspect, in some embodiments, a third display area in the first user interface is used to display the first application shortcut. In an example, in this application, a third display area, for example, named "mobile phone application launch bar", may be created on a desktop on the computer end, to place the first application shortcut pointing to the application program on the mobile phone. The user may double-click the application icon of the first application shortcut by using the mouse to start the corresponding first application program on the mobile phone. The third display area "mobile phone application launch bar" may be a window at a fixed position, or may be a window that can be moved by the user freely. User interface designs such as a style and a name of the third display area are not limited. Existence of the third display area helps the first electronic device to centrally place and manage application icons pointing to application programs on the second electronic device, so that the user can quickly identify an application shortcut from the second electronic device, and distinguish from a native application shortcut on the first electronic device, thereby improving user experience of the user.

With reference to the first aspect, in some embodiments, the method further includes: The first user interface further includes a first hidden area. When detecting a sixth user operation in the first user interface, the first electronic device displays the first hidden area in the first user interface, and displays the first application shortcut in the first hidden area. In an example, in this application, a first hidden area may be created on the desktop on the computer end, to place the first application shortcut pointing to the application program on the mobile phone. The user may double-click the application icon of the first application shortcut by using the mouse to start the corresponding first application program on the mobile phone. The first hidden area may be in a style of a sidebar. The first hidden area may be hidden at a position such as a side, an upper part, or a corner of the computer desktop when not in use. The first hidden area may be called out by performing a sixth user operation, for example, moving the mouse pointer to an edge of the computer desktop and staying for some time. User interface designs such as a style and a name of the first hidden area and a manner of the sixth user operation are not limited. For example, the sixth user operation may alternatively be voice command or a gesture operation.

With reference to the first aspect, in some embodiments, the method further includes: When detecting that the first connection between the first electronic device and the second electronic device is broken, the first electronic device deletes the first application shortcut.

According to a second aspect, an embodiment of the present disclosure provides a system for creating an application shortcut. The system includes a first electronic device and a second electronic device. The first electronic device is configured to establish a first connection to the second electronic device. The first electronic device is configured to display a first user interface. The first user interface includes a first display area, and display content in the first display area is the same as display content on a display screen of the second electronic device. The second electronic device is configured to obtain first application information of a first application program. The first application program is installed on the second electronic device, and the first application information includes one or more of the following items: an application package name, an application icon, or an application name. The second electronic device is configured to send the first application information to the first electronic device through the first connection. The first electronic device is configured to create a first application shortcut based on the first application information. The first application shortcut is an application shortcut corresponding to the first application program, the first application shortcut is displayed in a second display area of the first user interface, and the second display area is a display area different from the first display area.

It may be understood that, based on a same inventive idea, for steps performed by the electronic devices in the system in the second aspect, refer to related descriptions of steps performed when the electronic devices implement corresponding functions in the method in the first aspect.

By implementing the system in the second aspect, the first electronic device may create the first application shortcut, and when the first electronic device detects that the first application shortcut is opened in an interaction operation manner of the first electronic device, the first electronic device sends a startup instruction to the second electronic device, and the second electronic device may start the first application program that is installed on the second electronic device and that corresponds to the first application shortcut. For example, in an example, in a Windows® operating system of the first electronic device, a user needs to open an application shortcut by double-clicking an application icon, while in an Android® operating system of the second electronic device, the user needs to open an application shortcut by single-tapping an application icon. According to the system in the second aspect, the first application shortcut pointing to the first application program installed on the second electronic device is generated on the first electronic device, and when the first application shortcut in the first user interface of the first electronic device is opened in a double-clicking manner, the first application program on the second electronic device is started.

According to a third aspect, an embodiment of the present disclosure provides a method for creating an application shortcut. The method includes: A first electronic device establishes a first connection to a second electronic device. The first electronic device displays a first user interface. The first user interface includes a first display area, and display content in the first display area is the same as display content on a display screen of the second electronic device. The first electronic device obtains first application information of a first application program from the second electronic device through the first connection. The first application information may include one or more of the following items: an application package name, an application icon, or an application name. The first electronic device creates a first application shortcut based on the first application information. The first application shortcut is an application shortcut corresponding to the first application program, the first application shortcut is displayed in a second display area of the first user interface, and the second display area is a display area different from the first display area.

By implementing the method in the third aspect, the first electronic device may create the first application shortcut, and when the first electronic device detects that the first application shortcut is opened in an interaction operation manner of the first electronic device, the first electronic device sends a startup instruction to the second electronic device, and the second electronic device may start the first application program that is installed on the second electronic device and that corresponds to the first application shortcut. For example, in an example, in a Windows® operating system of the first electronic device, a user needs to open an application shortcut by double-clicking an application icon, while in an Android® operating system of the second electronic device, the user needs to open an application shortcut by single-tapping an application icon. According to the method in the third aspect, the first application shortcut pointing to the first application program installed on the second electronic device is generated on the first electronic device, and when the first application shortcut in the first user interface of the first electronic device is opened in a double-clicking manner, the first application program on the second electronic device is started.

With reference to the third aspect, in some embodiments, the method may further include: The first electronic device detects, in the first user interface, a first user operation that acts on the first application shortcut. The first electronic device sends a first instruction to the second electronic device through the first connection. The first instruction is used to trigger the second electronic device to start the first application program. The first electronic device receives, through the first connection, first data sent from the second electronic device. The first data is used to indicate a user interface of the first application program. Then, the first electronic device displays the user interface of the first application program in the first display area based on the first data. The user interface of the first application program is also displayed on the display screen of the second electronic device.

With reference to the third aspect, in some embodiments, the method may further include: The first electronic device detects a second user operation of dragging the application icon of the first application program displayed in the first display area to the second display area. The first electronic device sends a request for obtaining the first application information to the second electronic device through the first connection in response to the second user operation. For example, in an example, the second user operation may be that the user drags the application icon in a mirror user interface of the second electronic device, that is, the first display area, to an edge of the first display area. In this case, an information receiving process is triggered. The process may use a virtual application process supporting running of the mirror user interface to send synchronization information to the Windows® operating system of the first electronic device. The synchronization information may include: coordinate information of the application icon departing from the edge of the mirror user interface, and application information such as the application package name and application icon data. Then, after the Windows® operating system receives the synchronization information, coordinate position information of a junction with the mirror user interface on a Windows® desktop side is calculated based on the coordinate information and a relative position of the mirror user interface on a Windows® desktop. The coordinate position is defined as a departure position. Then, the first electronic device draws and displays the dragged application icon from the departure position, and then dynamically draws and displays the application icon based on a position of a mouse pointer and a moving track of the mouse pointer, to form a display effect of a dragging animation. When the user drags the application icon to a position on the Windows® desktop and releases the mouse pointer, the first electronic device sends the request for obtaining the first application information to the second electronic device through the first connection. Then, the first electronic device creates and generates, on the Windows® desktop based on the first application information, the application shortcut corresponding to the application icon. The application shortcut may be opened by double-clicking. The second user operation is not limited to the dragging operation, and may alternatively be another user operation manner, such as a voice command or a gesture operation.

With reference to the third aspect, in some embodiments, the method may further include: The first electronic device detects a third user operation of dragging the application icon of the first application program displayed in the first display area to a first area in the first display area. The first electronic device sends a request for obtaining the first application information to the second electronic device through the first connection in response to the third user operation. In an example, the user may drag the application icon in the mirror user interface to the first area in the first display area, and then release the mouse. The first area may be a hot area. The dragging operation may be referred to as a third user operation. The third user operation is not limited to the dragging operation, and may alternatively be a voice command, a gesture operation, or the like. In response to the third user operation, a pop-up box may appear in the mirror user interface, and the pop-up box may be used to ask the user whether it is necessary to create an application shortcut for a selected application program. After the user selects "yes", the first electronic device sends the request for obtaining the first application information to the second electronic device through the first connection. Then, the first electronic device creates and generates, on the desktop of the first electronic device based on the first application information, the application shortcut corresponding to the application icon. The application shortcut may be opened by double-clicking.

With reference to the third aspect, in some embodiments, the method may further include: The first electronic device displays a first list. Indication information of one or more first application programs is displayed in the first list. The first electronic device detects, in the first list, a fifth user operation of selecting indication information of the first application program. Then, the first electronic device sends a request for obtaining the first application information to the second electronic device through the first connection in response to the fifth user operation. The first application information is application information of the first application program indicated by the indication information, selected by the fifth user operation, of the first application program. In an example, in this application, auxiliary management software "mobile phone assistant" may be used to manage and select an Android® application shortcut that needs to be created on the Windows® desktop. A management interface of the application program "mobile phone assistant" is displayed on the first electronic device, and the management interface of the "mobile phone assistant" may include such a window in which the user may autonomously select an application program for which an application shortcut needs to be created. The selection operation of the user may be referred to as a fifth user operation. When the management interface of the application program "mobile phone assistant" is displayed on the first electronic device, the fifth user operation may occur on the first electronic device. The management interface of the "mobile phone assistant" may include a selection bar of application programs, which is also referred to as a first list, and displays icons and names that correspond to the application programs, to facilitate identification and differentiation of the user. Correspondingly, there are check boxes on the right of the icons and the names of the application programs. The check boxes are options for the user to select a plurality of items, and the user may select one or more of the options. The check boxes are on-off options. When a check box is selected, an identification block "☐" of the check box is marked with "√". When the identification block displayed with the mark "√" is single-clicked, this option is canceled. In addition, an "all" check box may be further set. When the "all" check box is selected, all the options are selected. There may be a scrollbar on a right side of the window of the selection bar, and an option that is not displayed in the current window may be viewed by pulling down or pulling up the scrollbar. Buttons such as "ok" and "cancel" are set in a lower part of the window of the selection bar, and the buttons may be single-clicked to perform related operations. A setting in the selection bar may be made effective by single-clicking the "ok" button, and the setting may be canceled by single-clicking the "cancel" button. In the dialog box that is in the management interface of the "mobile phone assistant" and that is configured to create a desktop application shortcut, after a corresponding option for which an application shortcut needs to be created is selected, the "ok" button is clicked to generate, on the Windows® desktop, an application shortcut corresponding to an Android® application program. The application shortcut newly generated on the Windows® desktop of the first electronic device may be opened by mouse double-clicking, to start a corresponding application program in the Android® operating system of the second electronic device.

With reference to the third aspect, in some embodiments, the first application information is obtained when it is detected that the first electronic device establishes the first connection to the second electronic device for the first time. In an example, when detecting that a computer establishes a connection to a mobile phone for the first time by using a data cable, the computer obtains application information, sent from the mobile phone, of a plurality of application programs on the mobile phone, such as application package names, application names, and application icons, and then creates application shortcuts of the application programs.

With reference to the third aspect, in some embodiments, the first application information is obtained when the second electronic device detects that the first application program is installed or updated. In an example, the computer is connected to the mobile phone, and each time the mobile phone detects that a new application program is installed or updated, the mobile phone sends, to a computer end, application information of the application program, such as an application package name, an application name, and an application icon. After the application information is obtained on the computer end, an application shortcut of the application program is created on a computer desktop.

With reference to the third aspect, in some embodiments, the first application shortcut may include a first identifier, and the first identifier is used to indicate that an application program represented by the first application shortcut is the first application program installed on the second electronic device. In an example, the first identifier may be a small icon in a style of a mobile phone, and is displayed at an upper right corner of an application icon of the first application shortcut, to indicate that the application icon is an application shortcut of an application program on the second electronic device. The mark of the first identifier helps the user to quickly identify the application shortcut from the second electronic device, and distinguish from a native application shortcut on the first electronic device. The first identifier may be a text, or may be a pattern. A form of the first identifier is not limited in this application.

With reference to the third aspect, in some embodiments, a third display area in the first user interface is used to display the first application shortcut. In an example, in this application, a third display area, for example, named "mobile phone application launch bar", may be created on a desktop on the computer end, to place the first application shortcut pointing to the application program on the mobile phone. The user may double-click the application icon of the first application shortcut by using the mouse to start the corresponding first application program on the mobile phone. The third display area "mobile phone application launch bar" may be a window at a fixed position, or may be a window that can be moved by the user freely. User interface designs such as a style and a name of the third display area are not limited. Existence of the third display area helps the first electronic device to centrally place and manage application icons pointing to application programs on the second electronic device, so that the user can quickly identify an application shortcut from the second electronic device, and distinguish from a native application shortcut on the first electronic device, thereby improving user experience of the user.

With reference to the third aspect, in some embodiments, the method further includes: The first user interface further includes a first hidden area. When detecting a sixth user operation in the first user interface, the first electronic device displays the first hidden area in the first user interface, and displays the first application shortcut in the first hidden area. In an example, in this application, a first hidden area may be created on the desktop on the computer end, to place the first application shortcut pointing to the application program on the mobile phone. The user may double-click the application icon of the first application shortcut by using the mouse to start the corresponding first application program on the mobile phone. The first hidden area may be in a style of a sidebar. The first hidden area may be hidden at a position such as a side, an upper part, or a corner of the computer desktop when not in use. The first hidden area may be called out by performing a sixth user operation, for example, moving the mouse pointer to an edge of the computer desktop and staying for some time. User interface designs such as a style and a name of the first hidden area and a manner of the sixth user operation are not limited. For example, the sixth user operation may alternatively be voice command or a gesture operation.

With reference to the third aspect, in some embodiments, the method further includes: When detecting that the first connection between the first electronic device and the second electronic device is broken, the first electronic device deletes the first application shortcut.

According to a fourth aspect, an embodiment of the present disclosure provides an electronic device for creating an application shortcut. The electronic device includes: a communications apparatus, a display, a memory, and a processor coupled to the memory. The communications apparatus is configured to establish a first connection to a second electronic device. The display is configured to display a first user interface. The first user interface includes a first display area, and display content in the first display area is the same as display content on a display screen of the second electronic device. The communications apparatus is further configured to obtain first application information of a first application program from the second electronic device through the first connection. The first application information may include one or more of the following items: an application package name, an application icon, or an application name. The processor is configured to create a first application shortcut based on the first application information. The first application shortcut is an application shortcut corresponding to the first application program. The display is further configured to display the first application shortcut in a second display area of the first user interface. The second display area is a display area different from the first display area. The memory is configured to store data or instructions generated in a process of executing a program by the processor.

The electronic device in the fourth aspect may create the first application shortcut, and when the electronic device detects that the first application shortcut is opened in an interaction operation manner of the first electronic device, the electronic device may send a startup instruction to the second electronic device, and the second electronic device may start the first application program that is installed on the second electronic device and that corresponds to the first application shortcut. For example, in an example, in a Windows® operating system of the first electronic device, a user needs to open an application shortcut by double-clicking an application icon, while in an Android® operating system of the second electronic device, the user needs to open an application shortcut by single-tapping an application icon. According to the electronic device in the fourth aspect, the first application shortcut pointing to the first application program installed on the second electronic device is generated on the first electronic device, and when the first application shortcut in the first user interface of the first electronic device is opened in a double-clicking manner, the first application program on the second electronic device is started.

With reference to the fourth aspect, in some embodiments, the processor may be further configured to detect, in the first user interface, a first user operation that acts on the first application shortcut. The processor may be further configured to send a first instruction to the second electronic device through the first connection. The first instruction is used to trigger the second electronic device to start the first application program. The communications apparatus may be further configured to receive, through the first connection, first data sent from the second electronic device. The first data is used to indicate a user interface of the first application program. In addition, the display may be further configured to display the user interface of the first application program in the first display area based on the first data. The user interface of the first application program is also displayed on the display screen of the second electronic device.

With reference to the fourth aspect, in some embodiments, the processor is further configured to detect a second user operation of dragging the application icon of the first application program displayed in the first display area to the second display area. Then, the communications apparatus is further configured to send a request for obtaining the first application information to the second electronic device through the first connection in response to the second user operation. For example, in an example, the second user operation may be that the user drags the application icon in a mirror user interface of the second electronic device, that is, the first display area, to an edge of the first display area. In this case, an information receiving process is triggered. The process may use a virtual application process supporting running of the mirror user interface to send synchronization information to the Windows® operating system of the first electronic device. The synchronization information may include: coordinate information of the application icon departing from the edge of the mirror user interface, and application information such as the application package name and application icon data. Then, after the Windows® operating system receives the synchronization information, coordinate position information of a junction with the mirror user interface on a Windows® desktop side is calculated based on the coordinate information and a relative position of the mirror user interface on a Windows® desktop. The coordinate position is defined as a departure position. Then, the first electronic device draws and displays the dragged application icon from the departure position, and then dynamically draws and displays the application icon based on a position of a mouse pointer and a moving track of the mouse pointer, to form a display effect of a dragging animation. When the user drags the application icon to a position on the Windows® desktop and releases the mouse pointer, the first electronic device sends the request for obtaining the first application information to the second electronic device through the first connection. Then, the first electronic device creates and generates, on the Windows® desktop based on the first application information, the application shortcut corresponding to the application icon. The application shortcut may be opened by double-clicking. The second user operation is not limited to the dragging operation, and may alternatively be another user operation manner, such as a voice command or a gesture operation.

With reference to the fourth aspect, in some embodiments, the processor is further configured to detect a third user operation of dragging the application icon of the first application program displayed in the first display area to a first area in the first display area. Then, the communications apparatus is further configured to send a request for obtaining the first application information to the second electronic device through the first connection in response to the third user operation. In an example, the user may drag the application icon in the mirror user interface to the first area in the first display area, and then the user releases the mouse. The first area herein may be a hot area. The dragging operation may be referred to as a third user operation. The third user operation is not limited to the dragging operation, and may alternatively be a voice command, a gesture operation, or the like. This is not limited in this application. In response to the third user operation, a pop-up box may appear in the mirror user interface, asking the user whether it is necessary to create an application shortcut for a selected application program. After the user selects "yes", the first electronic device sends the request for obtaining the first application information to the second electronic device through the first connection. Then, the first electronic device creates and generates, on the desktop of the first electronic device based on the first application information, the application shortcut corresponding to the application icon. The application shortcut may be opened by double-clicking.

With reference to the fourth aspect, in some embodiments, the display may be further configured to display a first list. Indication information of one or more first application programs may be displayed in the first list. The processor may be further configured to detect, in the first list, a fifth user operation of selecting indication information of the first application program. Then, the communications apparatus may be further configured to send a request for obtaining the first application information to the second electronic device through the first connection in response to the fifth user operation. The first application information is application information of the first application program indicated by the indication information, selected by the fifth user operation, of the first application program. In an example, in this application, auxiliary management software "mobile phone assistant" may be used to manage and select an Android® application shortcut that needs to be created on the Windows® desktop. A management interface of the application program "mobile phone assistant" is displayed on the first electronic device, and the management interface of the "mobile phone assistant" may include such a window in which the user may autonomously select an application program for which an application shortcut needs to be created. The selection operation of the user may be referred to as a fifth user operation. When the management interface of the application program "mobile phone assistant" is displayed on the first electronic device, the fifth user operation may occur on the first electronic device. The management interface of the "mobile phone assistant" may include a selection bar of application programs, which is also referred to as a first list, and displays icons and names that correspond to the application programs, to facilitate identification and differentiation of the user. Correspondingly, there are check boxes on the right of the icons and the names of the application programs. The check boxes are options for the user to select a plurality of items, and the user may select one or more of the options. The check boxes are on-off options. When a check box is selected, an identification block "☐" of the check box is marked with "√". When the identification block displayed with the mark "√" is single-clicked, this option is canceled. In addition, an "all" check box may be further set. When the "all" check box is selected, all the options are selected. There may be a scrollbar on a right side of the window of the selection bar, and an option that is not displayed in the current window may be viewed by pulling down or pulling up the scrollbar. Buttons such as "ok" and "cancel" are set in a lower part of the window of the selection bar, and the buttons may be single-clicked to perform related operations. A setting in the selection bar may be made effective by single-clicking the "ok" button, and the setting may be canceled by single-clicking the "cancel" button. In the dialog box that is in the management interface of the "mobile phone assistant" and that is configured to create a desktop application shortcut, after a corresponding option for which an application shortcut needs to be created is selected, the "ok" button is clicked to generate, on the Windows® desktop, an application shortcut corresponding to an Android® application program. The application shortcut newly generated on the Windows® desktop of the first electronic device may be opened by mouse double-clicking, to start a corresponding application program in the Android® operating system of the second electronic device.

With reference to the fourth aspect, in some embodiments, the first application information is obtained when it is detected that the electronic device establishes the first connection to the second electronic device for the first time. In an example, when detecting that a computer establishes a connection to a mobile phone for the first time by using a data cable, the computer obtains application information, sent from the mobile phone, of a plurality of application programs on the mobile phone, such as application package names, application names, and application icons, and then creates application shortcuts of the application programs.

With reference to the fourth aspect, in some embodiments, the first application information is obtained when the second electronic device detects that the first application program is installed or updated. In an example, the computer is connected to the mobile phone, and each time the mobile phone detects that a new application program is installed or updated, the mobile phone sends, to a computer end, application information of the application program, such as an application package name, an application name, and an application icon. After the application information is obtained on the computer end, an application shortcut of the application program is created on a computer desktop.

With reference to the fourth aspect, in some embodiments, the first application shortcut includes a first identifier, and the first identifier is used to indicate that an application program represented by the first application shortcut is the first application program installed on the second electronic device. In an example, the first identifier may be a small icon in a style of a mobile phone, and is displayed at an upper right corner of an application icon of the first application shortcut, to indicate that the application icon is an application shortcut of an application program on the second electronic device. The mark of the first identifier helps the user to quickly identify the application shortcut from the second electronic device, and distinguish from a native application shortcut on the first electronic device. The first identifier may be a text, or may be a pattern. A form of the first identifier is not limited in this application.

With reference to the fourth aspect, in some embodiments, the display is further configured to display a third display area in the first user interface. The third display area is used to display the first application shortcut. In an example, in this application, a third display area, for example, named "mobile phone application launch bar", may be created on a desktop on the computer end, to place the first application shortcut pointing to the application program on the mobile phone. The user may double-click the application icon of the first application shortcut by using the mouse to start the corresponding first application program on the mobile phone. The third display area "mobile phone application launch bar" may be a window at a fixed position, or may be a window that can be moved by the user freely. User interface designs such as a style and a name of the third display area are not limited. Existence of the third display area helps the first electronic device to centrally place and manage application icons pointing to application programs on the second electronic device, so that the user can quickly identify an application shortcut from the second electronic device, and distinguish from a native application shortcut on the first electronic device, thereby improving user experience of the user.

With reference to the fourth aspect, in some embodiments, the first user interface further includes a first hidden area. The display is further configured to: when a sixth user operation is detected in the first user interface, display the first hidden area in the first user interface, and display the first application shortcut in the first hidden area. In an example, in this application, a first hidden area may be created on the desktop on the computer end, to place the first application shortcut pointing to the application program on the mobile phone. The user may double-click the application icon of the created first application shortcut by using the mouse to start the corresponding first application program on the mobile phone. The first hidden area may be in a style of a sidebar. The first hidden area may be hidden at a position such as a side, an upper part, or a corner of the computer desktop when not in use. The first hidden area may be called out by performing a sixth user operation, for example, moving the mouse pointer to an edge of the computer desktop and staying for some time. User interface designs such as a style and a name of the first hidden area and a manner of the sixth user operation are not limited. For example, the sixth user operation may alternatively be voice command or a gesture operation.

With reference to the fourth aspect, in some embodiments, the processor is further configured to: when detecting that the first connection between the electronic device and the second electronic device is broken, delete the first application shortcut.

According to a fifth aspect, an embodiment of the present disclosure provides a method for creating an application shortcut. The method includes: A first electronic device obtains first application information of a first application program. The first application information may include one or more of the following items: an application package name, an application icon, or an application name. A first operating system runs on the first electronic device, a first process is loaded in the first operating system, the first process is used to run a second operating system, and the first application program is loaded in the second operating system. The first electronic device displays a first user interface. The first user interface includes a first display area, and a display interface loaded by the first process is displayed in the first display area. The first electronic device creates a first application shortcut based on the first application information. The first application shortcut is an application shortcut of the first application program. The first application shortcut is displayed in a second display area of the first user interface, and the second display area is a display area different from the first display area.

By implementing the method in the fifth aspect, the first electronic device may create the first application shortcut in the first operating system, the first process exists on the first electronic device, and the second operating system may run in the first process. When the first electronic device detects that the first application shortcut is opened in an interaction operation manner of the first operating system, the first electronic device sends a startup instruction to the first process, and the first process starts the first application program that is installed in the second operating system and that corresponds to the first application shortcut. For example, in an example, in a Windows® operating system of the first electronic device, a user needs to open an application shortcut by double-clicking an application icon. An Android® emulator, that is, the first process, is installed on the first electronic device, an Android® operating system may run in the Android® emulator, and in the Android® emulator, the user needs to open an application shortcut by single-clicking an application icon. According to the method in the fifth aspect, the first application shortcut pointing to the first application program loaded in the Android® emulator is generated on a Windows® desktop of the first electronic device, and when the first application shortcut on the Windows® desktop of the first electronic device is opened in a double-clicking manner, the first application program that is in the Android® emulator and that corresponds to the first application shortcut is started.

With reference to the fifth aspect, in some embodiments, the method further includes: The first electronic device detects, in the first user interface, a first user operation that acts on the first application shortcut. Then, the first electronic device sends a first instruction to the first process by using the first operating system. The first instruction is used to trigger the first process to start the first application program. The first electronic device displays a user interface of the first application program in the first display area.

With reference to the fifth aspect, in some embodiments, the method further includes: The first electronic device detects a second user operation of dragging the application icon of the first application program displayed in the first display area to the second display area. Then, the first electronic device obtains the first application information in response to the second user operation. For example, in an example, the second user operation may be that the user drags the application icon in a user interface of the Android® emulator, that is, the first display area, to an edge of the first display area. In this case, an information receiving process is triggered. The process may support an Android® emulator process in sending synchronization information to the Windows® operating system of the first electronic device. The synchronization information may include: coordinate information of the application icon departing from the edge of the user interface of the Android® emulator, and application information such as the application package name and application icon data. Then, after the Windows® operating system receives the synchronization information, coordinate position information of a junction with the user interface of the Android® emulator on a Windows® desktop side is calculated based on the coordinate information and a relative position of the user interface of the Android® emulator on the Windows® desktop. The coordinate position is defined as a departure position. Then, the first electronic device draws and displays the dragged application icon from the departure position, and then dynamically draws and displays the application icon based on a position of a mouse pointer and a moving track of the mouse pointer, to form a display effect of a dragging animation. When the user drags the application icon to a position on the Windows® desktop and releases the mouse pointer, the first electronic device obtains the first application information in the Android® emulator. Then, the first electronic device creates and generates, on the Windows® desktop based on the first application information, the application shortcut corresponding to the application icon. The application shortcut may be opened by double-clicking. The second user operation is not limited to the dragging operation, and may alternatively be another user operation manner, such as a voice command or a gesture operation.

With reference to the fifth aspect, in some embodiments, the method may further include: The first electronic device detects a third user operation of dragging the application icon of the first application program displayed in the first display area to a first area in the first display area. Then, the first electronic device may obtain the first application information in response to the third user operation. In an example, the user may drag the application icon in the user interface of the Android® emulator to the first area in the first display area, and then release the mouse. The first area may be a hot area. The dragging operation may be referred to as a third user operation. The third user operation is not limited to the dragging operation, and may alternatively be a voice command, a gesture operation, or the like. In response to the third user operation, a pop-up box may appear in the user interface of the Android® emulator, and the pop-up box may be used to ask the user whether it is necessary to create an application shortcut for a selected application program. After the user selects "yes", the first electronic device may obtain the first application information corresponding to the first application program in the Android® emulator. Then, the first electronic device creates and generates, on the desktop of the first electronic device based on the first application information, the application shortcut corresponding to the application icon. The application shortcut may be opened by double-clicking.

With reference to the fifth aspect, in some embodiments, the method may further include: The first electronic device displays a first list. Indication information of one or more first application programs is displayed in the first list. The first electronic device detects, in the first list, a fifth user operation of selecting indication information of the first application program. The first electronic device obtains the first application information in response to the fifth user operation. The first application shortcut is an application shortcut of the first application program indicated by the indication information, selected by the fifth user operation, of the first application program. In an example, in this application, auxiliary management software "mobile phone assistant" may be used to manage and select an Android® application shortcut that needs to be created on the Windows® desktop. A management interface of the application program "mobile phone assistant" is displayed on the first electronic device, and the management interface of the "mobile phone assistant" may include such a window in which the user may autonomously select an application program for which an application shortcut needs to be created. The selection operation of the user may be referred to as a fifth user operation. When the management interface of the application program "mobile phone assistant" is displayed on the first electronic device, the fifth user operation may occur on the first electronic device. The management interface of the "mobile phone assistant" may include a selection bar of application programs, which is also referred to as a first list, and displays icons and names that correspond to the application programs, to facilitate identification and differentiation of the user. Correspondingly, there are check boxes on the right of the icons and the names of the application programs. The check boxes are options for the user to select a plurality of items, and the user may select one or more of the options. The check boxes are on-off options. When a check box is selected, an identification block "☐" of the check box is marked with "√". When the identification block displayed with the mark "√" is single-clicked, this option is canceled. In addition, an "all" check box may be further set. When the "all" check box is selected, all the options are selected. There may be a scrollbar on a right side of the window of the selection bar, and an option that is not displayed in the current window may be viewed by pulling down or pulling up the scrollbar. Buttons such as "ok" and "cancel" are set in a lower part of the window of the selection bar, and the buttons may be single-clicked to perform related operations. A setting in the selection bar may be made effective by single-clicking the "ok" button, and the setting may be canceled by single-clicking the "cancel" button. In the dialog box that is in the management interface of the "mobile phone assistant" and that is configured to create a desktop application shortcut, after a corresponding option for which an application shortcut needs to be created is selected, the "ok" button is clicked to generate, on the Windows® desktop, an application shortcut corresponding to an Android® application program in the Android® emulator. The application shortcut newly generated on the Windows® desktop of the first electronic device may be opened by mouse double-clicking, to start a corresponding application program in the Android® operating system in the Android® emulator.

With reference to the fifth aspect, in some embodiments, when detecting that the first process runs for the first time, the first electronic device obtains the first application information of the first application program loaded in the second operating system. In an example, when detecting that the Android® emulator runs for the first time, a computer obtains application information, sent by the Android® emulator, of a plurality of application programs in the Android® emulator, such as application package names, application names, and application icons, and then the computer creates corresponding application shortcuts based on the application information.

With reference to the fifth aspect, in some embodiments, when detecting that the first application program is installed or updated in the second operating system, the first electronic device may obtain the first application information of the first application program loaded in the second operating system. In an example, each time the Android® emulator installs or updates a new application program, the computer obtains application information of the application program, such as an application package name, an application name, and an application icon. After the application information is obtained on a computer end, an application shortcut of the application program is created on the Windows® desktop of the computer.

With reference to the fifth aspect, in some embodiments, the first application shortcut includes a first identifier, and the first identifier is used to indicate that an application program represented by the first application shortcut is the first application program installed in the second operating system. In an example, the first identifier may be a small icon in a style of an Android robot, and is displayed at an upper right corner of an application icon of the first application shortcut, to indicate that the application icon is an application shortcut of an application program on the Android® emulator. The mark of the first identifier helps the user to quickly identify the application shortcut from the Android® emulator, and distinguish from a native application shortcut in the Windows® operating system. The first identifier may be a text, or may be a pattern. A form of the first identifier is not limited in this application.

With reference to the fifth aspect, in some embodiments, a third display area in the first user interface is used to display the first application shortcut. In an example, in this application, a third display area, for example, named "Android application launch bar", may be created on the Windows® desktop of the computer, to place the first application shortcut pointing to the application program in the Android® emulator. The user may double-click the application icon of the first application shortcut by using the mouse to start the first application program that is in the Android® emulator and that corresponds to the first application shortcut. The third display area "Android application launch bar" may be a window at a fixed position, or may be a window that can be moved by the user freely. User interface designs such as a style and a name of the third display area are not limited. Existence of the third display area helps the first electronic device to centrally place and manage application icons pointing to application programs in the second operating system, so that the user can quickly identify an application shortcut from the second operating system, and distinguish from a native application shortcut in the first operating system, thereby improving user experience of the user.

With reference to the fifth aspect, in some embodiments, the method further includes: The first user interface further includes a first hidden area. When detecting a sixth user operation in the first user interface, the first electronic device displays the first hidden area in the first user interface, and displays the first application shortcut in the first hidden area. In an example, in this application, a first hidden area may be created on the Windows® desktop of the computer, to place the first application shortcut pointing to the application program in the Android® emulator. The user may double-click the application icon of the first application shortcut by using the mouse to start the corresponding first application program in the Android® emulator. The first hidden area may be in a style of a sidebar. The first hidden area may be hidden at a position such as a side, an upper part, or a corner of the computer desktop when not in use. The first hidden area may be called out by performing a sixth user operation, for example, moving the mouse pointer to an edge of the Windows® desktop of the computer and staying for some time. User interface designs such as a style and a name of the first hidden area and a manner of the sixth user operation are not limited. For example, the sixth user operation may alternatively be voice command or a gesture operation.

With reference to the fifth aspect, in some embodiments, the method further includes: When detecting that the first process is uninstalled, the first electronic device deletes the first application shortcut.

According to a sixth aspect, an embodiment of the present disclosure provides an electronic device for creating an application shortcut. The electronic device includes: a display, a memory, and a processor coupled to the memory. The processor is configured to obtain first application information of a first application program. The first application information includes one or more of the following items: an application package name, an application icon, or an application name. A first operating system runs on the electronic device, a first process is loaded in the first operating system, the first process is used to run a second operating system, and the first application program is loaded in the second operating system. The first electronic device displays a first user interface. The first user interface includes a first display area, and a display interface loaded by the first process is displayed in the first display area. The processor is further configured to create a first application shortcut based on the first application information. The first application shortcut is an application shortcut of the first application program. The display is further configured to display the first application shortcut in a second display area of the first user interface. The second display area is a display area different from the first display area. The memory is configured to store data or instructions generated in a process of executing a program by the processor.

The electronic device in the sixth aspect may create the first application shortcut in the first operating system, the first process exists on the electronic device, and the second operating system may run in the first process. When the electronic device detects that the first application shortcut is opened in an interaction operation manner of the first operating system, the first electronic device sends a startup instruction to the first process, and the first process starts the first application program that is installed in the second operating system and that corresponds to the first application shortcut. For example, in an example, in a Windows® operating system of the first electronic device, a user needs to open an application shortcut by double-clicking an application icon. An Android® emulator, that is, the first process, is installed on the first electronic device, an Android® operating system may run in the Android® emulator, and in the Android® emulator, the user needs to open an application shortcut by single-clicking an application icon. According to the electronic device in the sixth aspect, the first application shortcut pointing to the first application program loaded in the Android® emulator is generated on a Windows® desktop of the first electronic device, and when the first application shortcut on the Windows® desktop of the first electronic device is opened in a double-clicking manner, the first application program that is in the Android® emulator and that corresponds to the first application shortcut is started.

With reference to the sixth aspect, in some embodiments, the processor is further configured to detect, in the first user interface, a first user operation that acts on the first application shortcut. The processor is further configured to send a first instruction to the first process by using the first operating system. The first instruction is used to trigger the first process to start the first application program. The display is further configured to display a user interface of the first application program in the first display area.

With reference to the sixth aspect, in some embodiments, the processor is further configured to detect a second user operation of dragging the application icon of the first application program displayed in the first display area to the second display area. The processor is further configured to obtain the first application information in response to the second user operation. For example, in an example, the second user operation may be that the user drags the application icon in a user interface of the Android® emulator, that is, the first display area, to an edge of the first display area. In this case, an information receiving process is triggered. The process may support an Android® emulator process in sending synchronization information to the Windows® operating system of the first electronic device. The synchronization information may include: coordinate information of the application icon departing from the edge of the user interface of the Android® emulator, and application information such as the application package name and application icon data. Then, after the Windows® operating system receives the synchronization information, coordinate position information of a junction with the user interface of the Android® emulator on a Windows® desktop side is calculated based on the coordinate information and a relative position of the user interface of the Android® emulator on the Windows® desktop. The coordinate position is defined as a departure position. Then, the first electronic device draws and displays the dragged application icon from the departure position, and then dynamically draws and displays the application icon based on a position of a mouse pointer and a moving track of the mouse pointer, to form a display effect of a dragging animation. When the user drags the application icon to a position on the Windows® desktop and releases the mouse pointer, the first electronic device obtains the first application information in the Android® emulator. Then, the first electronic device creates and generates, on the Windows® desktop based on the first application information, the application shortcut corresponding to the application icon. The application shortcut may be opened by double-clicking. The second user operation is not limited to the dragging operation, and may alternatively be another user operation manner, such as a voice command or a gesture operation.

With reference to the sixth aspect, in some embodiments, the processor is further configured to detect a third user operation of dragging the application icon of the first application program displayed in the first display area to a first area in the first display area. The processor is further configured to obtain the first application information in response to the third user operation. In an example, the user may drag the application icon in the user interface of the Android® emulator to the first area in the first display area, and then release the mouse. The first area may be a hot area. The dragging operation may be referred to as a third user operation. The third user operation is not limited to the dragging operation, and may alternatively be a voice command, a gesture operation, or the like. In response to the third user operation, a pop-up box may appear in the user interface of the Android® emulator, and the pop-up box may be used to ask the user whether it is necessary to create an application shortcut for a selected application program. After the user selects "yes", the first electronic device may obtain the first application information corresponding to the first application program in the Android® emulator. Then, the first electronic device creates and generates, on the desktop of the first electronic device based on the first application information, the application shortcut corresponding to the application icon. The application shortcut may be opened by double-clicking.

With reference to the sixth aspect, in some embodiments, the display is further configured to display a first list. Indication information of one or more first application programs is displayed in the first list. The processor is further configured to detect, in the first list, a fifth user operation of selecting indication information of the first application program. The processor is further configured to obtain the first application information in response to the fifth user operation. The first application shortcut is an application shortcut of the first application program indicated by the indication information, selected by the fifth user operation, of the first application program. In an example, in this application, auxiliary management software "mobile phone assistant" may be used to manage and select an Android® application shortcut that needs to be created on the Windows® desktop. A management interface of the application program "mobile phone assistant" is displayed on the first electronic device, and the management interface of the "mobile phone assistant" may include such a window in which the user may autonomously select an application program for which an application shortcut needs to be created. The selection operation of the user may be referred to as a fifth user operation. When the management interface of the application program "mobile phone assistant" is displayed on the first electronic device, the fifth user operation may occur on the first electronic device. The management interface of the "mobile phone assistant" may include a selection bar of application programs, which is also referred to as a first list, and displays icons and names that correspond to the application programs, to facilitate identification and differentiation of the user. Correspondingly, there are check boxes on the right of the icons and the names of the application programs. The check boxes are options for the user to select a plurality of items, and the user may select one or more of the options. The check boxes are on-off options. When a check box is selected, an identification block "☐" of the check box is marked with "√". When the identification block displayed with the mark "√" is single-clicked, this option is canceled. In addition, an "all" check box may be further set. When the "all" check box is selected, all the options are selected. There may be a scrollbar on a right side of the window of the selection bar, and an option that is not displayed in the current window may be viewed by pulling down or pulling up the scrollbar. Buttons such as "ok" and "cancel" are set in a lower part of the window of the selection bar, and the buttons may be single-clicked to perform related operations. A setting in the selection bar may be made effective by single-clicking the "ok" button, and the setting may be canceled by single-clicking the "cancel" button. In the dialog box that is in the management interface of the "mobile phone assistant" and that is configured to create a desktop application shortcut, after a corresponding option for which an application shortcut needs to be created is selected, the "ok" button is clicked to generate, on the Windows® desktop, an application shortcut corresponding to an Android® application program in the Android® emulator. The application shortcut newly generated on the Windows® desktop of the first electronic device may be opened by mouse double-clicking, to start a corresponding application program in the Android® operating system in the Android® emulator.

With reference to the sixth aspect, in some embodiments, when detecting that the first process runs for the first time, the processor is configured to obtain the first application information of the first application program loaded in the second operating system. In an example, when detecting that the Android® emulator runs for the first time, a computer obtains application information, sent by the Android® emulator, of a plurality of application programs in the Android® emulator, such as application package names, application names, and application icons, and then the computer creates corresponding application shortcuts based on the application information.

With reference to the sixth aspect, in some embodiments, when detecting that the first application program is installed or updated in the second operating system, the processor may be configured to obtain the first application information of the first application program loaded in the second operating system. In an example, each time the Android® emulator installs or updates a new application program, the computer obtains application information of the application program, such as an application package name, an application name, and an application icon. After the application information is obtained on a computer end, an application shortcut of the application program is created on the Windows® desktop of the computer.

With reference to the sixth aspect, in some embodiments, the first application shortcut includes a first identifier, and the first identifier is used to indicate that an application program represented by the first application shortcut is the first application program installed in the second operating system. In an example, the first identifier may be a small icon in a style of an Android robot, and is displayed at an upper right corner of an application icon of the first application shortcut, to indicate that the application icon is an application shortcut of an application program on the Android® emulator. The mark of the first identifier helps the user to quickly identify the application shortcut from the Android® emulator, and distinguish from a native application shortcut in the Windows® operating system. The first identifier may be a text, or may be a pattern. A form of the first identifier is not limited in this application.

With reference to the sixth aspect, in some embodiments, the display is further configured to display a third display area in the first user interface. The third display area is used to display the first application shortcut. In an example, in this application, a third display area, for example, named "Android application launch bar", may be created on the Windows® desktop of the computer, to place the first application shortcut pointing to the application program in the Android® emulator. The user may double-click the application icon of the first application shortcut by using the mouse to start the first application program that is in the Android® emulator and that corresponds to the first application shortcut. The third display area "Android application launch bar" may be a window at a fixed position, or may be a window that can be moved by the user freely. User interface designs such as a style and a name of the third display area are not limited. Existence of the third display area helps the first electronic device to centrally place and manage application icons pointing to application programs in the second operating system, so that the user can quickly identify an application shortcut from the second operating system, and distinguish from a native application shortcut in the first operating system, thereby improving user experience of the user.

With reference to the sixth aspect, in some embodiments, the first user interface further includes a first hidden area. The display may be further configured to: when a sixth user operation is detected in the first user interface, display the first hidden area in the first user interface, and display the first application shortcut in the first hidden area. In an example, in this application, a first hidden area may be created on the Windows® desktop of the computer, to place the first application shortcut pointing to the application program in the Android® emulator. The user may double-click the application icon of the first application shortcut by using the mouse to start the corresponding first application program in the Android® emulator. The first hidden area may be in a style of a sidebar. The first hidden area may be hidden at a position such as a side, an upper part, or a corner of the computer desktop when not in use. The first hidden area may be called out by performing a sixth user operation, for example, moving the mouse pointer to an edge of the Windows® desktop of the computer and staying for some time. User interface designs such as a style and a name of the first hidden area and a manner of the sixth user operation are not limited. For example, the sixth user operation may alternatively be voice command or a gesture operation. With reference to the sixth aspect, in some embodiments, the processor is further configured to: when detecting that the first process is uninstalled, delete the first application shortcut.

According to a seventh aspect, an embodiment of the present disclosure provides a computer storage medium. The storage medium stores a computer program, the computer program includes executable instructions, and when the executable instructions are executed by a processor, the processor is enabled to perform, for example, corresponding operations in the method provided in the third aspect or the fifth aspect.

According to the technical solutions of this application, an application shortcut is created in a user interface of a host operating system for an application program in a guest operating system, and a user may start the application program in the guest operating system by clicking the application shortcut on a desktop of the host operating system. Startup modes of application programs are coordinated and unified, and user operation interfaces are converged and unified, so that the user does not feel confused about experience of starting application icons. This application provides a friendly operation environment for the user, thereby improving use experience of the user.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

Figure 1A:
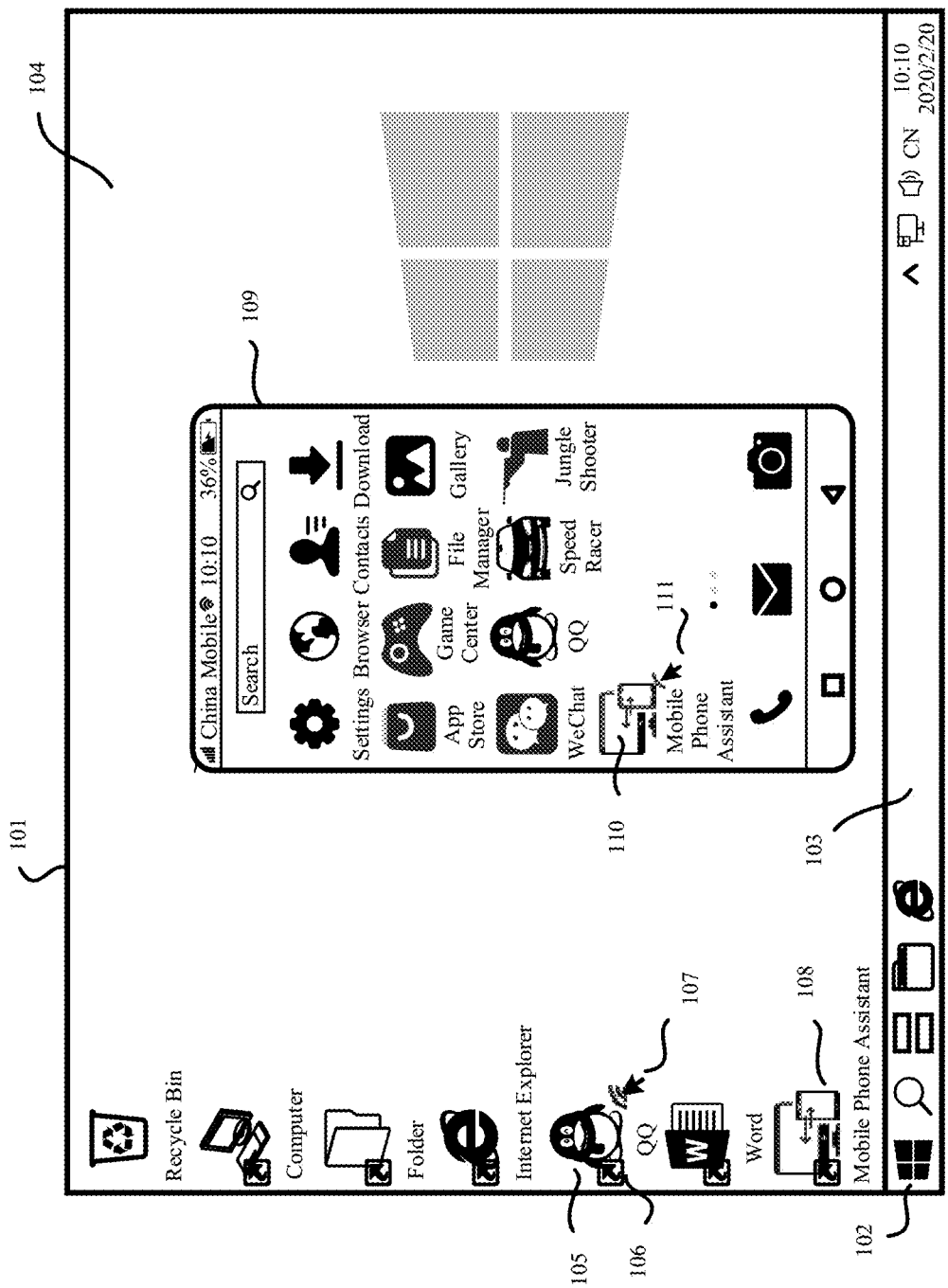
FIG. 1A and FIG. 1B are a schematic diagram of a user interface according to an embodiment of the present disclosure.

The following describes embodiments of this application in detail with reference to the accompanying drawings. Terms used in the following embodiments of this application are merely for the purpose of describing specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that the term "and/or" used in this application refers to and includes any or all possible combinations of one or more items listed.

This application provides a method, an electronic device, and a system for creating an application shortcut, to resolve a problem of creating and starting an application shortcut in a user interface of a host operating system for an application program in a guest operating system. In this application, an application information parsing module is added to the host/guest operating system. When an application shortcut needs to be created in the host operating system for an application program located in the guest operating system, the application information parsing module is responsible for parsing out information necessary for creating the application shortcut, such as an application package name of the application program and an icon of the application program. Then, the application shortcut may be created in a manner such as invoking an interface of the host/guest operating system. When the newly created application shortcut in a display interface of the host operating system is clicked, the host operating system transfers the application package name and a parameter of the application program to an application program startup message processing module of the guest operating system. The application startup message processing module finds the corresponding application program based on the application package name. Then, a user interface corresponding to the application program in the guest operating system is started based on the parameter. If there is no parameter, a home page of the application program is started by default.

According to the technical solutions of this application, the corresponding application shortcut may be created in the user interface of the host operating system for the application program in the guest operating system, and a user may start the application program in the guest operating system by clicking the application shortcut on a desktop of the host operating system. Startup modes of application programs are coordinated and unified, and user operation interfaces are converged and unified, so that the user does not feel confused about experience of starting application icons. This application provides a friendly operation environment for the user, thereby improving use experience of the user.

In the embodiments of this application, operating system types of the host operating system and the guest operating system are not limited.

Generally, a technical principle of starting an application program by using an application shortcut may vary with different operating systems. For example, the application shortcut is created on a desktop of a Windows® operating system, and when the user double-clicks the application icon, the Windows® operating system finds, by using a target address to which application shortcut information points, an application file (a suffix of the application file is usually .exe) that is in a hard disk and that corresponds to the application program, and then opens the application file to start the application program. In addition, subprogram information may be further added to application shortcut information, so that an application shortcut can be used to directly open a subprogram of an application program. For example, when an application shortcut of a Google® browser is created, address information of a Baidu web page may be added. When the application shortcut is opened, an application interface may directly display the Baidu® page instead of a home page of the Google® browser. In an Android® operating system, an application program is started based on an Intent mechanism by using an application shortcut. Intent is a run-time binding (run-time binding) mechanism, which is a passive data structure based on an intent that is intended to be revealed, and can connect two different components when the program is running. Through Intent, the program may express a request or a wish to Android®, and Android® selects an appropriate component to complete the request based on content of the wish. For example, when the user taps an application icon, Android® sends a broadcast. After listening to the broadcast, an application service performs matching for information such as a corresponding application package name, and starts a corresponding application program process if the matching succeeds. The broadcast (Broadcast) refers to a mechanism for the Android® system and application program to transfer signals. The Android® system transfers a signal to a receiver that meets a specific condition. When receiving the signal, the receiver that meets the condition responds and completes a subsequent logic operation.

In the embodiments of this application, when the guest operating system (Guest OS) is an emulator, a virtual machine, or the like, the guest operating system (Guest OS) may run in the host operating system (Host OS). The host operating system (Host OS) virtualizes, for the guest operating system (Guest OS), a virtual hardware environment (including a processor, a memory, an I/O device, and the like) independent of actual hardware, so that for the guest operating system, running in the virtual hardware environment in the host operating system (Host OS) is no different from running on the actual hardware.

The term "user interface (user interface, UI)" in the embodiments of this application is a medium interface for interaction and information exchange between an application program or an operating system and a user, and implements conversion between an internal form of information and a form acceptable to the user. The user interface of the application program is source code written in a specific computer language such as java or an extensible markup language (extensible markup language, XML). The source code of the interface is parsed and rendered on an electronic device, and finally presented as user-recognizable content, for example, a control such as a picture, a text, or a button. The control (control) is also referred to as a widget (widget), which is a basic element of the user interface. Typical controls include a toolbar (toolbar), a menu bar (menu bar), a text box (text box), a button (button), a scrollbar (scrollbar), a picture, and a text. An attribute and content of the control in the interface are defined by a tag or a node. For example, the XML defines, by using a node such as <TextView>, <ImgView>, or <Video View>, the control included in the interface. One node corresponds to one control or attribute in the interface. After parsed and rendered, the node is presented as user-visible content. In addition, generally, interfaces of many application programs, such as hybrid application (hybrid application), further include web pages. The web page, also referred to as a page, may be understood as a special control embedded in an interface of an application program. The web page is source code written in a specific computer language, such as hypertext markup language (hypertext markup language, GTML), a cascading style sheet (cascading style sheet, CSS), or a javascript (JavaScript, JS). The source code of the web page may be loaded and displayed as user-recognizable content by a browser or a web page display component with similar functionality to the browser. Specific content included on the web page is also defined by using a tag or a node in the source code of the web page. For example, the GTML defines an element and an attribute of the web page by using <p>, <img>, <video>, or <canvas>. A common representation form of the user interface is a graphical user interface (graphic user interface, GUI), which is a user interface that is displayed in a graphical manner and that is related to a computer operation. The user interface may include an interface element such as an icon, a window, or a control displayed on a display screen of an electronic device. The control may include visual interface elements such as an icon, a button, a menu, a tab, a text box, a dialog box, a status bar, a navigation bar, and a widget.

The following describes, with reference to accompanying drawings, some human-computer interaction embodiments provided in this application.

In an embodiment, a host operating system (Host OS) runs on a first electronic device, and a guest operating system (Guest OS) runs on a second electronic device. The host operating system may be referred to as a first operating system, and the guest operating system may be referred to as a second operating system.

Figure 1B:
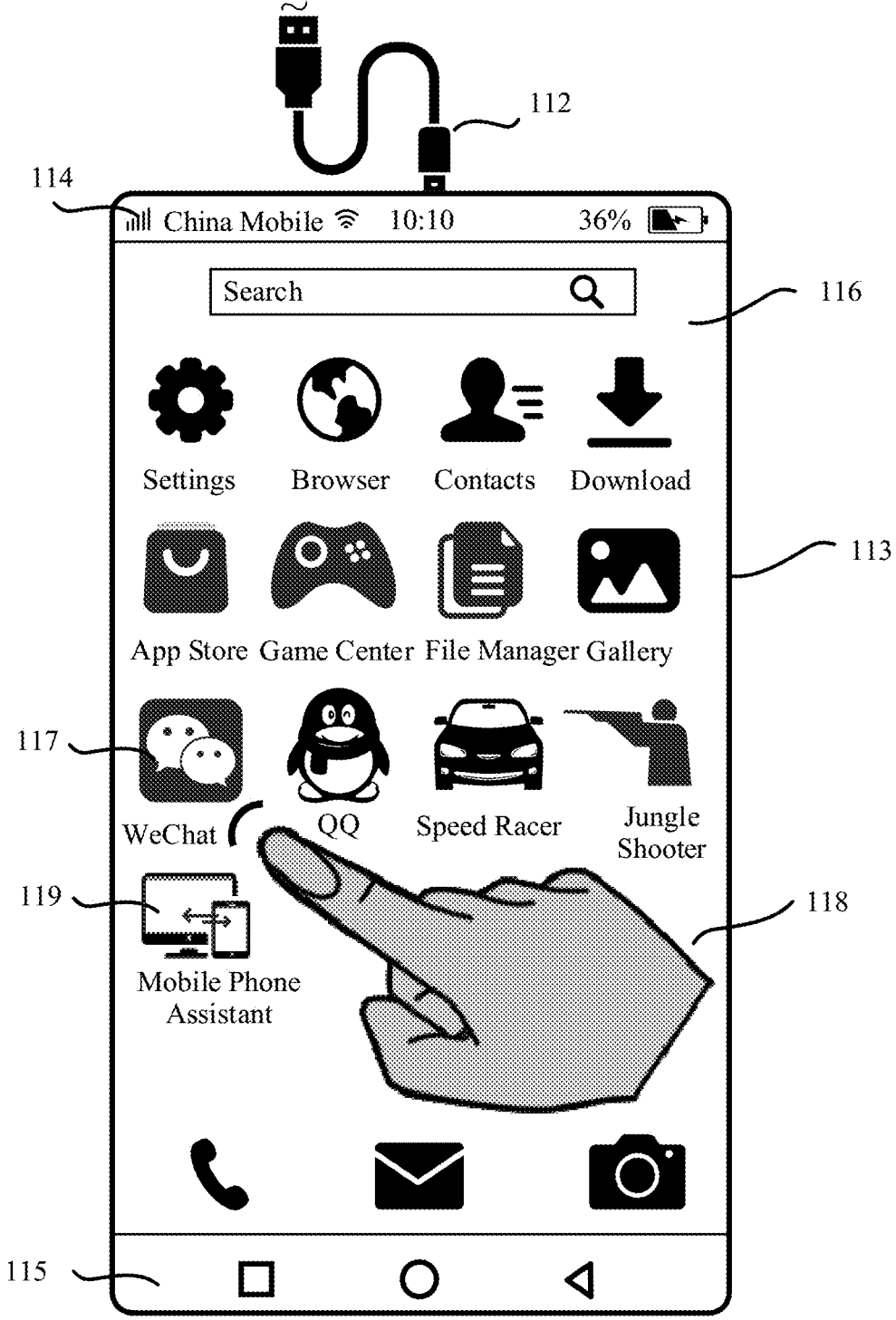

In an example, the host operating system is a Windows® operating system, and the guest operating system is an Android® operating system. The Windows® operating system runs on the first electronic device, and the first electronic device may be an electronic device that can run the Windows® operating system, such as a computer. The Android® operating system runs on the second electronic device, and the second electronic device may be an electronic device that can run the Android® operating system, such as a mobile phone or a tablet computer. For example, as shown in FIG. 1A and FIG. 1B, the first electronic device establishes a connection 112 to the second electronic device. A manner of establishing the connection 112 may be a wired communication manner (for example, a data cable in FIG. 1A and FIG. 1B), or may be a wireless communication manner (for example, Bluetooth or Wi-Fi). This is not limited in this embodiment of this application.

In an example, the host operating system running on the first electronic device is a Windows 10® operating system. A user interface displayed on the first electronic device may also be referred to as a first user interface. As shown in FIG. 1A and FIG. 1B, a user interface 101 of the Windows® operating system may also be referred to as a Windows® desktop 101, and visual elements on the Windows® desktop 101 may include a "start" button 102, a taskbar 103, a desktop wallpaper 104, an application icon 105, and the like. If a small arrow identifier 106 pointing to the upper right is displayed at a lower left corner of a personalized image of the application icon on the desktop, it indicates that the icon on the desktop is an application shortcut, and a user may double-click 107 by using a mouse to start an application program corresponding to the application shortcut.

The guest operating system running on the second electronic device is the Android® operating system. As shown in FIG. 1A and FIG. 1B, a user interface 113 of the Android® operating system may also be referred to as an Android® desktop 113, and visual elements on the Android® desktop 113 may include a status bar 114 (which may display information such as a network status, a battery level, and time), a navigation bar 115 (including a virtual button), a desktop wallpaper 116, an application icon 117, and the like. The application icon 117 is a display image of an application shortcut, and the user may touch and single-tap 118 to start an application program corresponding to the application shortcut.

After the first electronic device establishes the connection 112 to the second electronic device, a mirror desktop 109 of the Android® desktop 113 may be displayed on the Windows® desktop 101. The mirror desktop 109 may also be referred to as a first display area, and an area of the first user interface other than the first display area may be referred to as a second display area. A display interface of the mirror desktop 109 is the same as that of the Android® desktop 113. An application program named "mobile phone assistant" may be installed on the Windows 10® operating system and the Android® operating system, to facilitate the user to manage and operate data transmission between the first electronic device and the second electronic device. A name of the application program is not limited in this embodiment. A "mobile phone assistant" icon 108 may be created on the Windows® Desktop 101, and a "mobile phone assistant" icon 119 may be created on the Android® Desktop 113. An operation performed by the user on the mirror desktop 109 displayed in the host operating system may be synchronously transmitted to the guest operating system. For example, on the mirror desktop 109, the user single-clicks 111 an application icon 110 on the mirror desktop 109 by using the mouse. Upon data transmission between the first electronic device and the second electronic device, an application program that is on the second electronic device and that corresponds to the application icon may be started. Then, upon data transmission between the first electronic device and the second electronic device, the second electronic device may synchronously transmit an interface image of the application program to the mirror desktop 109, that is, the display interface of the mirror desktop 109 is maintained completely consistent with that of the Android® desktop 113. From a perspective of user experience, the user may directly control the application program of the second electronic device by performing a related operation on the mirror desktop 109 on the first electronic device.

On the mirror desktop 109, the user may single-click 111 the application icon 110 by using the mouse to start the corresponding application program. On the Windows® desktop 101, the user double-clicks 107 the application icon 105 by using the mouse to start a corresponding application program.

This application provides a method for creating and starting an application shortcut. An application icon corresponding to an application program in the guest operating system may be generated in the host operating system, and the application icon complies with an operation manner of the host operating system. By clicking the application icon in the host operating system, the corresponding application program in the guest operating system may be started.

Figures 2A, 2B:
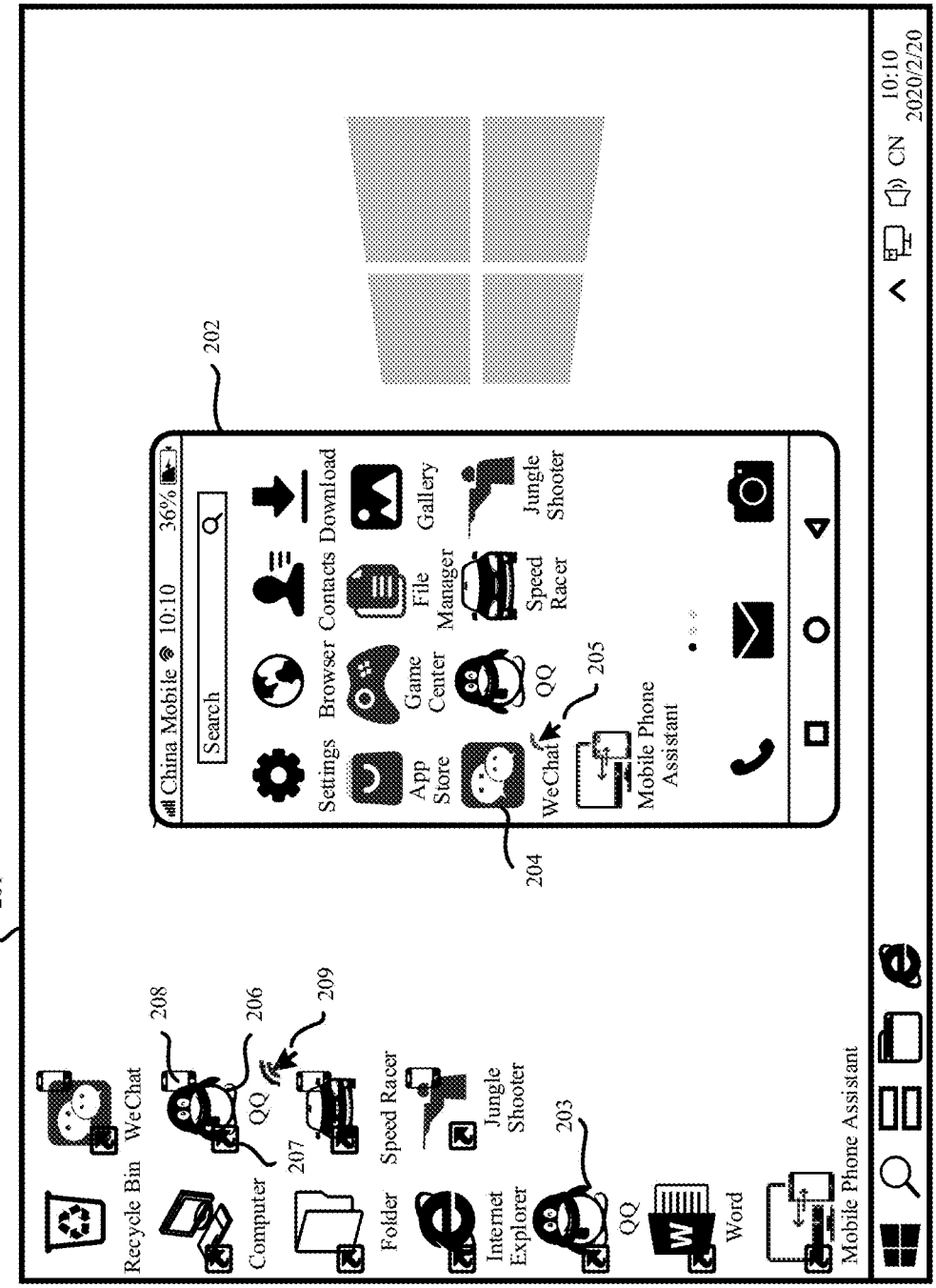
FIG. 2A and FIG. 2B are a schematic diagram of a user interface according to an embodiment of the present disclosure.
Figure 2B:
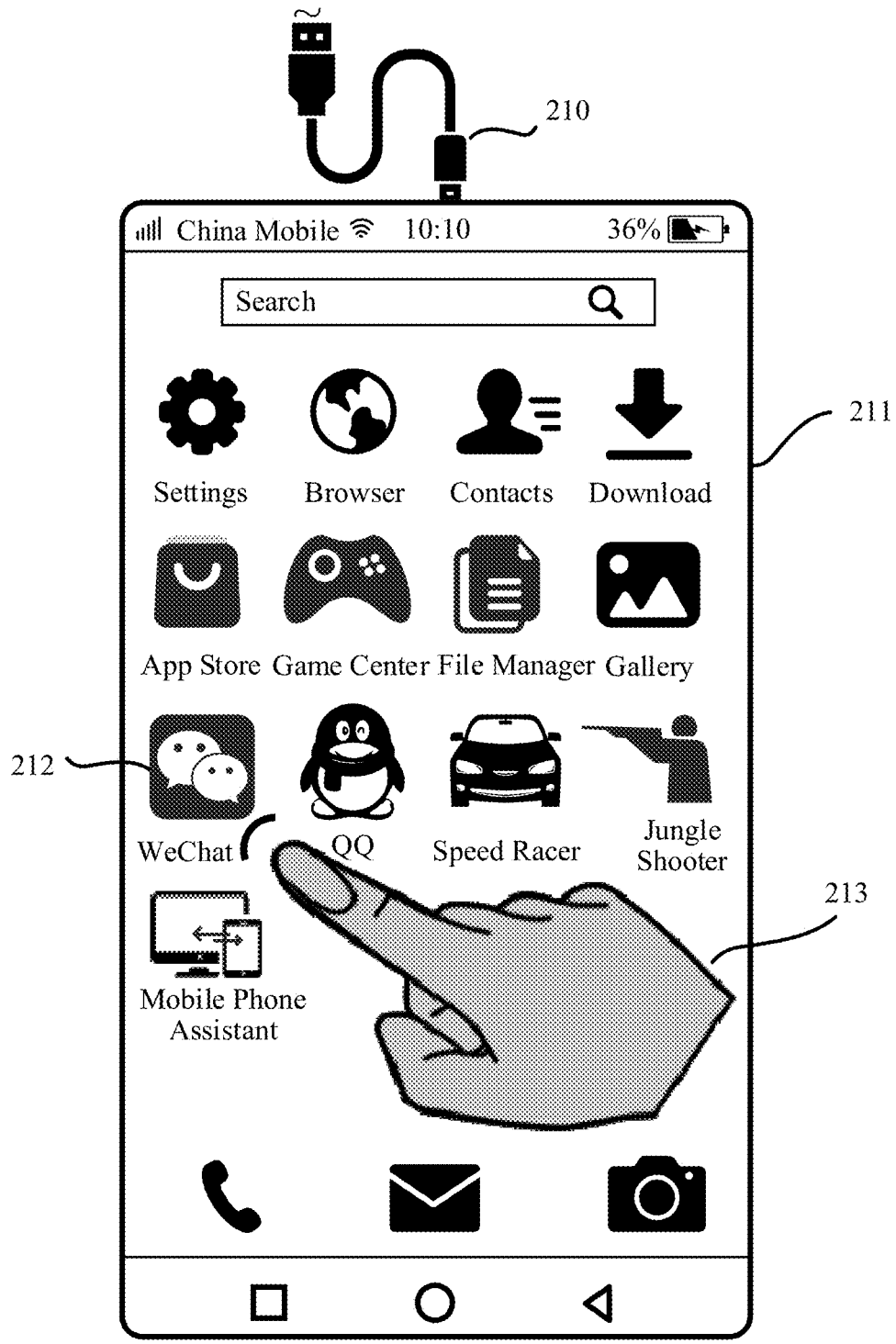

In an example, as shown in FIG. 2A and FIG. 2B, after the first electronic device establishes a connection 210 to the second electronic device, a mirror desktop 202 of an Android® desktop 211 may be displayed on a Windows® desktop 201, and a display interface of the mirror desktop 202 is completely consistent with that of the Android® desktop 211 of the second electronic device. The Windows® desktop 201 includes an application icon 203, and the user may double-click 209 the application icon 203 by using the mouse to start a corresponding application program. On the mirror desktop 202, the user may single-click 205 an application icon 204 by using the mouse to start a corresponding application program. On the Android® desktop 211 of the second electronic device, the user may touch and single-tap 213 an application icon 212 to start an application program corresponding to the application shortcut. This application provides a method, so that an application icon 206 corresponding to an application program on the second electronic device may be generated on the Windows® desktop 201. The user may double-click 209 the application icon 206 by using the mouse to start the corresponding application program in the guest operating system. A small arrow identifier 207 pointing to the upper right may be displayed at a lower left corner of the application icon 206, to indicate that the application icon 206 is an application shortcut. In addition, a special identifier 208, also referred to as a first identifier, for example, a small icon in a style of a mobile phone, may be added to an upper right corner of the application icon 206 to indicate that the application icon 206 is an application shortcut of an application program in the guest operating system. The mark of the special identifier 208 helps the user to quickly identify the application shortcut from the guest operating system, and distinguish from the native application shortcut 203 in the host operating system. The special identifier may be a text, or may be a pattern. A form of the special identifier is not limited in this application. For example, the application shortcut 203 is displayed as an application icon of an application QQ®, the application shortcut 203 points to a QQ® application program installed on the first electronic device, and when the application shortcut is opened, the started QQ® application program runs on the first electronic device. Differently, the application shortcut 206 is also displayed as an application icon of the application QQ®, the application shortcut 206 points to a QQ® application program installed on the second electronic device, and when the application shortcut is opened, the started QQ® application program runs on the second electronic device.

In an example, as shown in FIG. 2A and FIG. 2B, on the Windows® desktop 201, the application icon 206 of the application shortcut from the guest operating system may be arranged in a flat manner with the native application icon 203 of Windows®, whose positions may be freely moved and arrangement order may be changed based on a user operation.

Figures 3A, 3B:
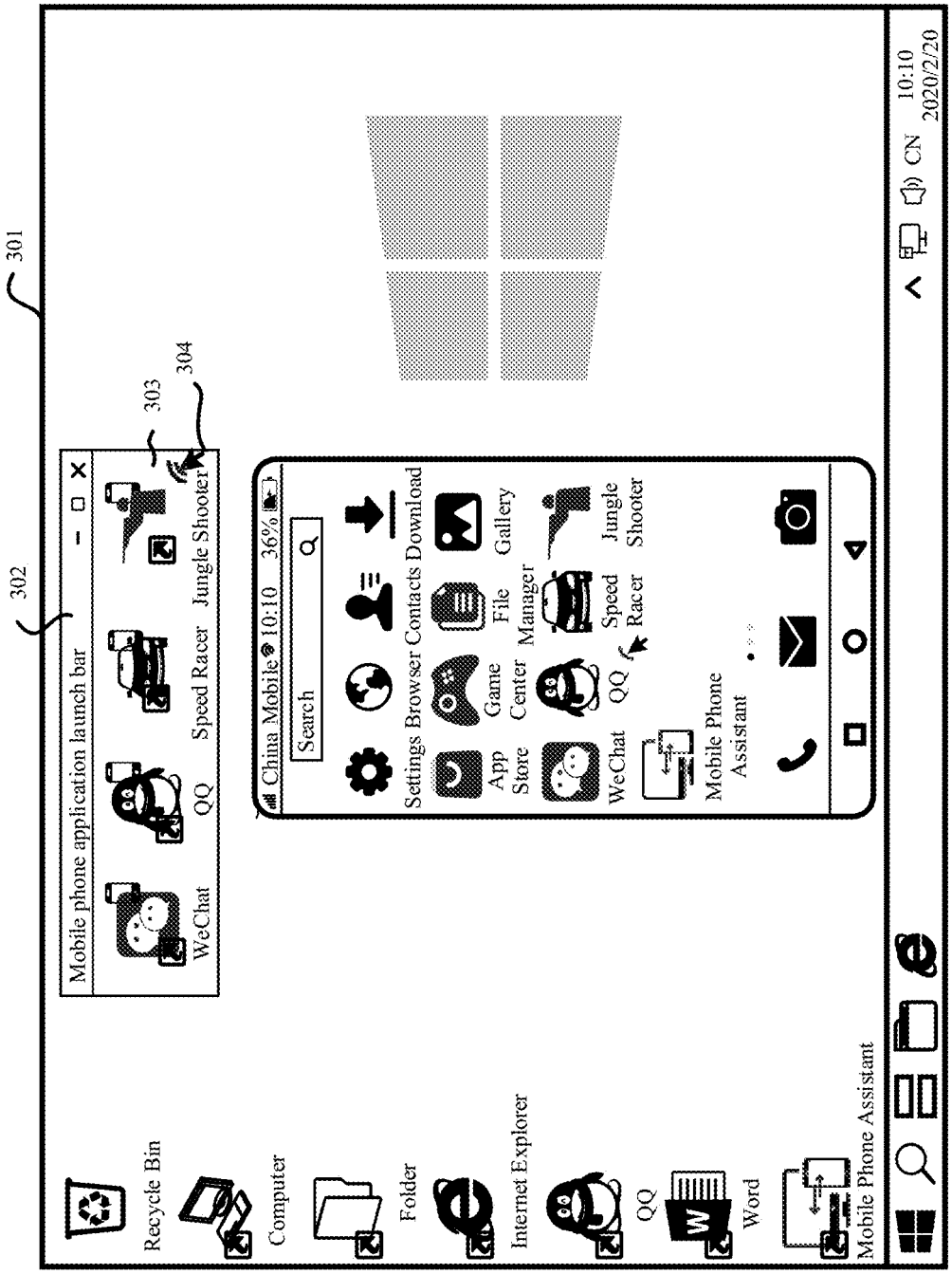
FIG. 3A and FIG. 3B are a schematic diagram of a user interface according to an embodiment of the present disclosure.
Figure 3B:
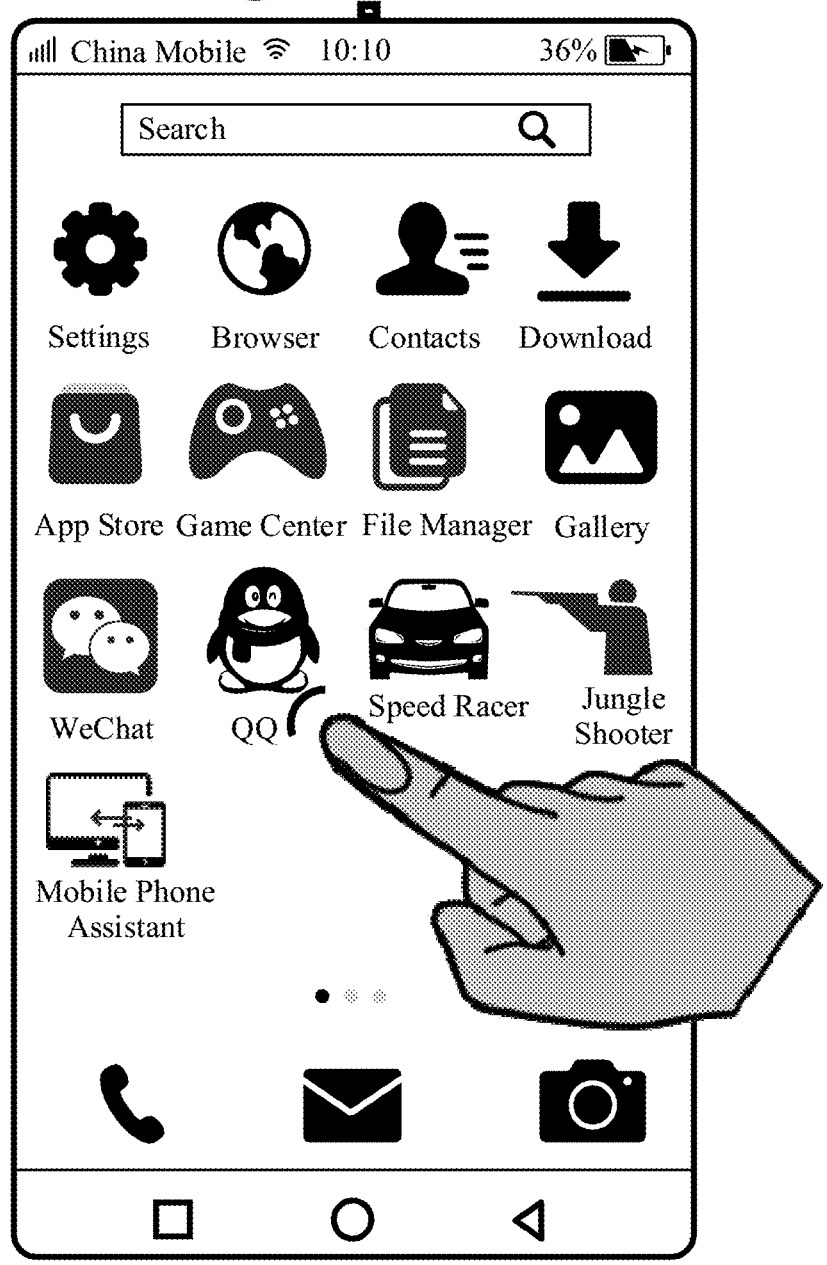

In another example, as shown in FIG. 3A and FIG. 3B, a window 302, also referred to as a third display area, for example, named "mobile phone application launch bar", may be created on a Windows® desktop 301, to place an application icon 303 pointing to an application program in the guest operating system. The user may double-click 304 the application icon 303 by using the mouse to start the corresponding application program in the guest operating system. The window "mobile phone application launch bar" 302 may be a window at a fixed position, or may be a window that can be moved freely, or may be formed in a style of a sidebar. The window 302 may be hidden at a position such as a side, an upper part, or a corner of the Windows® desktop 301 when not in use. The hidden window may be referred to as a first hidden area. The window 302 may be called out by performing a fifth user operation, for example, moving a mouse pointer to an edge of the Windows® desktop 301 and staying for some time. User interface designs such as a style and a name of the window "mobile phone application launch bar" 302, and a user operation manner of calling out the window 302 are not limited. Existence of the window "mobile phone application launch bar" 302 helps centrally place and manage the application icon 303 pointing to the application program in the guest operating system, so that the user can quickly identify an application shortcut from the guest operating system, and distinguish from a native application shortcut in the host operating system, thereby improving UI experience of the user.

Figures 4A, 4B:
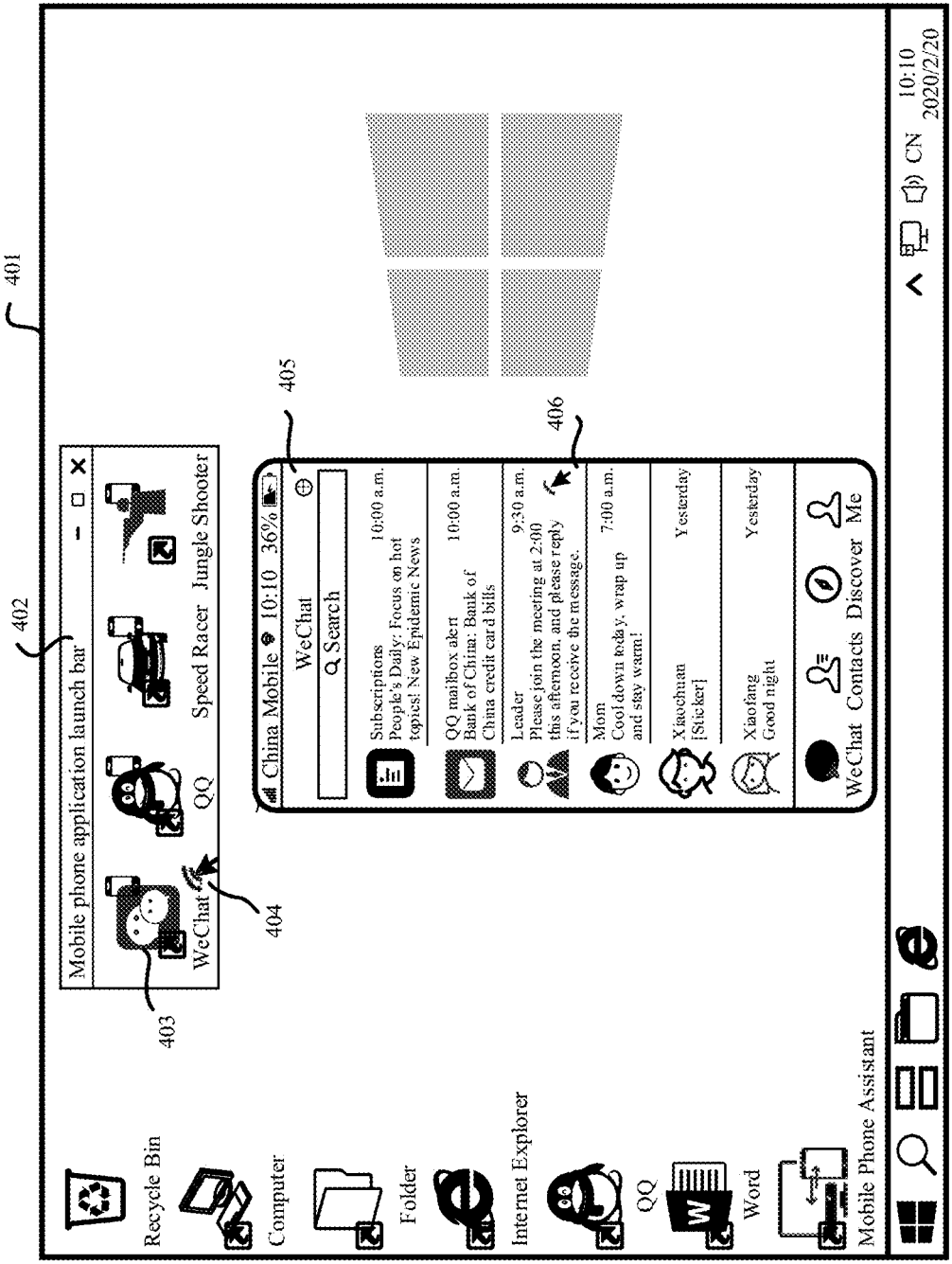
FIG. 4A and FIG. 4B are a schematic diagram of a user interface according to an embodiment of the present disclosure.
Figure 4B:
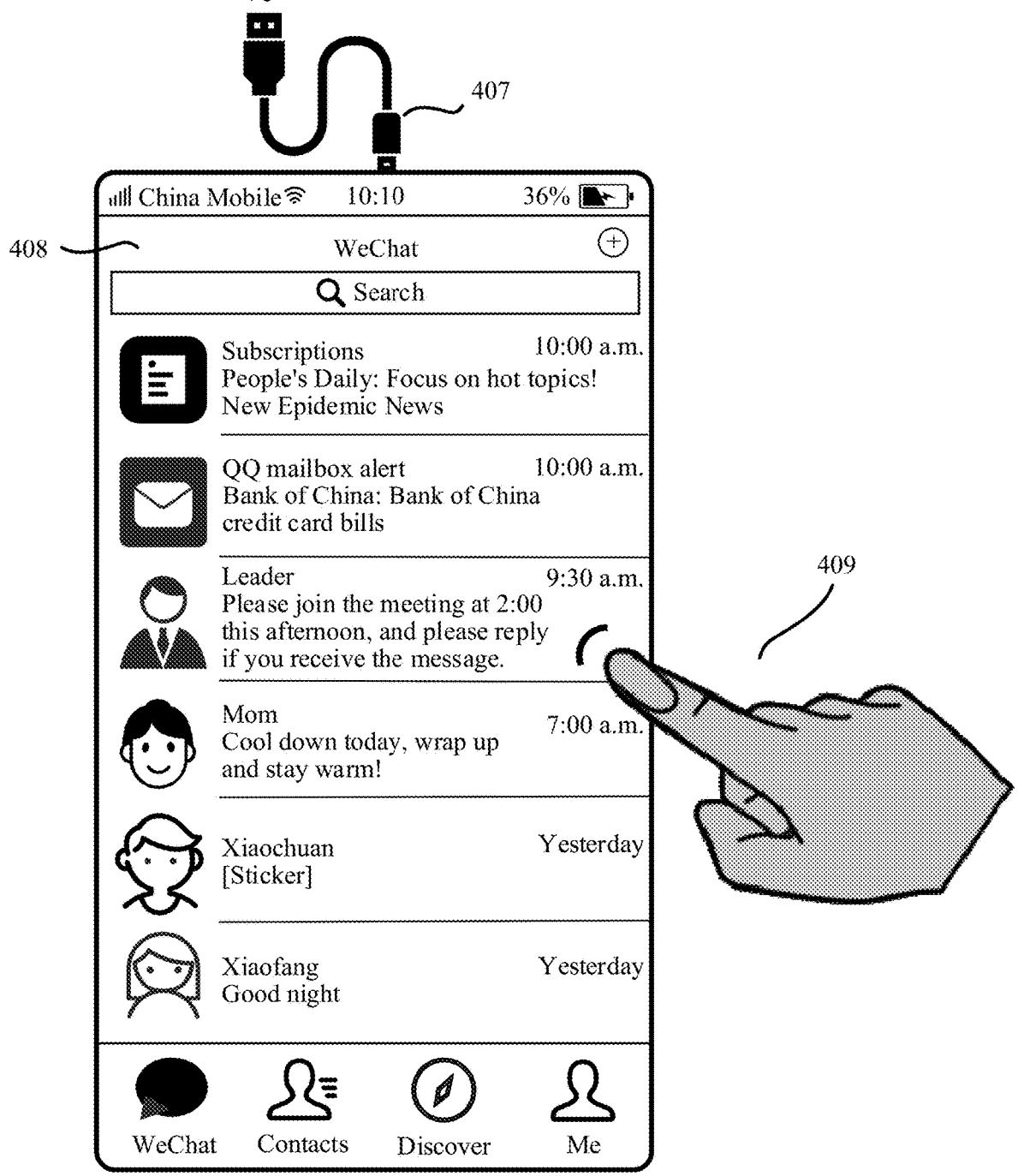

In an example of FIG. 4A and FIG. 4B, after establishing a connection 407, the first electronic device and the second electronic device may transmit data to each other. A Windows® desktop 401 includes a window "mobile phone application launch bar" 402, and a plurality of application icons that can be used to start application programs on the second electronic device are arranged in the window "mobile phone application launch bar" 402. An application program WeChat® is used as an example. The user may double-click 404, by using the mouse, a WeChat® application icon 403 located on the Windows® desktop 401, to start a corresponding WeChat® application program in the Android® operating system of the second electronic device. After the WeChat® application program is started, a user interface 408 of WeChat® is displayed on the second electronic device, and data of an image of the user interface is synchronously transmitted to the Windows desktop 401, and is displayed as a mirror user interface 405 consistent with the image of the user interface 408. The user may open, in the mirror user interface 405, a dialog box by single-clicking 406 by using the mouse, or open, on the second electronic device, a dialog box by touching and single-tapping 409 in the user interface 408 of WeChat®, to perform a next step of a WeChat® chat. It should be noted that, regardless of whether the user operates in the user interface 408 of WeChat® on the second electronic device or the mirror user interface 405 of WeChat® on the first electronic device, the user interface 408 of WeChat® on the second electronic device and the mirror user interface 405 of WeChat® on the first electronic device synchronously respond to an operation instruction of the user, and maintain image consistency. Herein, due to a limitation of a current technology, data transmission between the first electronic device and the second electronic device has a specific time delay. Therefore, the "synchronously respond" means being within a specific time interval, which is generally a time interval that the user is unaware of or has little impact on an operation of the application, for example, 0.2 second.

Figure 5A:
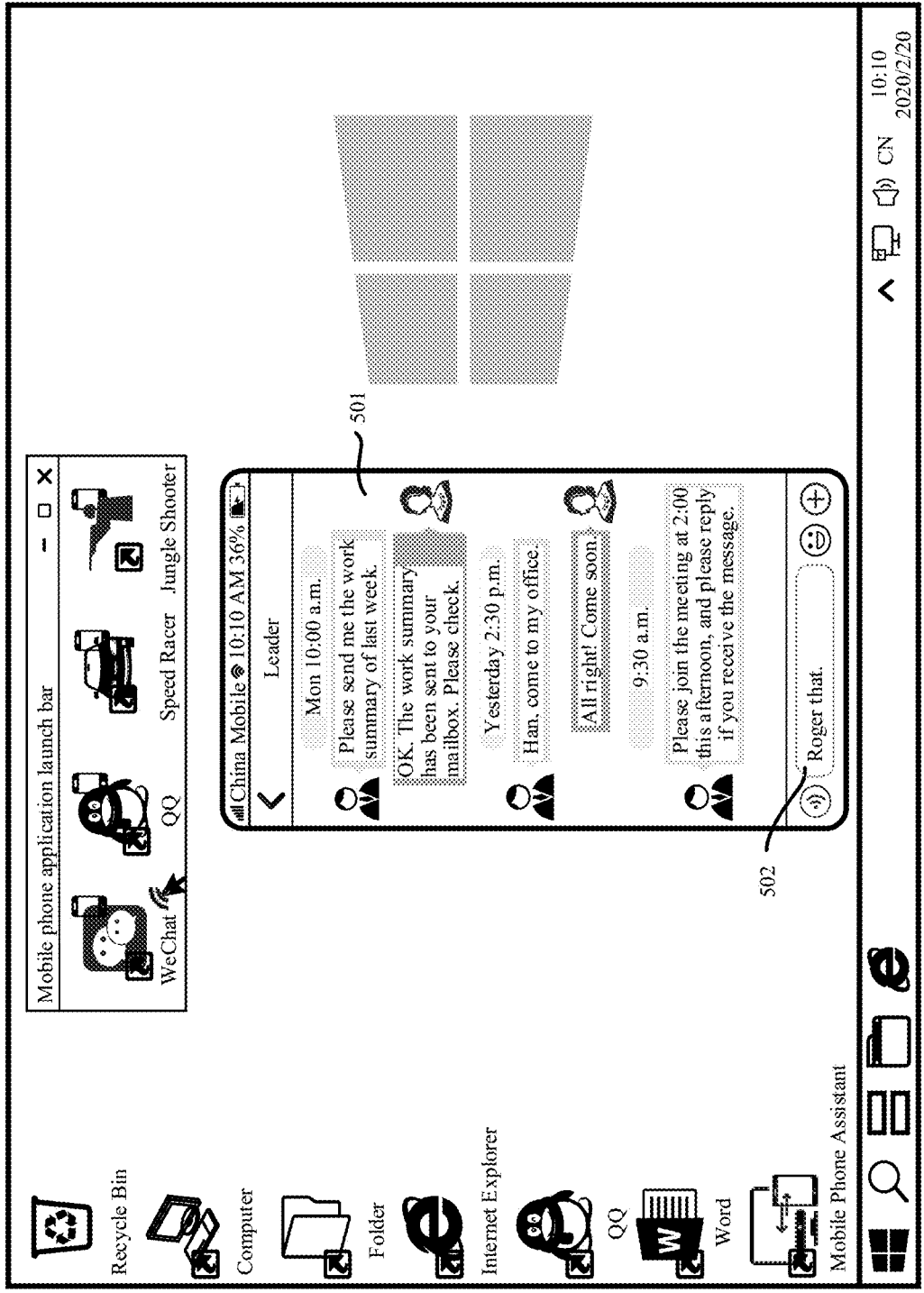
FIG. 5A and FIG. 5B are a schematic diagram of a user interface according to an embodiment of the present disclosure.
Figure 5B:
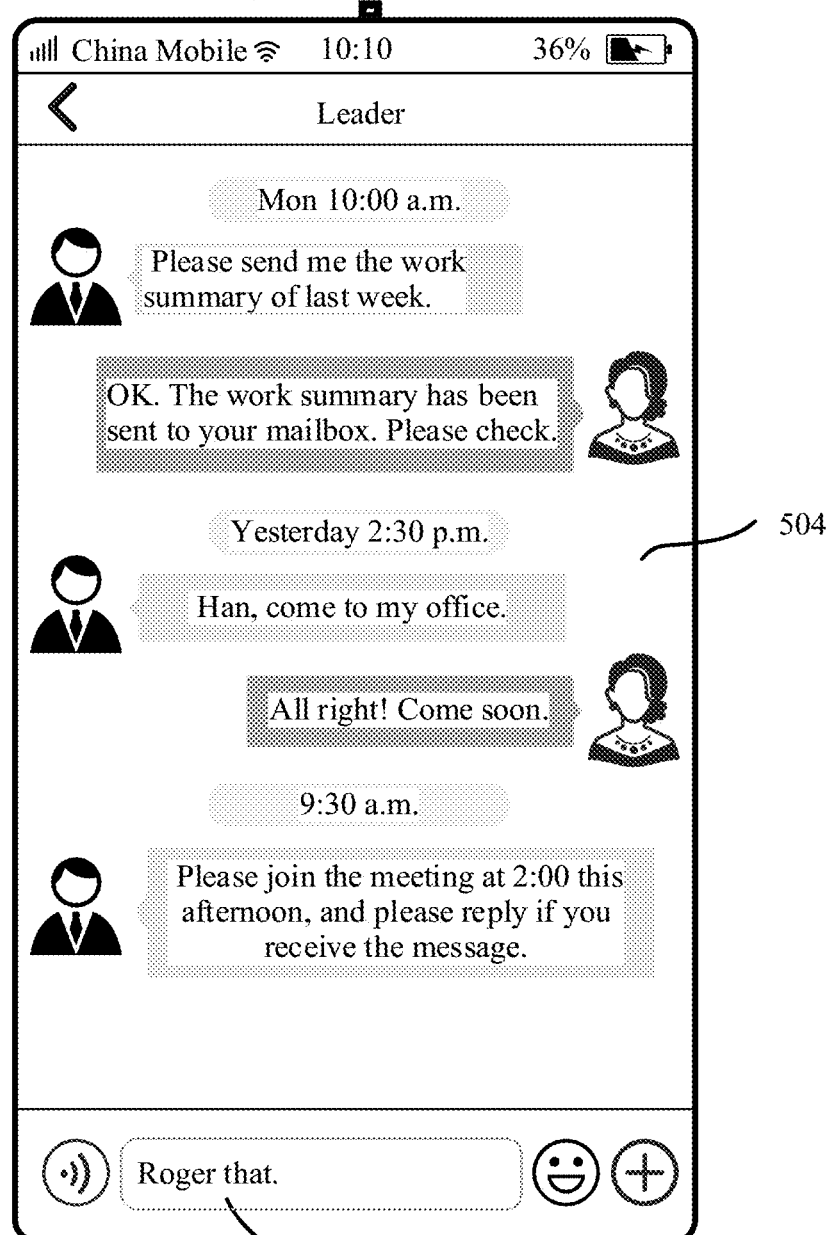

In an example, the user clicks to open a dialog box of a WeChat® contact named "leader" shown in FIG. 4A and FIG. 4B, and a user interface shown in FIG. 5A and FIG. 5B may be displayed. A mirror user interface 501 displayed on the first electronic device is a WeChat® chat interface between the user and the contact, and a same WeChat® chat interface is also displayed in a user interface 504 on the second electronic device. The first electronic device and the second electronic device have established a connection 503, and therefore may transmit data to each other. For example, a character 502 is entered in the WeChat® chat dialog box in the mirror user interface 501 on the first electronic device, and a same character 505 is also displayed in the user interface 504 on the second electronic device. Conversely, if the user enters the character 505 in the WeChat® chat dialog box in the user interface 504 on the second electronic device, the same character 502 is also displayed in the mirror user interface 501 on the first electronic device.

Figure 6A:
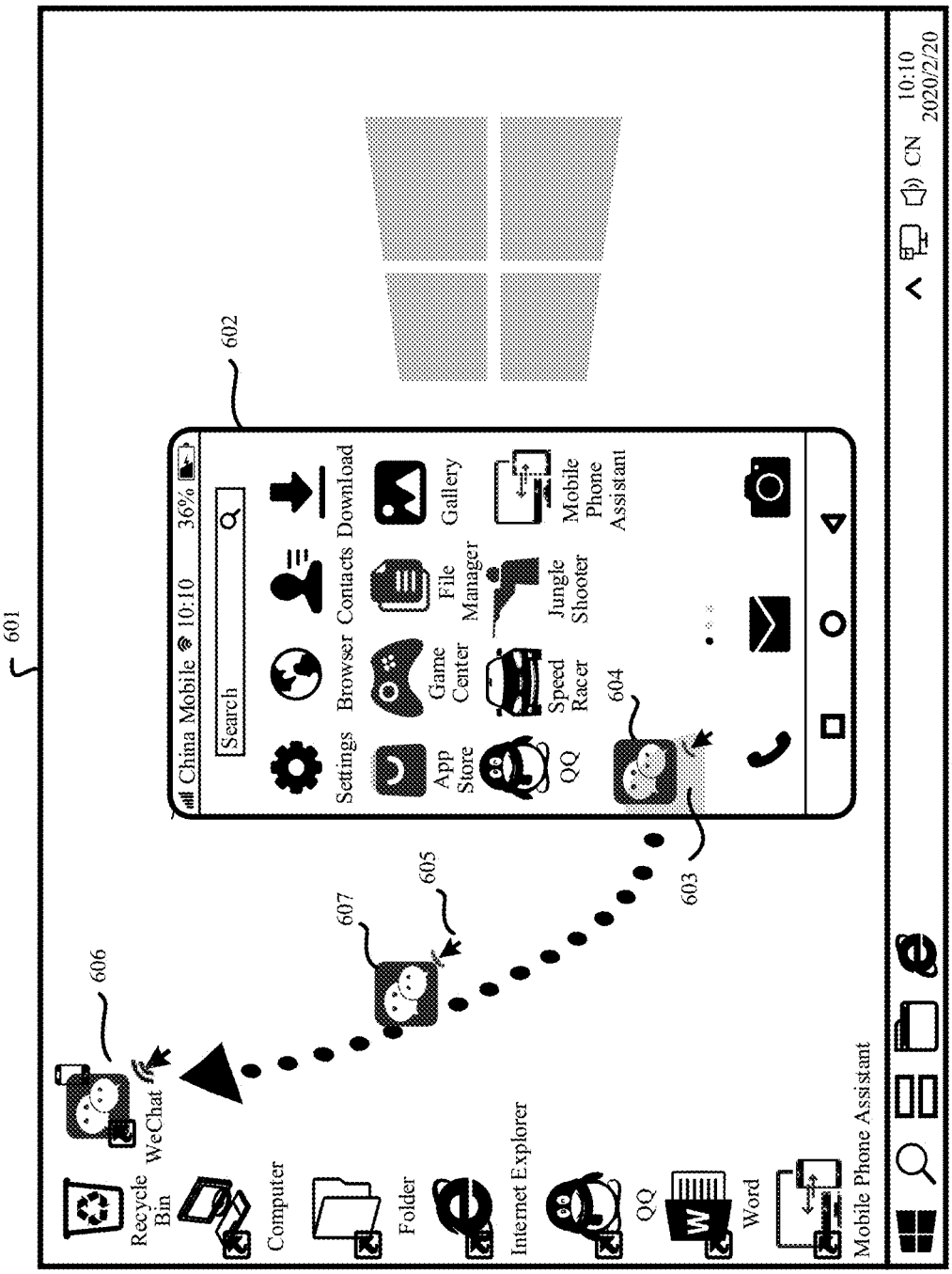
FIG. 6A and FIG. 6B are a schematic diagram of a user interface according to an embodiment of the present disclosure.
Figure 6B:
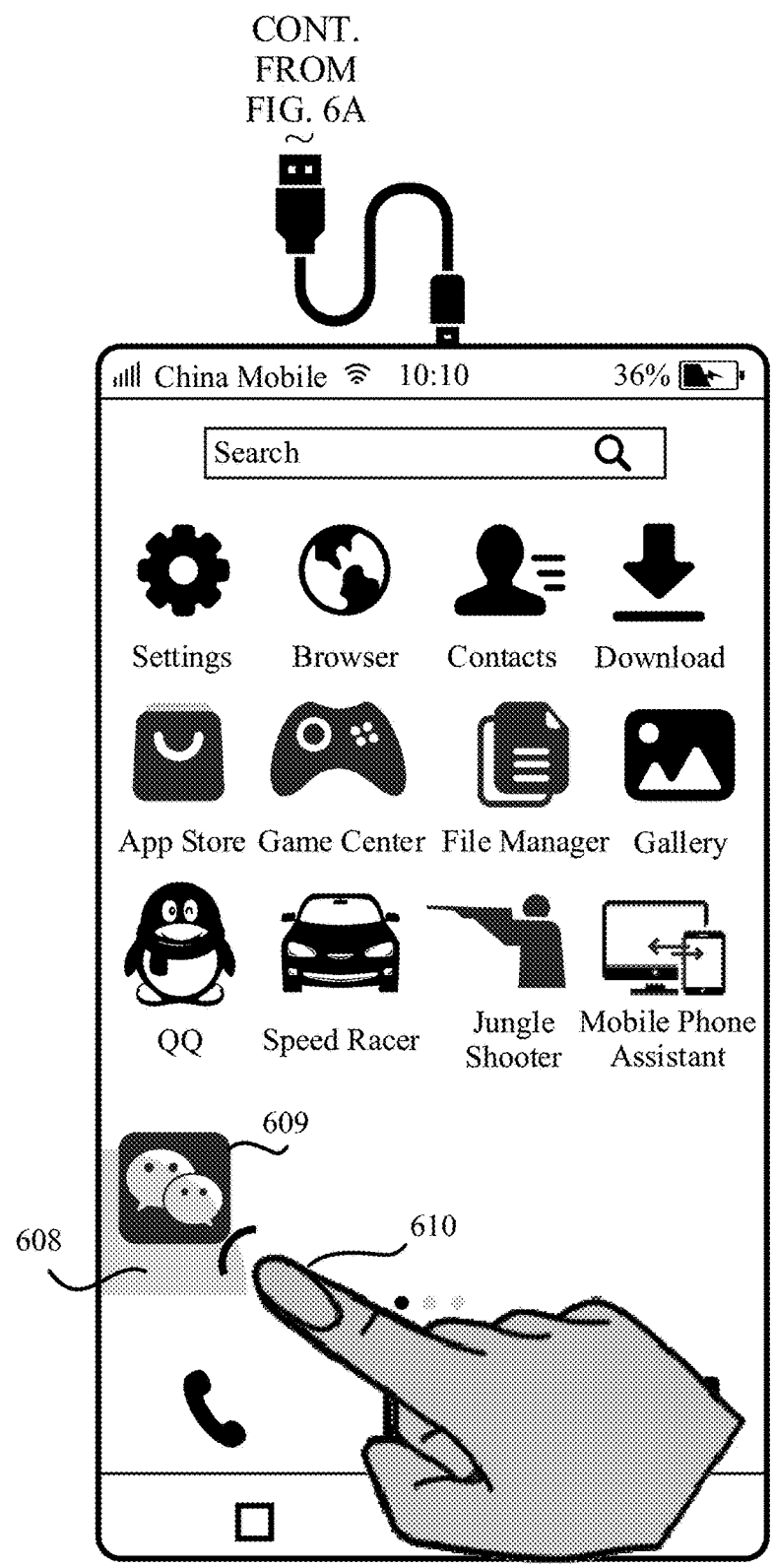

The user may trigger, by performing some specific operations or actions, a corresponding application shortcut to be generated in the host operating system for an application program in the guest operating system. In an example of FIG. 6A and FIG. 6B, a hot area 608 may be established on the second electronic device, and in a mirror user interface 602 on the first electronic device, there is a mapped hot area 603 of the hot area 608. The hot area 608 is also referred to as a second area. The mapped hot area 603 is also referred to as a first area. The mapped hot area 603 in the mirror user interface 602 of the first electronic device may be displayed as a ¼ circular gray translucent area at a lower left corner, and a same area is displayed as the hot area 608 of the user interface of the second electronic device. The hot area refers to defining an area in the user interface and the area may be triggered to obtain a corresponding response, for example, linking to a specified address or configuring corresponding data. A shape style and a position of the hot area 608 or the mapped hot area 603 are not limited in this application. The hot area may be located at a position such as a lower left corner, a lower right corner, or a side edge of the user interface, and a shape may alternatively be displayed as a strip shape, a square block shape, or the like.

In an example, the user may drag an Android® application icon 604 in the mirror user interface 602 to the mapped hot area 603, and then release the mouse. The dragging operation may be referred to as a third user operation. Alternatively, the user drags 610 an Android® application icon 609 on the second electronic device to the hot area 608 by a finger on a second electronic device side, and then releases pressing of the finger. The dragging operation may be referred to as a fourth user operation. In this case, a pop-up box may appear on an Android® desktop, asking the user whether it is necessary to create an application shortcut for a selected application program. After the user selects "yes", a corresponding application shortcut 606 is created and generated on a Windows® desktop 601, and the user may directly double-click by using the mouse to start the application program corresponding to the application shortcut 606.

In another example, the user may drag the Android® application icon 604 in the mirror user interface 602 to an edge of the mirror user interface 602, and then continue the dragging out of the mirror user interface 602 to the Windows® desktop 601. In this case, the first electronic device may be triggered to create a first application shortcut. When the user drags the Android® application icon 604 to the edge of the mirror user interface 602, the user may trigger, by triggering the mapped hot area 604 or in another manner, the first electronic device to create the first application shortcut. After the user drags out the Android® application icon 604, a look of the dragged application icon 607 is displayed on the Windows® desktop 601 along with a position of the mouse pointer, to facilitate the user to track a specific position. The dragging operation may also be referred to as a second user operation. After the Android® application icon 604 is moved to any position on the Windows® desktop 601, a corresponding application shortcut 606 is created and generated on the Windows® desktop 601, and the user may directly double-click by using the mouse to start an application program corresponding to the application shortcut 606.

In this process, when the Android® application icon 604 is dragged to the edge of the Android® desktop, that is, the hot area 603, an information receiving process is triggered. The process causes a virtual application process supporting running of the mirror user interface 602 to send synchronization information to the Windows® operating system. The synchronization information may include: coordinate information of the application icon 604 departing from the edge of the mirror user interface 602, and application information such as an application package name and application icon data. Then, after the Windows® operating system receives the synchronization information, coordinate position information of a junction with the mirror user interface 602 on the Windows® desktop 601 side is calculated based on the coordinate information and a relative position of the mirror user interface 602 on the Windows® desktop 601. The coordinate position is defined as a departure position. Then, the first electronic device draws and displays the dragged application icon from the departure position, and then dynamically draws and displays the application icon based on a position of a mouse pointer and a moving track of the mouse pointer, to form a display effect of a dragging animation. When the user drags the application icon 604 to a position on the Windows® desktop 601 and releases the mouse pointer, the first electronic device creates and generates, on the Windows® desktop 601, the application shortcut 606 corresponding to the application icon.

Similarly, if the user drags an application icon from the Windows® desktop 601 to the mirror user interface 602, the first electronic device reversely sends synchronization information to the second electronic device. The synchronization information may include start coordinate position information of the application icon entering the mirror user interface 602 from the Windows® desktop 604, and application information such as an application package name and application icon data. After receiving the synchronization information, the second electronic device calculates a corresponding coordinate position in the mirror user interface based on the coordinate position information, draws the dragged application icon from the coordinate position, and then dynamically draws and displays the application icon based on a position of the mouse pointer and a moving track of the mouse pointer, to form a display effect of a dragging animation.

Further, the user operation of dragging is not limited to an icon, and a file, a picture, or the like may also be dragged. A manner of generating a display effect of a dragging animation may alternatively be as shown above, and details are not described herein again.

Figure 7A:
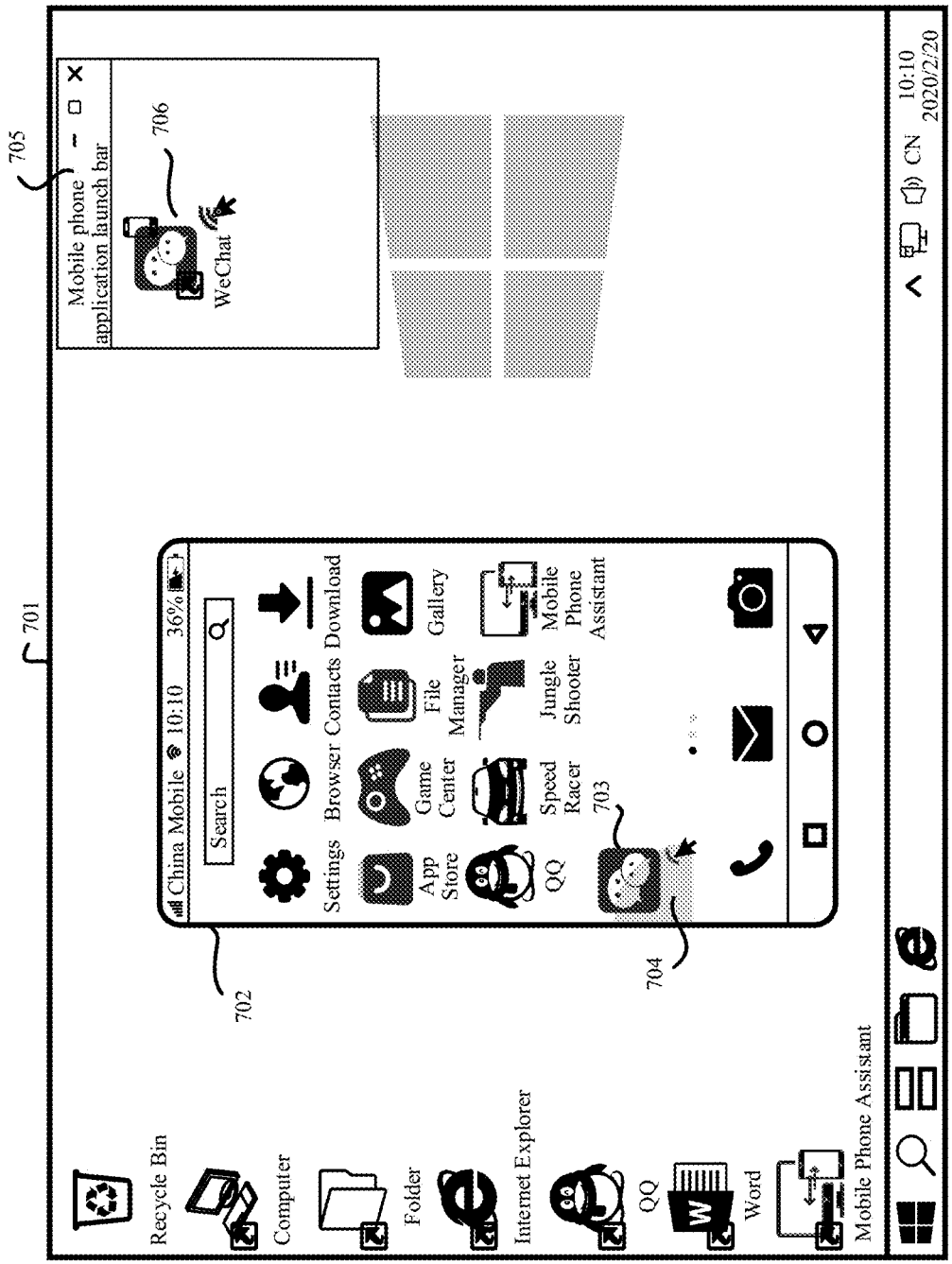
FIG. 7A and FIG. 7B are a schematic diagram of a user interface according to an embodiment of the present disclosure.
Figure 7B:
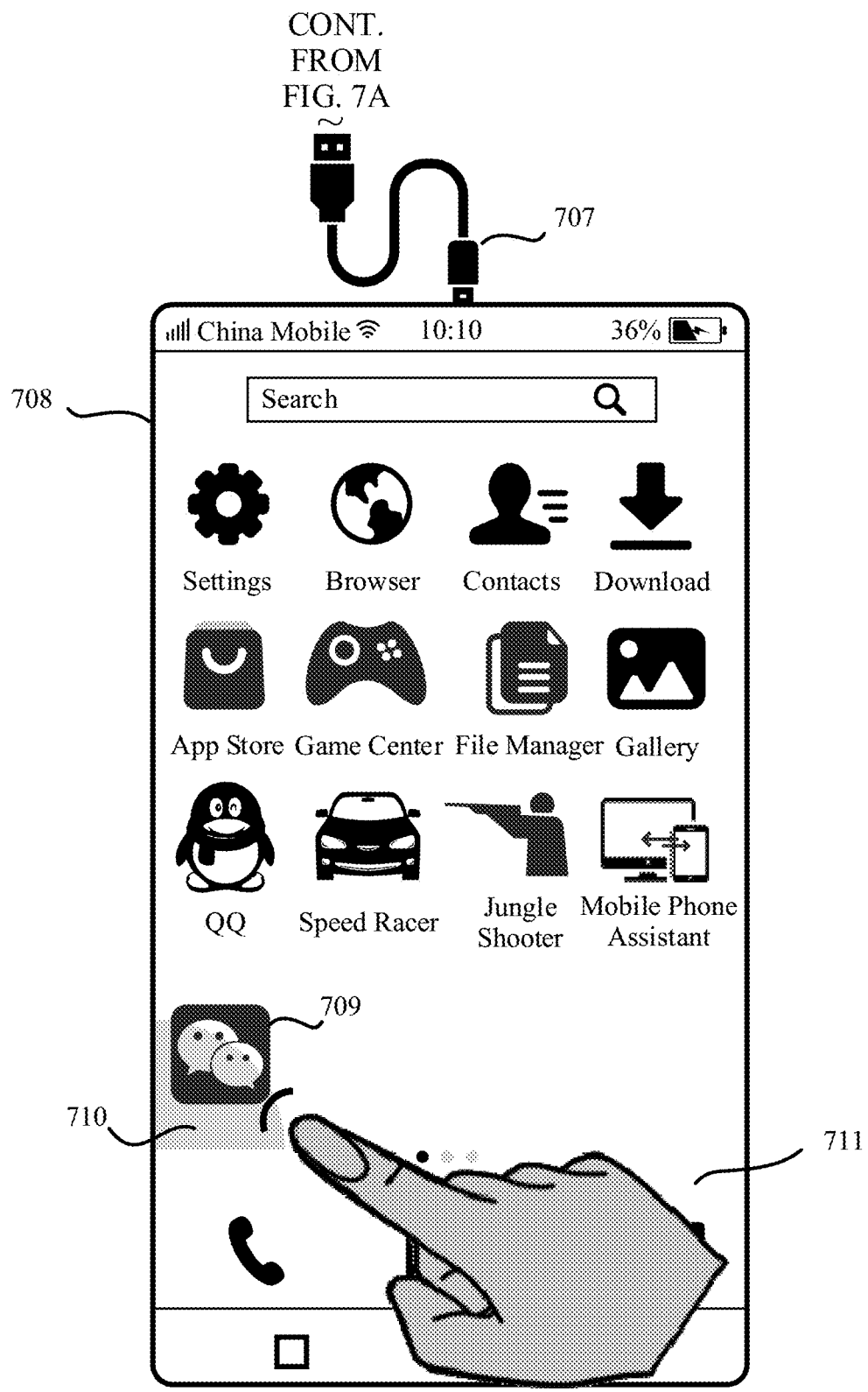

In an example of FIG. 7A and FIG. 7B, a window or an area, for example, a window 705 named "mobile phone application launch bar", may be specified on a Windows® desktop 701, to display an application shortcut 706 of an Android® application program. The user may drag an Android® application icon 703 in a mirror user interface 702 to a hot area 704, and then release a mouse button, to create, in the window 705 named "mobile phone application launch bar", the application shortcut 706 corresponding to the Android® application icon 703. The user may directly double-click by using the mouse to start the application program corresponding to the application shortcut 706. The first electronic device and the second electronic device have established a connection 707 and may transmit data to each other. A mirror application interface 702 on the first electronic device and an application interface 708 on the second electronic device maintain image consistency. There is also a same hot area 710 in the application interface 708 on the second electronic device. The user may drag an Android® application icon 709 in the user interface 708 of the second electronic device to the hot area 710, and then release finger touch 711. Similarly, on the Windows® desktop 701 of the first electronic device, the application shortcut 706 corresponding to the Android® application icon 709 is created and generated in the window 705 named "mobile phone application launch bar". In this example, the user may either perform, on the first electronic device, the operation of dragging the Android® application icon 703 in the mirror user interface 702 to the hot area 704 by using the mouse, or perform, on the second electronic device, the operation of dragging the Android® application icon 709 in the user interface 708 of the second electronic device to the hot area 710 by finger touch. In both case, after the Android® application icon is released, the application shortcut 706 corresponding to the Android R application icon can be created and generated in the window 705 named "mobile phone application launch bar" on the Windows® desktop 701 of the first electronic device. The user may directly double-click by using the mouse to start the application program corresponding to the application shortcut 706.

Figure 8A:
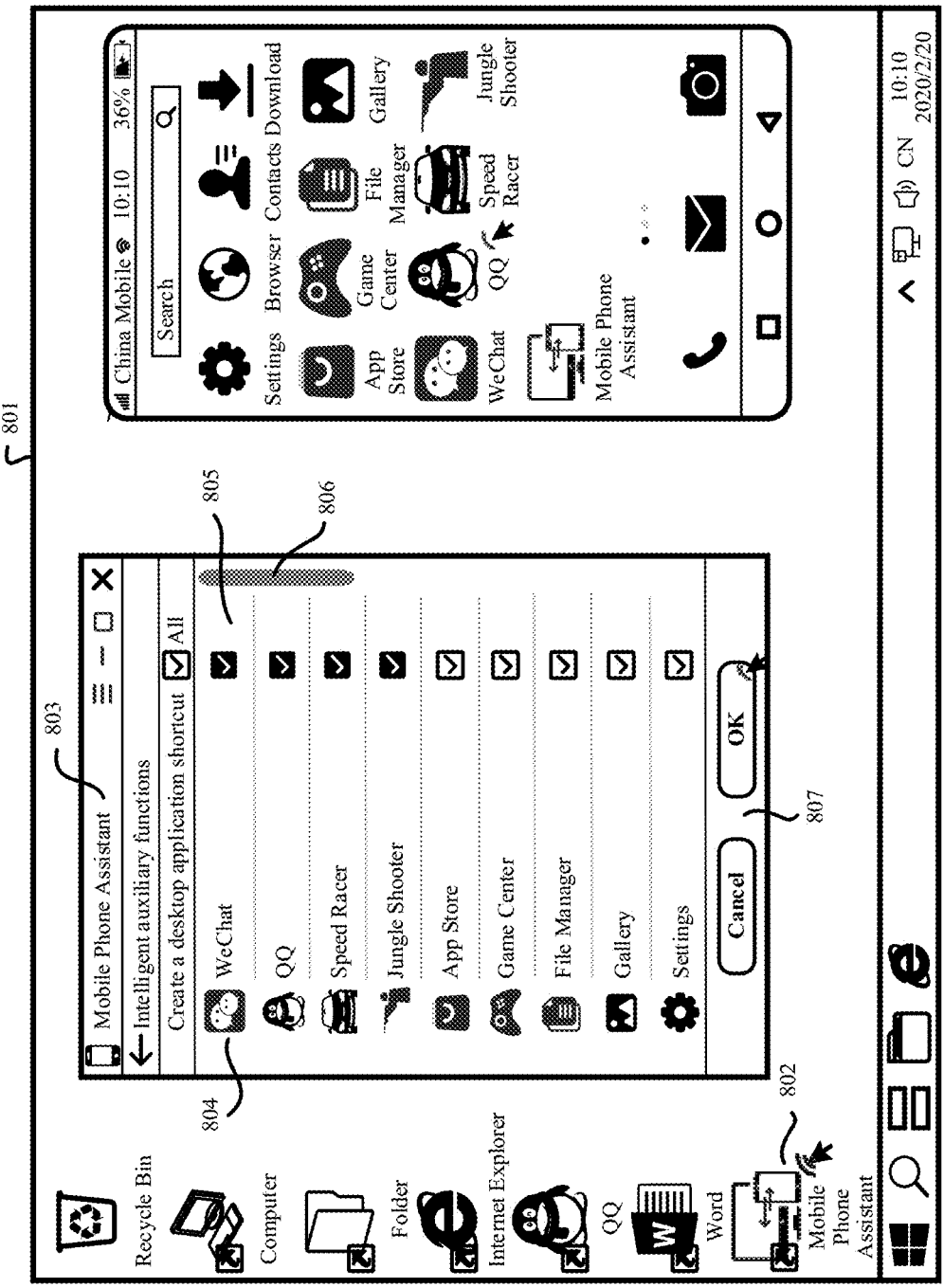
FIG. 8A and FIG. 8B are a schematic diagram of a user interface according to an embodiment of the present disclosure.
Figure 8B:
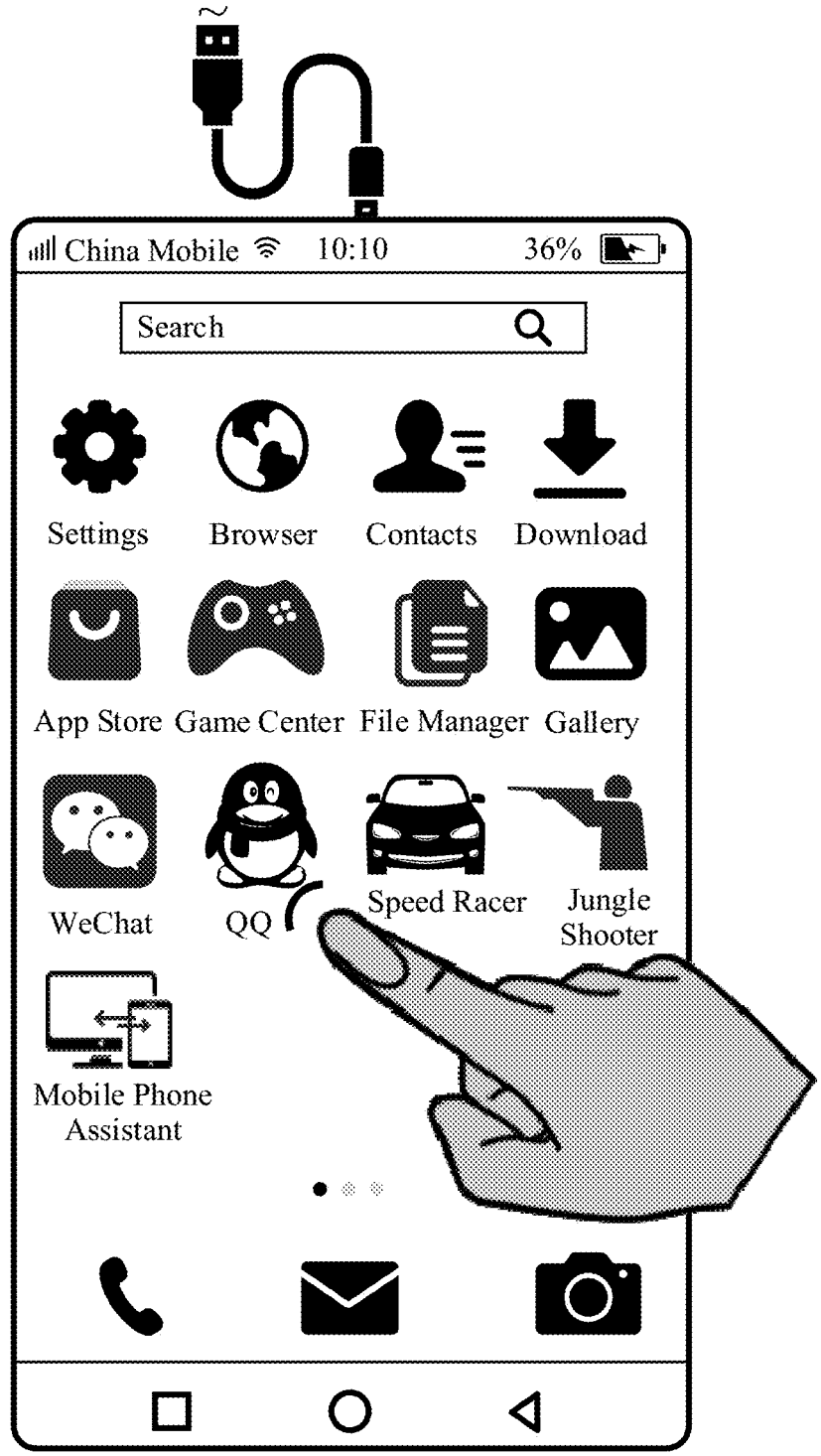

In an example of FIG. 8A and FIG. 8B, an application program "mobile phone assistant" 802 may be used to manage and select an Android® application shortcut that needs to be created on a Windows® desktop 801. A management interface of the application program "mobile phone assistant" 802 may be displayed on the first electronic device, and may also be displayed on the second electronic device. As shown in FIG. 8A and FIG. 8B, the management interface 803 of the "mobile phone assistant" may include such a window in which the user may autonomously select an application program for which an application shortcut needs to be created, which may also be referred to as a fifth user operation. When the management interface of the application program "mobile phone assistant" is displayed on the first electronic device, the fifth user operation may occur on the first electronic device. When the management interface of the application program "mobile phone assistant" is displayed on the second electronic device, the fifth user operation may occur on the second electronic device. The management interface 803 of the "mobile phone assistant" may include a selection bar 804 of application programs, which is also referred to as a first list, and displays icons and names that correspond to the application programs, to facilitate identification and differentiation of the user. Correspondingly, there are check boxes 805 on the right of the icons and the names of the application programs. The check boxes 805 are options for the user to select a plurality of items, and the user may select one or more of the options. The check boxes 805 are on-off options. When a check box 805 is selected, an identification block "☐" of the check box 805 is marked with "√". When the identification block displayed with the mark "√" is single-clicked, this option is canceled. In addition, an "all" check box may be further set. When the "all" check box is selected, all the options are selected. There may be a scrollbar 806 on a right side of the window of the selection bar 804, and an option that is not displayed in the current window may be viewed by pulling down or pulling up the scrollbar. Buttons 807 such as "ok" and "cancel" are set in a lower part of the window of the selection bar 804, and the buttons may be single-clicked to perform related operations. A setting in the selection bar 804 may be made effective by single-clicking the "ok" button, and the setting may be canceled by single-clicking the "cancel" button. For example, in the dialog box that is in the management interface 803 of the "mobile phone assistant" and that is configured to create a desktop application shortcut, after options named WeChat®, QQ®, "Speed Racer", and "Jungle Shooter" are selected, the "ok" button is clicked to generate, on the Windows® desktop 801, application shortcuts corresponding to the Android® application programs, as in the user interface shown in FIG. 2A and FIG. 2B or FIG. 3A and FIG. 3B. An application shortcut newly generated on the Windows® desktop 801 may be opened by mouse double-clicking, to start a corresponding application program in the Android® operating system.

In an example, when the first electronic device and the second electronic device are in a disconnected state, the created first application shortcut is not displayed in the user interface of the first electronic device. When the connection is performed again, the previously created first application shortcut is displayed in the user interface of the first electronic device again.

In an example, if the user deletes or uninstalls the first application program, correspondingly, the first application shortcut corresponding to the first application program is also deleted as commanded.

In another embodiment, both a host operating system (Host OS) and a guest operating system (Guest OS) run on a first electronic device, and the first electronic device may be an electronic device such as a computer. In this embodiment, the guest operating system runs in the host operating system in a form such as an emulator or a virtual machine. The host operating system virtualizes, for the guest operating system, a virtual hardware environment (including a processor, a memory, an I/O device, and the like) independent of actual hardware, so that for the guest operating system, running in the virtual hardware environment in the host operating system is no different from running on the actual hardware.

In the host operating system, an emulator may run, and the emulator may also be referred to as a first process. The guest operating system may run in the emulator. A user interface presented by the host operating system may be referred to as a first user interface. A first display area is correspondingly displayed in the first user interface of the host operating system, the first display area is a user interface presented by the guest operating system, and an area of the first user interface other than the first display area may be referred to as a second display area.

In an example, the host operating system is a Windows® operating system, and the guest operating system is an Android® operating system. Both the Windows® operating system and the Android® operating system run on the first electronic device, and the first electronic device may be an electronic device that can run the Windows® operating system, such as a computer. Generally, an application program in the guest operating system cannot be directly installed or run in the host operating system. For example, an application program in the Android® operating system cannot be directly installed or run in the Windows® operating system. The application program in the Android® operating system may be installed and run in the Windows® operating system in an "emulation" or "virtual" manner, for example, using a technology such as an Android® emulator (Android® Emulator) or a virtual machine. For example, a user may first start an Android® emulator in the Windows® operating system, to run an Android® subsystem, and then start a corresponding application program from the Android® subsystem.

Figure 9:
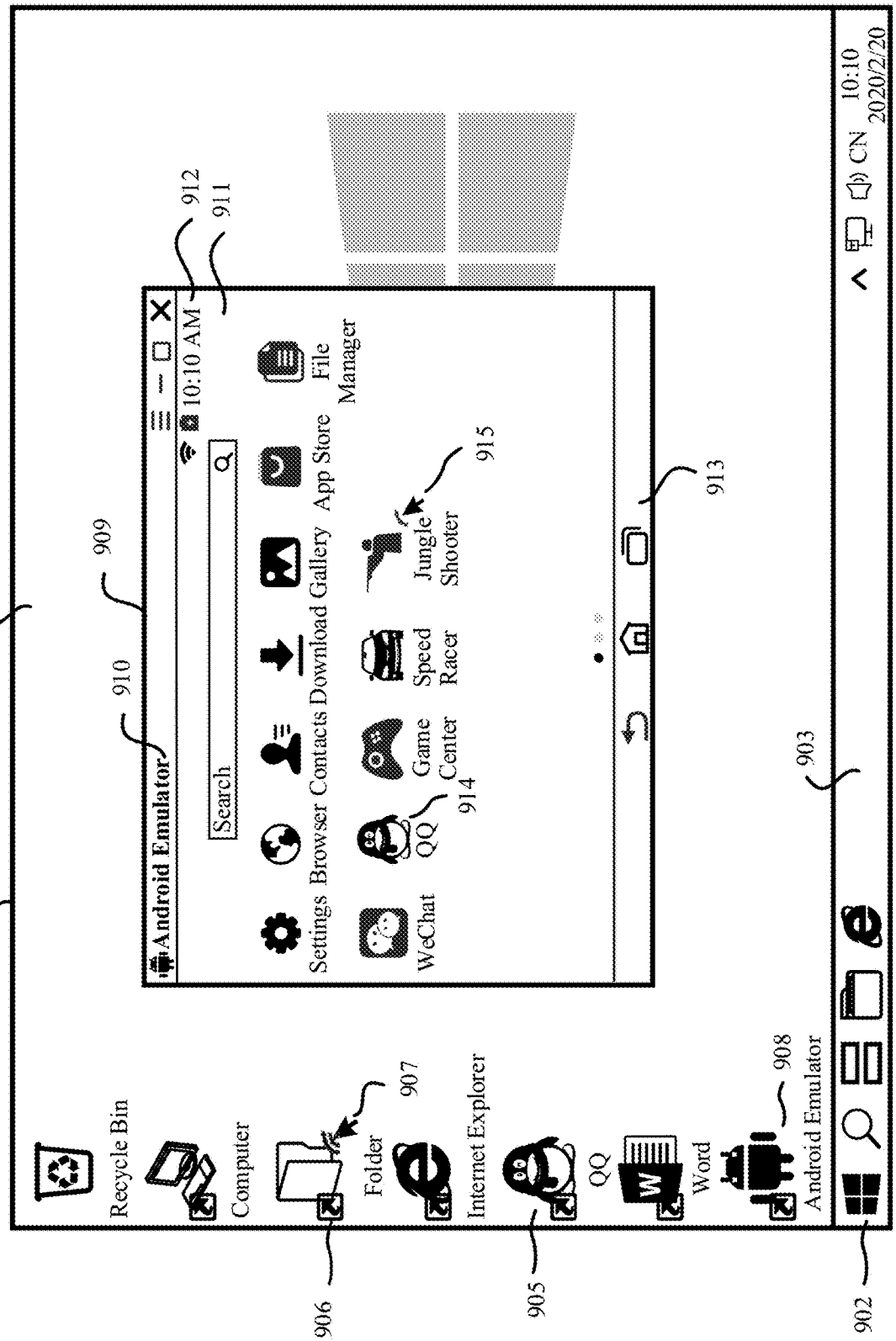
FIG. 9 is a schematic diagram of a user interface according to an embodiment of the present disclosure.

In an example of FIG. 9, the host operating system is a Windows 10® operating system, a user interface 901 of the Windows® operating system may also be referred to as a Windows® desktop 901, and visual elements on the Windows® desktop 901 may include a "start" button 902, a taskbar 903, a desktop wallpaper 904, an application icon 905, and the like. Similarly, if a small arrow identifier 906 pointing to the upper right is displayed at a lower left corner of a personalized image of the application icon on the desktop, it indicates that the icon on the desktop is an application shortcut, and the user may double-click 907 by using a mouse to start an application program corresponding to the application shortcut.

An application program—Android® emulator 908 is further installed on the first electronic device. When the application program—Android® emulator 908 is started, running of the guest operating system—Android® operating system may be emulated in the host operating system—Windows® operating system. As shown in FIG. 9, a user interface 909 of the Android® emulator is displayed on the Windows® desktop 901, and the user interface 909 of the Android® emulator includes a window title bar 910 and an analog Android® desktop 911. Visual elements on the Android® desktop 911 may include a status bar 912 (which may display information such as a network status, a battery level, and time), a navigation bar 913 (including a virtual button), an application icon 914, and the like. The application icon 914 is a display image of an application shortcut, and the user may single-click 915 by using the mouse to start an application program corresponding to the application shortcut. The application program runs on the first electronic device, and is displayed in the user interface 909 of the Android® emulator. The user may interact with the guest operating system by using the mouse or in another manner.

This application provides a method for creating and starting an application shortcut. The user may generate, in the host operating system, an application icon corresponding to an application program in the guest operating system, and the application icon complies with an operation manner of the host operating system. By clicking the application icon in the host operating system, the corresponding application program in the guest operating system may be started.

Figure 10:
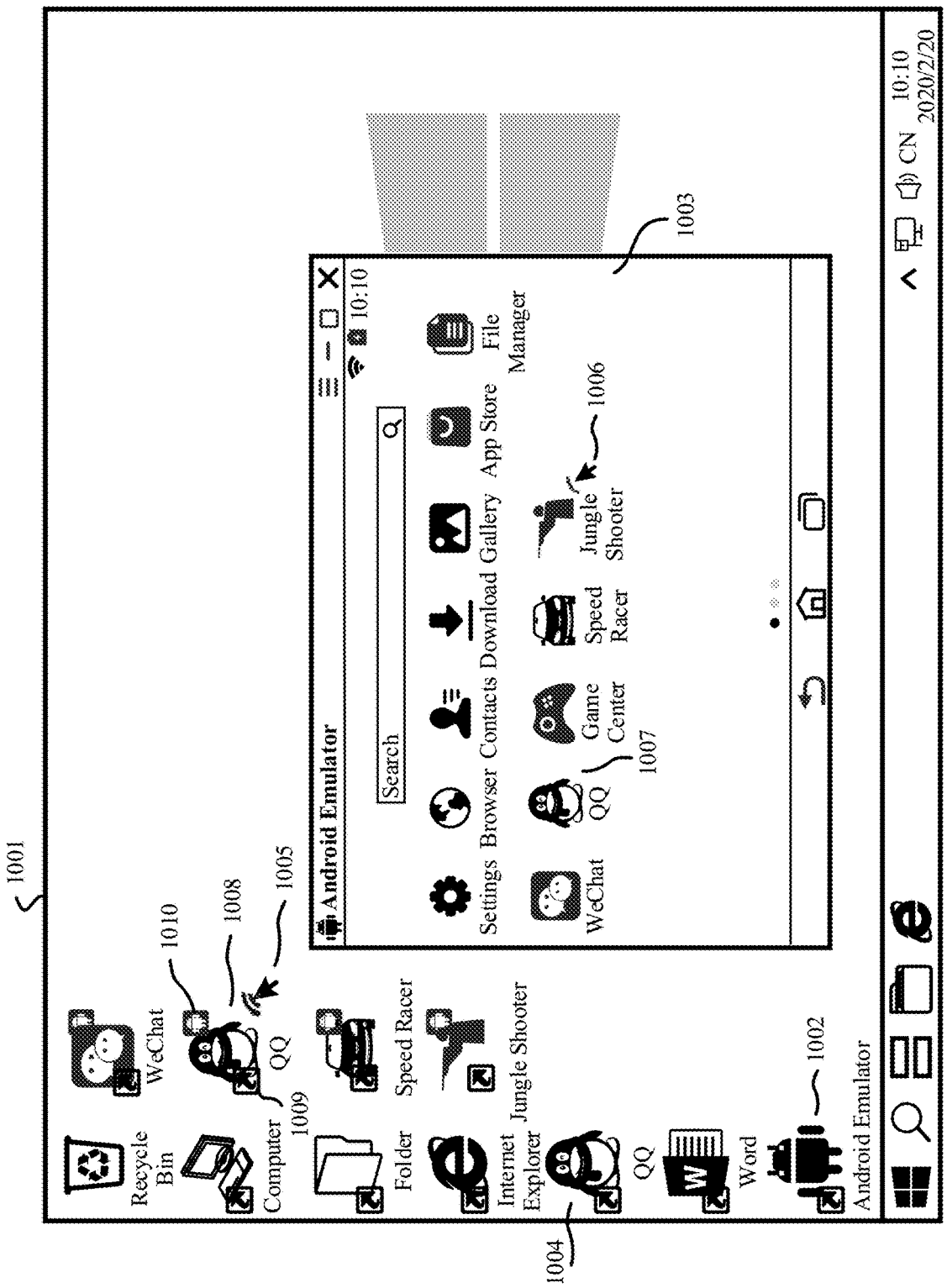
FIG. 10 is a schematic diagram of a user interface according to an embodiment of the present disclosure.

In an example, as shown in FIG. 10, an Android R emulator 1002 is started, an Android® desktop 1003 may be displayed on a Windows® desktop 1001, and the Windows® desktop 1001 includes an application icon 1004, and the user may double-click 1005 the application icon 1004 by using the mouse to start a corresponding application program. On the Android® desktop 1003, the user may single-click 1006 an application icon 1007 by using the mouse to start a corresponding application program. This application provides a method, so that an application icon 1008 corresponding to an application program in the Android® emulator may be generated on the Windows® desktop 1001. The user may double-click 1005 the application icon 1008 by using the mouse to start the corresponding application program in the Android® emulator. A small arrow identifier 1009 pointing to the upper right may be displayed at a lower left corner of the application icon 1008, to indicate that the application icon 1008 is an application shortcut. In addition, a special identifier 1010, also referred to as a first identifier, for example, a small icon in a style of an Android robot, may be added to an upper right corner of the application icon 1008 to indicate that the application icon 1008 is an application shortcut of an application program in the Android® operating system. The mark of the special identifier 1010 helps the user to quickly identify the application shortcut from the guest operating system, and distinguish from a native application shortcut 1004 in the host operating system. The special identifier may be a text, or may be a pattern. A form of the special identifier is not limited in this application. For example, the application shortcut 1004 is displayed as an application icon of an application QQ®, the application shortcut 1004 points to a QQ® application program installed in the Windows® operating system, and when the application shortcut is opened, the started QQ® application program runs in the Windows® operating system. Differently, the application shortcut 1008 is also displayed as an application icon of the application QQ®, the application shortcut 1008 points to a QQ® application program loaded in the Android® emulator, and when the application shortcut is opened, the started QQ® application program runs in the Android® emulator.

In an example, as shown in FIG. 10, on the Windows® desktop 1001, the application icon 1008 of the application shortcut from the guest operating system may be arranged in a flat manner with the native application icon 1004 of Windows®, whose positions may be freely moved and arrangement order may be changed based on a user operation.

Figure 11:
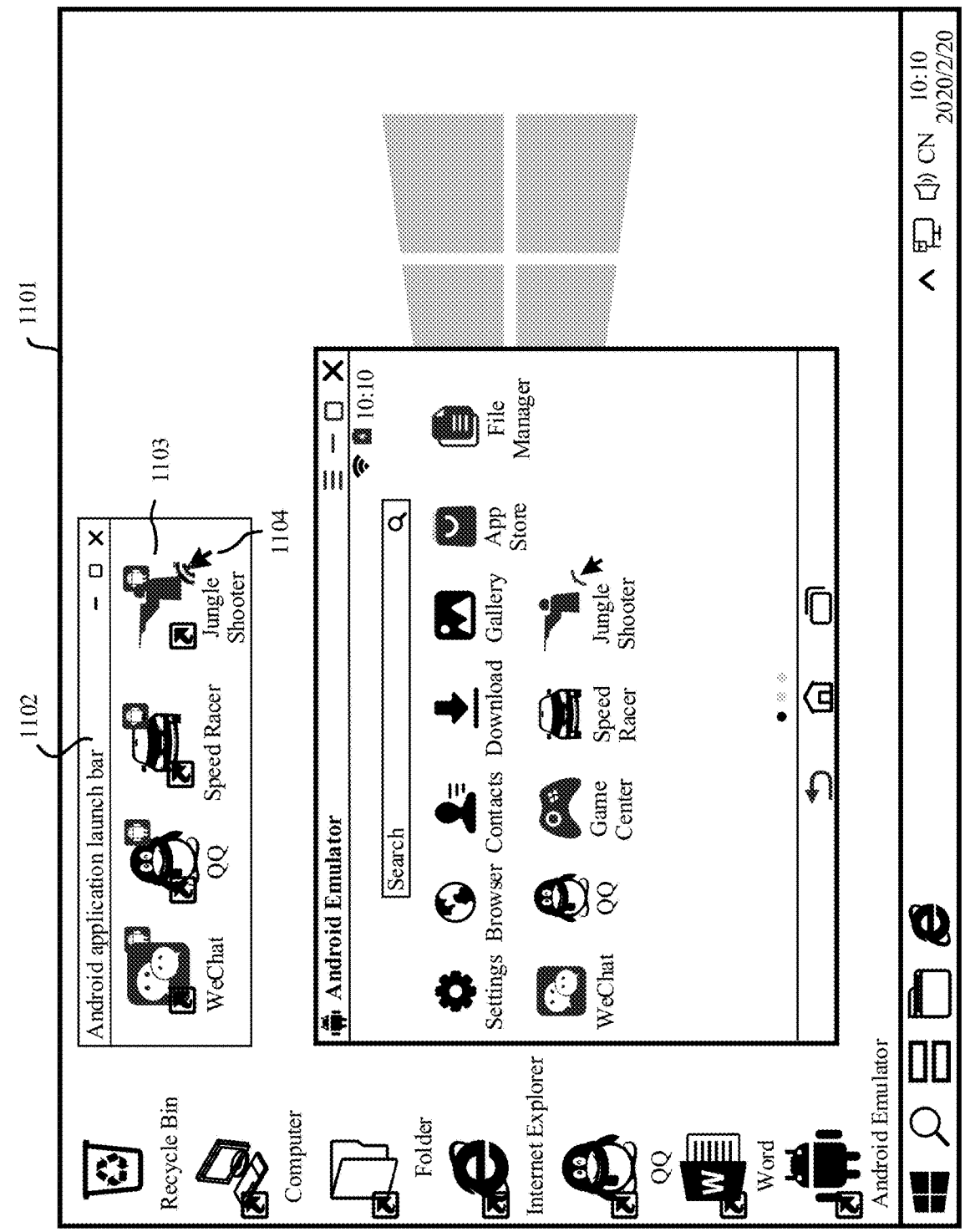
FIG. 11 is a schematic diagram of a user interface according to an embodiment of the present disclosure.

In another example, as shown in FIG. 11, a window 1102, also referred to as a third display area, for example, named "Android application launch bar", may be created on a Windows® desktop 1101, to place an application icon 1103 pointing to an application program in the guest operating system. The user may double-click 1104 the application icon 1103 by using the mouse to start the corresponding application program in the guest operating system. The window "Android application launch bar" 1102 may be a window at a fixed position, or may be a window that can be moved freely, or may be formed in a style of a sidebar. The window 1102 may be hidden at a position such as a side, an upper part, or a corner of the Windows® desktop 1101 when not in use. The hidden window may be referred to as a first hidden area. The window 1102 may be called out by performing a fifth user operation, for example, moving the mouse pointer to an edge of the Windows® desktop 1101 and staying for some time. User interface designs such as a style and a name of the window "Android application launch bar" 1102, and a user operation manner of calling out the window 302 are not limited. Existence of the window "Android application launch bar" 1102 helps centrally place and manage the application icon 1103 pointing to the application program in the guest operating system, so that the user can quickly identify an application shortcut from the guest operating system, and distinguish from a native application shortcut in the host operating system, thereby improving UI experience of the user.

Figure 12:
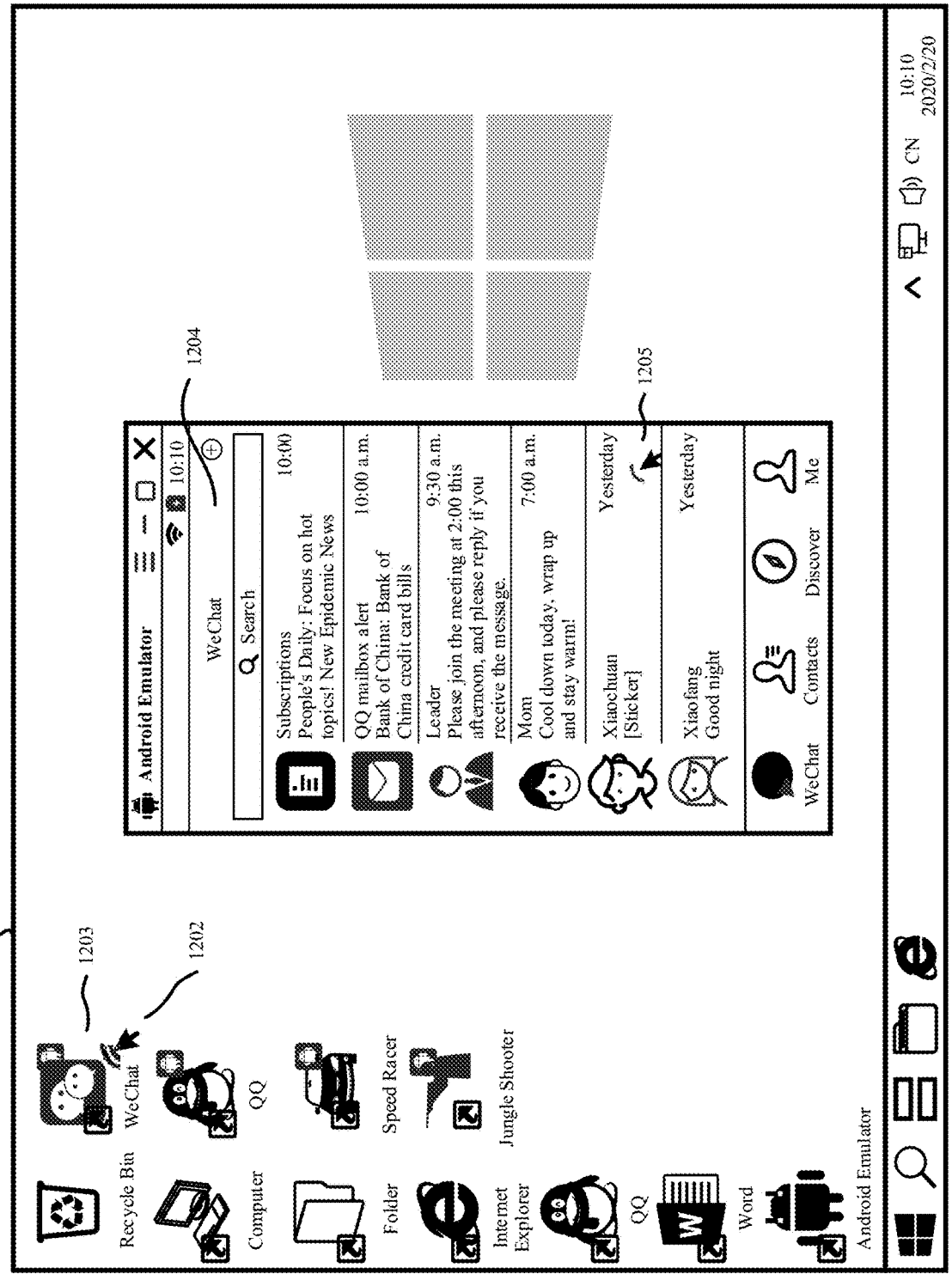
FIG. 12 is a schematic diagram of a user interface according to an embodiment of the present disclosure.

In an example of FIG. 12, a plurality of application shortcuts that can be used to start application programs in the Android® emulator are arranged on a Windows® desktop 1201. An application program WeChat® is used as an example. The user may double-click 1202, by using the mouse, a WeChat® application icon 1203 located on the Windows® desktop 1201, to start a corresponding WeChat® application program in the Android® emulator. After the WeChat® application program is started, a user interface 1204 of WeChat® is displayed on an Android® desktop. The user may open a dialog box by single-clicking 1205 by using the mouse in the user interface 1204 of WeChat®, to perform a next step of a WeChat® chat.

Figure 13:
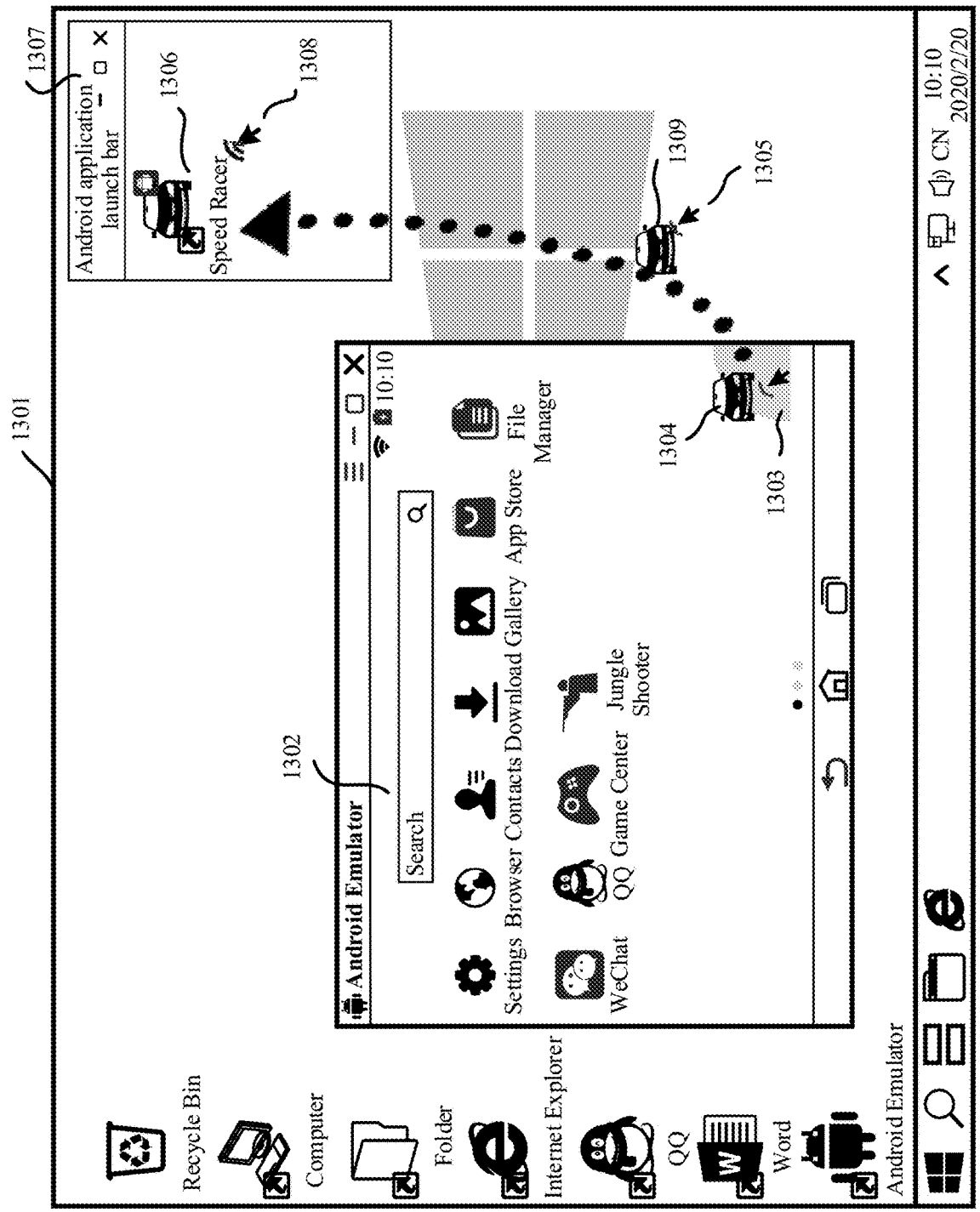
FIG. 13 is a schematic diagram of a user interface according to an embodiment of the present disclosure.

The user may trigger, by performing some specific operations or actions, a corresponding application shortcut to be generated in the host operating system for an application program in the guest operating system. In an example of FIG. 13, a hot area 1303 may be established, also referred to as a first area, and may be displayed on an Android® desktop 1302 as a ¼ circular gray translucent area at a lower right corner. The hot area refers to defining an area in the user interface and the area may be triggered to obtain a corresponding response, for example, linking to a specified address or configuring corresponding data. A shape style and a position of the hot area 1303 are not limited in this application. The hot area may be located at a position such as a lower left corner, a lower right corner, or a side edge of the user interface, and a shape may alternatively be displayed as a strip shape, a square block shape, or the like.

In an example, the user may drag an Android® application icon 1304 on the Android R desktop 1302 to the hot area 1303, and then release the mouse. The dragging operation may be referred to as a third user operation. In this case, a pop-up box may appear on the Android® desktop, asking the user whether it is necessary to create an application shortcut for a selected application program. After the user selects "yes", a corresponding application shortcut 1306 is created on a Windows desktop 1301, and the user may directly double-click 1308 by using the mouse to start the application program corresponding to the application shortcut 1306.

In another example, the user may drag the Android® application icon 1304 on the Android® desktop 1302 to an edge of the Android® desktop 1302, and then continue the dragging out of the Android® desktop 1302 to the Windows® desktop 1301. In this case, the first electronic device may be triggered to create a first application shortcut. When the user drags the Android® application icon 1304 to the edge of the Android® desktop 1302, the user may trigger, by triggering the hot area 1303 or in another manner, the first electronic device to create the first application shortcut. When the user drags 1305 the Android® application icon 1303, a look of the dragged application icon 1309 is displayed on the Windows® desktop 1301 along with a position of the mouse pointer, to facilitate the user to track a specific position. The dragging operation may also be referred to as a second user operation. After the Android® application icon 1304 is moved to any position on the Windows® desktop 1301, a corresponding application shortcut 1306 is created and generated on the Windows® desktop 1301, and the user may directly double-click by using the mouse to start an application program corresponding to the application shortcut 1306.

In this process, when the Android® application icon 1304 is dragged to the edge of the Android® desktop, that is, the hot area 1303, an information receiving process is triggered. The process causes the emulator supporting running of the Android® operating system to send synchronization information to the Windows® operating system. The synchronization information may include: coordinate information of the application icon 1304 departing from the edge of the Android® desktop 1302, and application information such as an application package name and application icon data. Then, after the Windows® operating system receives the synchronization information, coordinate position information of a junction with the Android® desktop 1302 on the Windows® desktop 1301 side is calculated based on the coordinate information and a relative position of the Android® desktop 1302 on the Windows® desktop 1301. The coordinate position is defined as a departure position. Then, the first electronic device draws and displays the dragged application icon from the departure position, and then dynamically draws and displays the application icon based on a position of a mouse pointer and a moving track of the mouse pointer, to form a display effect of a dragging animation. When the user drags the application icon 1304 to a position on the Windows® desktop 1301 and releases the mouse pointer, the first electronic device creates and generates, on the Windows® desktop 1301, the application shortcut 1306 corresponding to the application icon.

Similarly, if the user drags an application icon from the Windows® desktop 1301 to the Android® desktop 1302, the first electronic device obtains synchronization information. The synchronization information may include start coordinate position information of the application icon entering the Android® desktop 1302 from the Windows® desktop 1301, and application information such as an application package name and application icon data. The first electronic device calculates a corresponding coordinate position on the Android® desktop 1302 based on the coordinate position information, draws the dragged application icon from the coordinate position, and then dynamically draws and displays the application icon based on a position of the mouse pointer and a moving track of the mouse pointer, to form a display effect of a dragging animation.

Further, the user operation of dragging is not limited to an icon, and a file, a picture, or the like may also be dragged. A manner of generating a display effect of a dragging animation may alternatively be as shown above, and details are not described herein again.

In another example, a window or an area, such as a window 1307 named "Android application launch bar", may be specified on the Windows® desktop 1301, to display an application shortcut 1306 of an Android® application program. The user may drag 1305 the Android® application icon 1304 from the Android® desktop 1302 to the window 1307 named "Android application launch bar". Alternatively, the user may drag the Android® application icon 1304 on the Android® desktop 1302 to the hot area 1303, and then release a mouse button, to create, in the window 1307 named "Android application launch bar", the Windows® application shortcut 1306 corresponding to the Android® application icon 1304. The user may directly double-click 1308 by using the mouse to start the application program that corresponds to the application shortcut 1306 and that is in the Android® emulator. The user does not see a home screen of the Android® emulator, and an application interface of the application program is directly displayed on the Android® desktop 1302.

Figure 14:
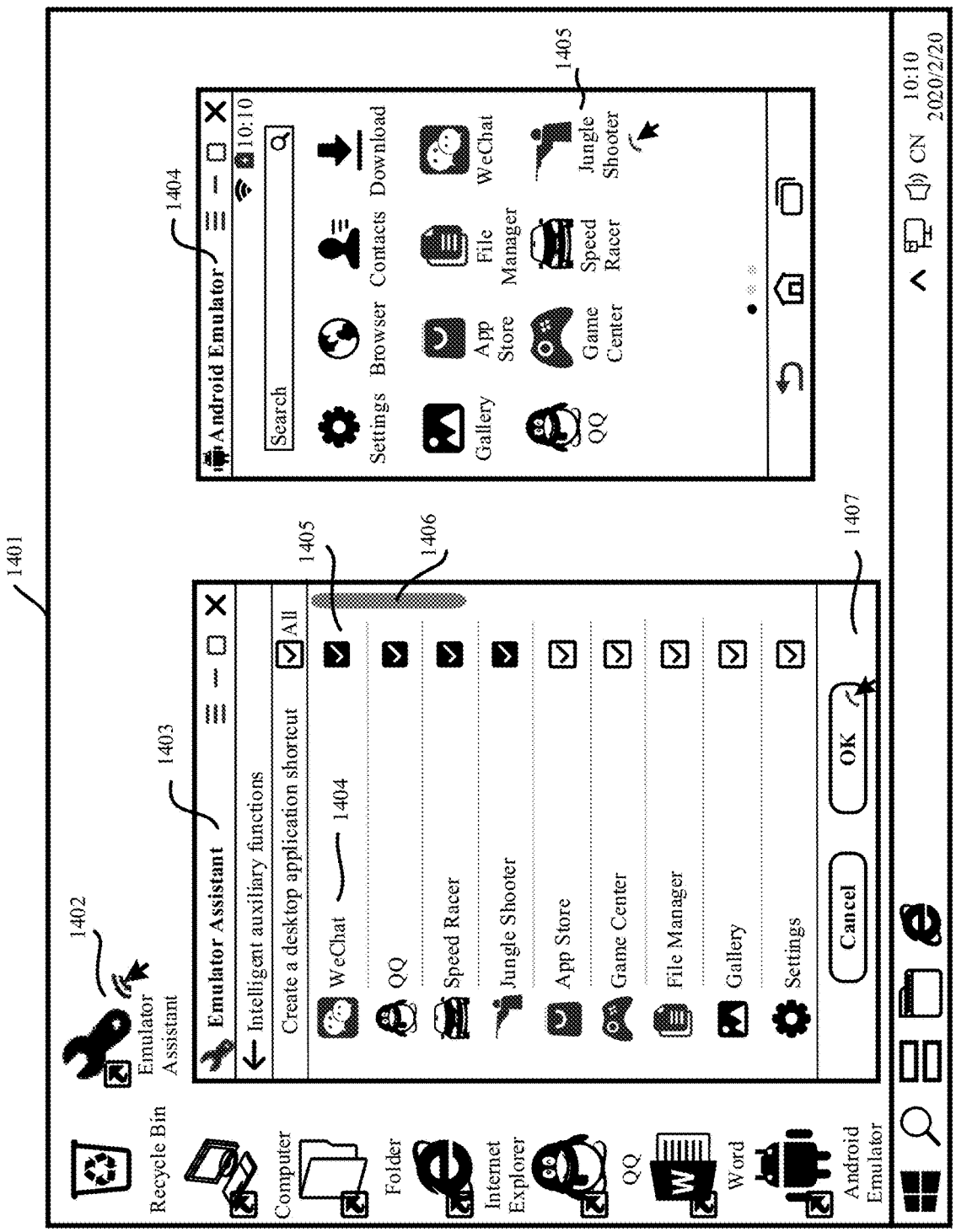
FIG. 14 is a schematic diagram of a user interface according to an embodiment of the present disclosure.

In an example of FIG. 14, an application program "emulator assistant" 1402 may be used to manage and select an Android® application shortcut that needs to be created on a Windows® desktop 1401. As shown in FIG. 14, a management interface 1403 of the "emulator assistant" may include such a window in which the user may autonomously select an application program for which an application shortcut needs to be created, which may also be referred to as a fifth user operation. The management interface 1403 of the "emulator assistant" may include a selection bar 1404 of application programs, which is also referred to as a first list, and displays icons and names that correspond to the application programs, to facilitate identification and differentiation of the user. Correspondingly, there are check boxes 1405 on the right of the icons and the names of the application programs. The check boxes 1405 are options for the user to select a plurality of items, and the user may select one or more of the options. The check boxes 1405 are on-off options. When a check box 1405 is selected, an identification block "□" of the check box 1405 is marked with "√". When the identification block displayed with the mark "√" is single-clicked, this option is canceled. In addition, an "all" check box may be further set. When the "all" check box is selected, all the options are selected. There may be a scrollbar 1406 on a right side of the window of the selection bar 1404, and an option that is not displayed in the current window may be viewed by pulling down or pulling up the scrollbar. Buttons 1407 such as "ok" and "cancel" are set in a lower part of the window of the selection bar 1404, and the buttons may be single-clicked to perform related operations. A setting in the selection bar 1404 may be made effective by single-clicking the "ok" button, and the setting may be canceled by single-clicking the "cancel" button. For example, as shown in FIG. 14, in the dialog box that is in the management interface 1403 of the "emulator assistant" and that is configured to create a desktop application shortcut, after options named WeChat®, QQ®, "Speed Racer", and "Jungle Shooter" are selected, the "ok" button is clicked to generate, on the Windows® desktop 1401, application shortcuts corresponding to the Android application programs, as in the user interface shown in FIG. 10 or FIG. 11. An application shortcut newly generated on the Windows® desktop 1401 may be opened by mouse double-clicking, to directly start a corresponding application program in the Android® operating system. The user does not see a home screen of the Android® emulator.

In an example, if the user deletes or uninstalls the first application program, correspondingly, the first application shortcut corresponding to the first application program is also deleted as commanded.

In an example, if the first process on the first electronic device is deleted or uninstalled, first application programs corresponding to all first application shortcuts that have been created are deleted.

This application is not limited to the foregoing described embodiments, and may be further applied to a "cloud desktop" case. The cloud desktop is also referred to as a virtualized desktop and a cloud computer. After the cloud desktop is used, hardware components required to run the cloud desktop, such as a CPU, a memory, and a hard disk, are all virtualized on a backend server. After installing a cloud desktop client, a user accesses a virtual machine host on the backend server by using a specific communications protocol to implement an interactive operation. Display of the cloud desktop and the operation of the user are implemented on a local electronic device.

In an embodiment, a host operating system runs on a local electronic device of a user, and a guest operating system runs on a remote server. After installing a cloud desktop client, the user accesses a virtual machine host on the remote server by using a specific communications protocol. A user interface of the guest operating system that is displayed on the local electronic device is in a form of a cloud desktop. The user may implement a human-computer interaction operation between the user and the guest operating system on the local electronic device. In an embodiment, the host operating system is a Windows 10R operating system and the guest operating system is also a Windows 10R operating system. Similarly, according to a method provided in this application, an application shortcut that can be used to start an application program in the guest operating system on the remote server may be generated in the host operating system of the local electronic device. For a human-computer interaction manner and a user interface in the cloud desktop case, refer to the foregoing embodiment. Details are not described herein again in this application.

It should be noted that, manners of user operations mentioned in the embodiments are not limited in this application. The user operations may be a mouse operation, may be a keyboard input operation, may be a touch operation, may be a gesture operation, may be a voice operation, or the like. The specific user operations mentioned above are merely examples, and constitute no limitation on the embodiments of this application.

Based on some embodiments above shown in FIG. 1A and FIG. 1B to FIG. 14, the following describes a method for creating an application shortcut that is provided in this application.

Figure 15:
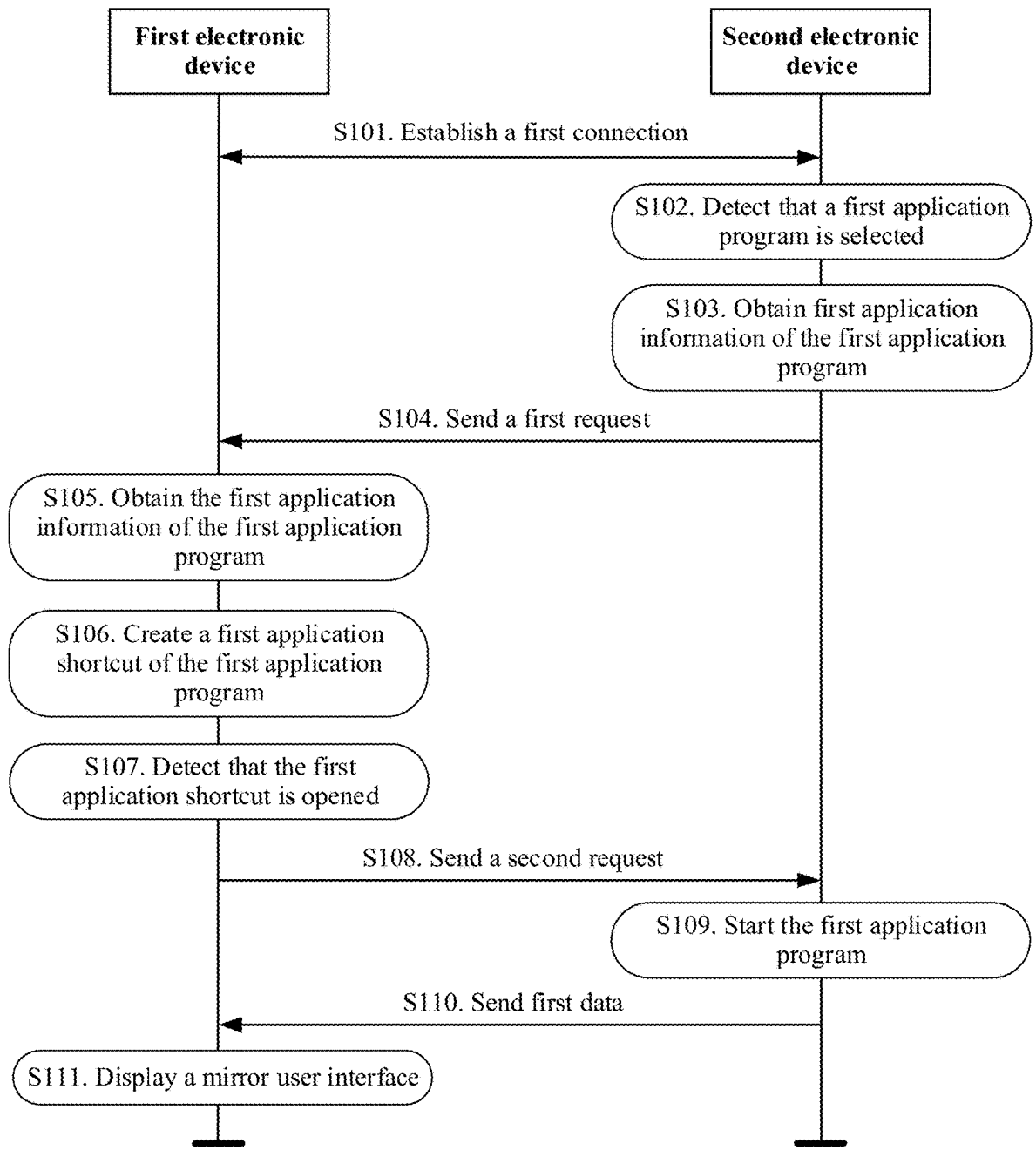
FIG. 15 is a flowchart of a method for creating an application shortcut according to an embodiment of the present disclosure.

FIG. 15 is a schematic flowchart of a method for creating an application shortcut according to method embodiment 1 of this application. A scenario related to method embodiment 1 is that a first application shortcut is created on a first electronic device for a first application program on a second electronic device, and the first application program on the second electronic device may be started by opening the first application shortcut on the first electronic device. A first operating system runs on the first electronic device, and a second operating system runs on the second electronic device. As shown in FIG. 15, the method may include the following steps.

S101. The first electronic device establishes a first connection to the second electronic device.

Data may be transmitted between the first electronic device and the second electronic device in a wired communication manner (for example, a data cable), a wireless communication manner (for example, Bluetooth or Wi-Fi), or another manner such as a specific communications protocol. This is not limited in this application.

S102. The second electronic device detects that the first application program is selected.

A user may select the first application program for which the first application shortcut needs to be created on the first electronic device. The first application program is installed on the second electronic device. Herein, a manner, a quantity, and the like in application program selection are not limited in this application. Specifically, there may be a plurality of cases in specific implementation. In some embodiments, a hot area may be established on the second electronic device. A form of the hot area is not limited in this application. For specific examples, refer to FIG. 6A and FIG. 6B and FIG. 7A and FIG. 7B. The first electronic device has a first display area to display a mirror user interface of the second electronic device. If the user drags an application icon of the first application program on the second electronic device to the hot area by finger touch, the second electronic device may detect that the first application program is selected, and the first application shortcut needs to be created in an area of a user interface of the first electronic device other than the first display area.

In some other embodiments, the first application program for which an application shortcut needs to be created on the first electronic device may alternatively be selected by using auxiliary management software. The management software is software used by the first electronic device to manage the second electronic device. When the user selects, from auxiliary management software on the second electronic device, an application program for which an application shortcut needs to be created, the second electronic device may detect that the first application program is selected.

S103. The second electronic device obtains first application information of the first application program.

After detecting that the first application program is selected, the second electronic device obtains the first application information of the first application program. In some embodiments, the guest operating system of the second electronic device may be a mobile phone operating system such as Android® or iOS®, and the first application information obtained by the second electronic device may include one or more items such as an application package name, an application icon, an application name, or an application description of the first application program. The application package name (Package Name) is a unique identifier of an application program in the operating system. Two application programs cannot use a same application package name. The application package name is mainly used by the operating system to identify the application program and is generally not displayed in a user interface. For example, an application package name of WeChat® is "com.tencent.mm". The user generally identifies the application program in the user interface by using the application name and the application icon. The application name is a name that is usually used by the user to refer to the application program. For example, an application name of WeChat® is "WeChat". The application icon is a personalized image displayed to represent the application program. In an electronic device, the application icon is a piece of data stored in a binary form. When information about the application icon is transmitted, the application icon may be converted to a base64 encoding format. The base64 encoding is a common encoding manner for byte transmission.

S104. The second electronic device sends a first request to the first electronic device.

After obtaining the first application information of the first application program, the second electronic device encapsulates the first application information to generate a first encapsulation package. In an example, the second electronic device may encapsulate the first application information in a JSON format. The JSON format is a common data exchange format for computer communication. The first application information may include the application package name, the application icon, the application name, and the like that correspond to the first application program. An encapsulation format of the first encapsulation package is not limited to the JSON format. This is not limited herein in this application.

The second electronic device sends the first request to the first electronic device through the established connection, such as a socket or a pipe. The request may include a request for creating the first application shortcut and the first encapsulation package, and the first encapsulation package includes the first application information of the first application program on the second electronic device. In an example, the first application information may include one or more items of information such as the application package name, the application icon, and the application name that correspond to the first application program.

It should be noted that step S103 and step S104 may occur before step S102, or step S102 is an optional step. For example, in an example, when the first electronic device establishes a connection to the second electronic device for the first time, application shortcuts need to be created on the first electronic device for all application programs on the second electronic device. That is, after the first electronic device establishes the first connection to the second electronic device in step S101, the second electronic device performs step S103 to obtain the first application information of the first application program, and performs step S104 to send the first request to the first electronic device. In addition, each time a new application program is installed on the second electronic device, the second electronic device automatically obtains first application information of the application program, and sends a request for creating an application shortcut to the first electronic device.

S105. The first electronic device obtains the first application information of the first application program.

The first electronic device receives the first request from the second electronic device, and then parses the first encapsulation package to obtain the first application information of the first application program. Similarly, the first application information may include one or more items of information such as the application package name, the application icon, and the application name that correspond to the first application program.

S106. The first electronic device creates the first application shortcut.

The first electronic device creates the first application shortcut based on the first application information. The first application information may include one or more items of information such as the application package name, the application icon, and the application name that correspond to the first application program.

The first application shortcut is an application shortcut corresponding to the first application program, the first application shortcut is located and displayed on the first electronic device, a format of the first application shortcut is an application shortcut format applicable to the host operating system, and the user may start the first application shortcut in an interaction manner in the host operating system. When the first application shortcut located in the user interface of the first electronic device is opened by clicking, the corresponding first application program on the second electronic device is started.

Specifically, in some embodiments, the host operating system is a Windows® operating system, and the guest operating system is an Android® operating system. A startup manner of an application shortcut in the Windows® operating system may be double-clicking an application icon on a desktop, and a startup manner of an application shortcut in the Android® operating system may be single-tapping an application icon. The first application shortcut corresponding to the first application program in the Android® operating system is generated in the Windows® operating system, and the user may double-click the first application shortcut in the Windows® operating system by using a mouse, to start the first application program in the Android® operating system.

How the first electronic device creates the first application shortcut is described below, and details are not described herein.

S107. The first electronic device detects that the first application shortcut is opened.

The user clicks the first application shortcut, which may also be referred to as a first user operation. The first electronic device detects that the first application shortcut is opened. Because the first application shortcut is located in the host operating system, the user needs to directly open the first application shortcut in the interaction manner in the host operating system. For example, the host operating system is a Windows® operating system, and a startup manner of an application shortcut of the Windows® operating system may be double-clicking an application icon on a Windows® desktop. Therefore, the user may open the first application shortcut by double-clicking by using a mouse.

S108. The first electronic device sends a second request to the second electronic device.

When the first electronic device detects that the first application shortcut is opened, the first electronic device sends the second request to the second electronic device. The second request may also be referred to as a first instruction, and the second request refers to requesting to execute the first application program located on the second electronic device. A form and content of the second request are not limited in this application. For example, the first electronic device may send the second request to the second electronic device in a package sending manner, and the second request may include an instruction for starting the first application program and the application package name corresponding to the first application program.

S109. The second electronic device starts the first application program.

After receiving the second request that is sent by the first electronic device and that is used for starting the first application program, the second electronic device finds a first application program process based on the application package name that is transferred from the first electronic device and that corresponds to the first application program, and starts a corresponding application interface of the first application program based on an application parameter. If there is no application parameter, a home page of the application program may be started by default.

S110. The second electronic device sends first data to the first electronic device.

The first data may be graphic rendering data of the interface of the first application program. A mirror user interface may be displayed in the user interface of the first electronic device for the second electronic device, and an image of the mirror user interface is completely consistent with an image of the user interface of the second electronic device. The user may further reversely control an application on the second electronic device by operating the mirror user interface. In this case, data transmission and data exchange occur between the first electronic device and the second electronic device. For example, the second electronic device packages the graphic rendering data of the interface of the first application program, and sends a package to the first electronic device.

S111. The first electronic device displays the mirror user interface of the second electronic device.

The first display area on the first electronic device displays the mirror user interface consistent with an interface image of the application program of the second electronic device. In addition, if the user performs an interaction operation in the mirror user interface, the first electronic device identifies the user operation and transmits an instruction to the second electronic device, the first application program responds and provides feedback, and a user interface on the second electronic device that is obtained after the response is synchronously transmitted to and displayed in the mirror user interface of the first electronic device.

Figure 16:
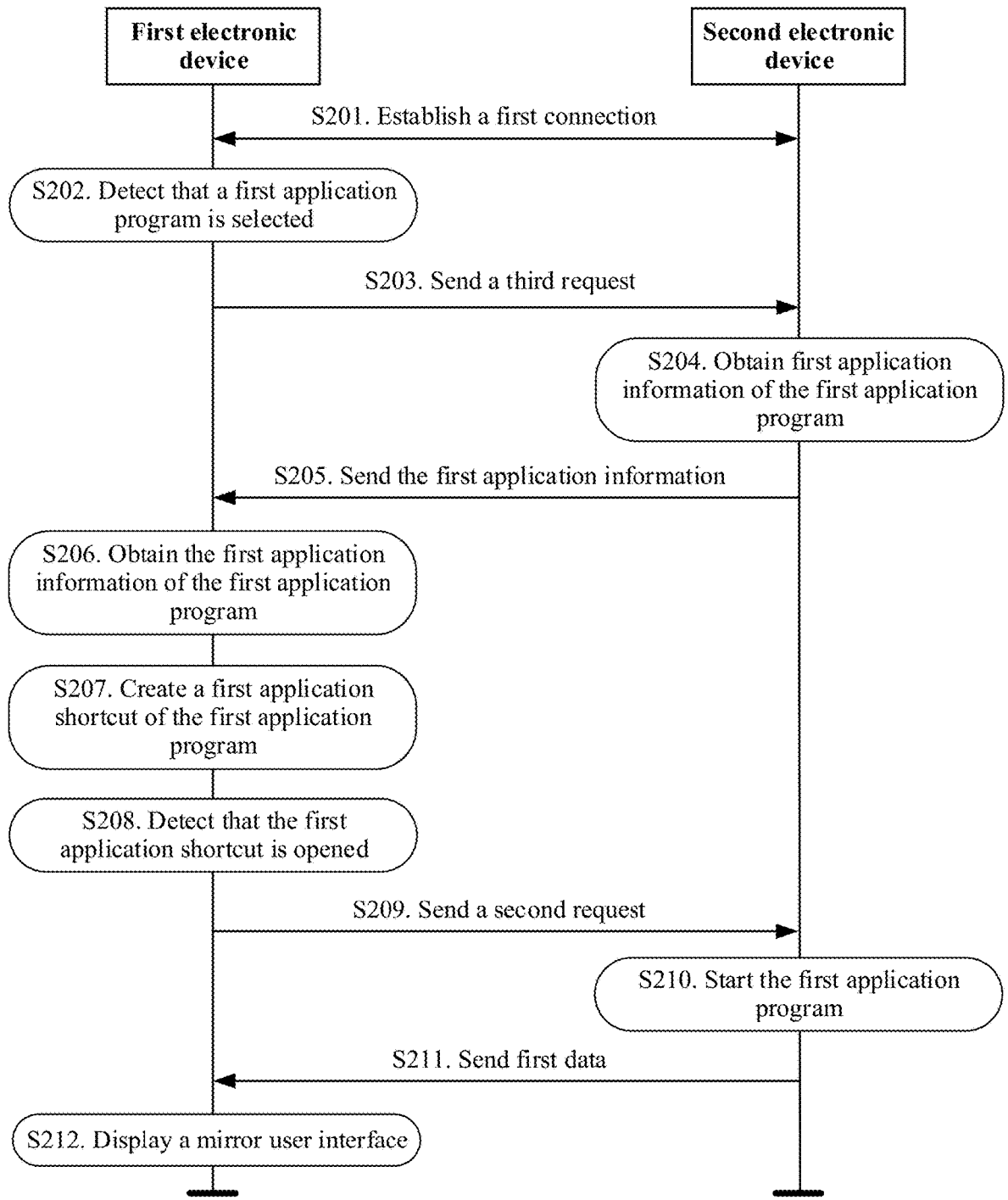
FIG. 16 is a flowchart of a method for creating an application shortcut according to an embodiment of the present disclosure.

FIG. 16 is a schematic flowchart of a method for creating an application shortcut according to method embodiment 2 of this application. A scenario related to method embodiment 2 is also that a first application shortcut is created on a first electronic device for a first application program on a second electronic device, and the first application program on the second electronic device may be started by opening the first application shortcut on the first electronic device. A first operating system runs on the first electronic device, and a second operating system runs on the second electronic device. As shown in FIG. 16, the method may include the following steps.

S201. The first electronic device establishes a first connection to the second electronic device.

Data may be transmitted between the first electronic device and the second electronic device in a wired communication manner (for example, a data cable), a wireless communication manner (for example, Bluetooth or Wi-Fi), or another manner such as a specific communications protocol. This is not limited in this application.

S202. The first electronic device detects that the first application program is selected.

A user may select the first application program for which the first application shortcut needs to be created on the first electronic device. The first application program is installed on the second electronic device. Herein, a manner, a quantity, and the like in application program selection are not limited in this application. Specifically, there may be a plurality of cases in specific implementation. In some embodiments, a hot area may be established on the second electronic device. A form of the hot area is not limited in this application. For specific examples, refer to FIG. 6A and FIG. 6B and FIG. 7A and FIG. 7B. The first electronic device has a first display area to display a mirror user interface of the second electronic device. If the user drags, by using a mouse, an application icon of the first application program in the mirror user interface to a mapped hot area, the first electronic device detects that the first application program is selected, and the first application shortcut needs to be created in an area, that is, a second display area, of a user interface of the first electronic device other than the first display area.

In some other embodiments, the first application program for which an application shortcut needs to be created on the first electronic device may alternatively be selected by using auxiliary management software. The management software is software used by the first electronic device to manage the second electronic device. When the user selects, from auxiliary management software on the first electronic device, an application program for which an application shortcut needs to be created, the first electronic device may detect that the first application program is selected. For a specific example, refer to FIG. 8A and FIG. 8B. Details are not described herein again.

S203. The first electronic device sends a third request to the second electronic device.

After detecting that the first application program is selected, the first electronic device sends the third request to the second electronic device. The third request may be requesting to obtain first application information corresponding to the first application program.

S204. The second electronic device obtains the first application information of the first application program.

After detecting that the first application program is selected, the second electronic device obtains the first application information of the first application program. In some embodiments, the guest operating system of the second electronic device may be a mobile phone operating system such as Android® or iOS®, and the first application information obtained by the second electronic device may include one or more items such as an application package name, an application icon, an application name, or an application description of the first application program. The application package name (Package Name) is a unique identifier of an application program in the operating system. Two application programs cannot use a same application package name. The application package name is mainly used by the operating system to identify the application program and is generally not displayed in a user interface. For example, an application package name of WeChat® is "com.tencent.mm". The user generally identifies the application program in the user interface by using the application name and the application icon. The application name is a name that is usually used by the user to refer to the application program. For example, an application name of WeChat® is "WeChat". The application icon is a personalized image displayed to represent the application program. In an electronic device, the application icon is a piece of data stored in a binary form. When information about the application icon is transmitted, the application icon may be converted to a base64 encoding format. The base64 encoding is a common encoding manner for byte transmission.

S205. The second electronic device sends the first application information to the first electronic device.

After obtaining the first application information of the first application program, the second electronic device encapsulates the first application information to generate a first encapsulation package. In an example, the second electronic device may encapsulate the first application information in a JSON format. The JSON format is a common data exchange format for computer communication. The first application information may include the application package name, the application icon, the application name, and the like that correspond to the first application program. An encapsulation format of the first encapsulation package is not limited to the JSON format. This is not limited herein in this application.

The second electronic device sends the first encapsulation package to the first electronic device through the established connection, such as a socket or a pipe. The first encapsulation package includes the first application information of the first application program on the second electronic device. In an example, the first application information may include one or more items of information such as the application package name, the application icon, and the application name that correspond to the first application program.

S206. The first electronic device obtains the first application information of the first application program.

The first electronic device obtains the first encapsulation package of the first application program from the second electronic device, and parses out the first application information. Similarly, the first application information may include one or more items of information such as the application package name, the application icon, and the application name that correspond to the first application program.

S207. The first electronic device creates the first application shortcut.

The first electronic device creates the first application shortcut based on the first application information. The first application information may include one or more items of information such as the application package name, the application icon, and the application name that correspond to the first application program.

The first application shortcut is an application shortcut corresponding to the first application program, the first application shortcut is located and displayed on the first electronic device, a format of the first application shortcut is an application shortcut format applicable to the host operating system, and the user may start the first application shortcut in an interaction manner in the host operating system. When the first application shortcut located in the user interface of the first electronic device is opened by clicking, the corresponding first application program on the second electronic device is started.

Specifically, in some embodiments, the host operating system is a Windows® operating system, and the guest operating system is an Android® operating system. A startup manner of an application shortcut in the Windows® operating system may be double-clicking an application icon on a desktop, and a startup manner of an application shortcut in the Android® operating system may be single-tapping an application icon. The first application shortcut corresponding to the first application program in the Android® operating system is generated in the Windows® operating system, and the user may double-click the first application shortcut in the Windows® operating system by using a mouse, to start the first application program in the Android® operating system.

How the first electronic device creates the first application shortcut is described below, and details are not described herein.

S208. The first electronic device detects that the first application shortcut is opened.

The user clicks the first application shortcut, which is a first user operation. The first electronic device detects that the first application shortcut is opened. Because the first application shortcut is located in the host operating system, the user needs to directly open the first application shortcut in the interaction manner in the host operating system. For example, the host operating system is a Windows® operating system, and a startup manner of an application shortcut of the Windows® operating system may be double-clicking an application icon on a Windows® desktop. Therefore, the user may open the first application shortcut by double-clicking by using a mouse.

S209. The first electronic device sends a second request to the second electronic device.

When the first electronic device detects that the first application shortcut is opened, the first electronic device sends the second request to the second electronic device. The second request refers to requesting to execute the first application program located on the second electronic device. A form and content of the second request are not limited in this application. For example, the first electronic device may send the second request to the second electronic device in a package sending manner, and the second request may include an instruction for starting the first application program and the application package name corresponding to the first application program.

S210. The second electronic device starts the first application program.

After receiving the second request that is sent by the first electronic device and that is used for starting the first application program, the second electronic device finds a first application program process based on the application package name that is transferred from the first electronic device and that corresponds to the first application program, and starts a corresponding application interface of the first application program based on an application parameter. If there is no application parameter, a home page of the application program may be started by default.

S211. The second electronic device sends first data to the first electronic device.

A mirror user interface may be displayed in the user interface of the first electronic device for the second electronic device, and an image of the mirror user interface is completely consistent with an image of the user interface of the second electronic device. The user may further reversely control an application on the second electronic device by operating the mirror user interface. In this case, data transmission and data exchange occur between the first electronic device and the second electronic device. For example, the second electronic device packages the graphic rendering data of the interface of the first application program, and sends a package to the first electronic device.

S212. The first electronic device displays the mirror user interface of the second electronic device.

The first display area on the first electronic device displays the mirror user interface consistent with an interface image of the application program of the second electronic device. In addition, if the user performs an interaction operation in the mirror user interface, the first electronic device identifies the user operation and transmits an instruction to the second electronic device, the first application program responds and provides feedback, and a user interface on the second electronic device that is obtained after the response is synchronously transmitted to and displayed in the mirror user interface of the first electronic device.

Figure 17:
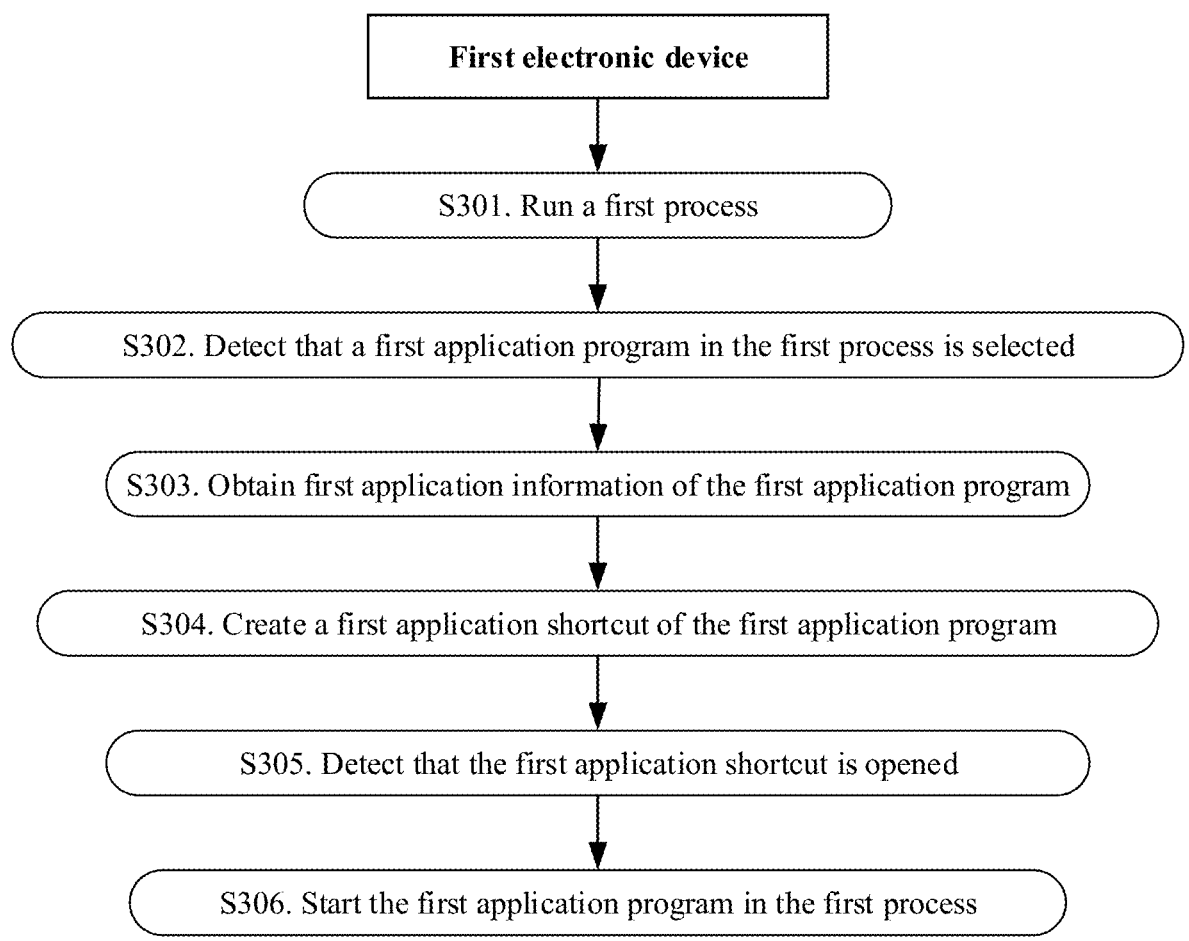
FIG. 17 is a flowchart of a method for creating an application shortcut according to an embodiment of the present disclosure.

FIG. 17 is a schematic flowchart of a method for creating an application shortcut according to method embodiment 3 of this application. A scenario related to method embodiment 3 is that a first operating system, that is, a host operating system, runs on a first electronic device, and referring to the foregoing embodiment, the host operating system and a guest operating system may both run on the first electronic device, that is, the host operating system may virtualize a virtual hardware environment (including a processor, a memory, and an I/O device) independent of actual hardware for the guest operating system, and the guest operating system runs in the host operating system in a form such as an emulator or a virtual machine. Therefore, a first process further exists on the first electronic device, the first process may be used to run the second operating system, and a first application program is loaded in the second operating system. A first application shortcut is created in an area of a first user interface of the first electronic device other than a first display area displayed by the first process, and the first application program in the first process may be started by opening the first application shortcut. As shown in FIG. 17, the method may include the following steps.

S301. The first electronic device runs the first process.

An underlying operating system of the first electronic device is the first operating system, that is, the host operating system. The first process may be an emulator process, or may be another virtual application process, or the like. The first process may be used to run the second operating system, that is, the guest operating system. A connection may be established between the host operating system and the guest operating system, and the connection enables the host operating system and the guest operating system to communicate with each other. The connection essentially means that communication parties transmit data to each other by using an agreed mechanism. A manner of establishing the connection between the host operating system and the guest operating system is not limited in this application. In some embodiments, the host operating system and the guest operating system may communicate with each other by using a socket (socket) mechanism. The socket is a common communication manner between application processes, and is an abstraction layer between an application layer and a transport layer, which abstracts complex operations at a TCP/IP layer into several simple interfaces for the application layer to invoke, to facilitate communication between the application processes. The communication between the host operating system and the guest operating system is not limited to the socket mechanism, and may alternatively be implemented by using a pipe (pipe) mechanism. This is not limited in this application.

S302. The first electronic device detects that the first application program in the first process is selected.

A user may select the first application program for which the first application shortcut needs to be created in the user interface of the first electronic device. The first application program is loaded in the first process. Herein, a manner, a quantity, and the like in application program selection are not limited in this application. Specifically, there may be a plurality of cases in specific implementation. In some embodiments, a hot area may be established in the guest operating system. A form of the hot area is not limited in this application. For a specific example, refer to FIG. 13. The first electronic device has the first display area to display a user interface of the guest operating system running in the first process. If the user drags, by using a mouse, an application icon of the first application program in the user interface of the guest operating system to the hot area, the first electronic device detects that the first application program is selected, and the first application shortcut needs to be created in an area of the user interface of the first electronic device other than the first display area.

In some other embodiments, the first application program for which an application shortcut needs to be created on the first electronic device may alternatively be selected by using auxiliary management software. After the operation of selecting the first application program by the user occurs, the first electronic device may detect that the first application program is selected. For a specific example, refer to FIG. 14. Details are not described herein again.

In some other examples, when the first process runs for the first time, all application programs in the guest operating system are selected, and then application shortcuts are created on the first electronic device. In addition, each time a new application program is installed in the guest operating system, the first electronic device may detect that an application shortcut needs to be created for the application program.

S303. The first electronic device obtains first application information of the first application program.

After the first electronic device detects that the first application program is selected, the guest operating system obtains the first application information of the first application program. The first application information may include one or more items such as an application package name, an application icon, an application name, or an application description of the first application program. The application package name (Package Name) is a unique identifier of an application program in the operating system. Two application programs cannot use a same application package name. The application package name is mainly used by the operating system to identify the application program and is generally not displayed in a user interface. For example, an application package name of WeChat® is "com.tencent.mm". The user generally identifies the application program in the user interface by using the application name and the application icon. The application name is a name that is usually used by the user to refer to the application program. For example, an application name of WeChat® is "WeChat". The application icon is a personalized image displayed to represent the application program. In an electronic device, the application icon is a piece of data stored in a binary form. When information about the application icon is transmitted, the application icon may be converted to a base64 encoding format. The base64 encoding is a common encoding manner for byte transmission.

After obtaining the first application information of the first application program, the guest operating system encapsulates the first application information to generate a first encapsulation package. In an example, the guest operating system may encapsulate the first application information in a JSON format. The JSON format is a common data exchange format for computer communication. The first application information may include the application package name, the application icon, the application name, and the like that correspond to the first application program. An encapsulation format of the first encapsulation package is not limited to the JSON format. This is not limited herein in this application.

The guest operating system sends a first request to the host operating system through the established channel, such as a socket or a pipe. The request may include a request for creating the first application shortcut and the first encapsulation package, and the first encapsulation package includes the first application information of the first application program in the guest operating system. In an example, the first application information may include one or more items of information such as the application package name, the application icon, and the application name that correspond to the first application program.

The host operating system receives the first request from the guest operating system, and then parses the first encapsulation package to obtain the first application information of the first application program. Similarly, the first application information may include one or more items of information such as the application package name, the application icon, and the application name that correspond to the first application program.

S304. The first electronic device creates the first application shortcut of the first application program.

The first electronic device creates the first application shortcut based on the first application information. The first application information may include one or more items of information such as the application package name, the application icon, and the application name that correspond to the first application program.

The first application shortcut is an application shortcut corresponding to the first application program, the first application shortcut is located and displayed on the first electronic device, a format of the first application shortcut is an application shortcut format applicable to the host operating system, and the user may start the first application shortcut in an interaction manner in the host operating system. When the first application shortcut located in the user interface of the first electronic device is opened by clicking, the corresponding first application program on the second electronic device is started.

Specifically, in some embodiments, the host operating system is a Windows® operating system, and the guest operating system is an Android® operating system. A startup manner of an application shortcut in the Windows® operating system may be double-clicking an application icon on a desktop, and a startup manner of an application shortcut in the Android® operating system may be single-tapping an application icon. The first application shortcut corresponding to the first application program in the Android® operating system is generated in the Windows® operating system, and the user may double-click the first application shortcut in the Windows® operating system by using a mouse, to start the first application program in the Android® operating system.

How the first electronic device creates the first application shortcut is described below, and details are not described herein.

S305. The first electronic device detects that the first application shortcut is opened.

The user clicks the first application shortcut, which is a first user operation. The first electronic device detects that the first application shortcut is opened. Because the first application shortcut is located in the host operating system, the user needs to directly open the first application shortcut in the interaction manner in the host operating system. For example, the host operating system is a Windows® operating system, and a startup manner of an application shortcut of the Windows® operating system may be double-clicking an application icon on a Windows® desktop. Therefore, the user may open the first application shortcut by double-clicking by using a mouse.

S306. The first electronic device starts the first application program in the first process.

When the first electronic device detects that the first application shortcut is opened, the first electronic device starts the first application program in the first process. The guest operating system finds a first application program process based on the application package name that is transferred from the first electronic device and that corresponds to the first application program, and starts a corresponding application interface of the first application program based on an application parameter. If there is no application parameter, a home page of the application program may be started by default. A form and content of an instruction for starting the first application program are not limited in this application. For example, when an application program in an Android® emulator is run on the first electronic device with a Windows® operating system, a target located in the Windows® operating system and used to start an application shortcut of the application program in the Android® emulator may include a path of the application program in the Android® emulator, a LaunchApp command, an application package name, or an application parameter that points to a specific page.

Figure 18:
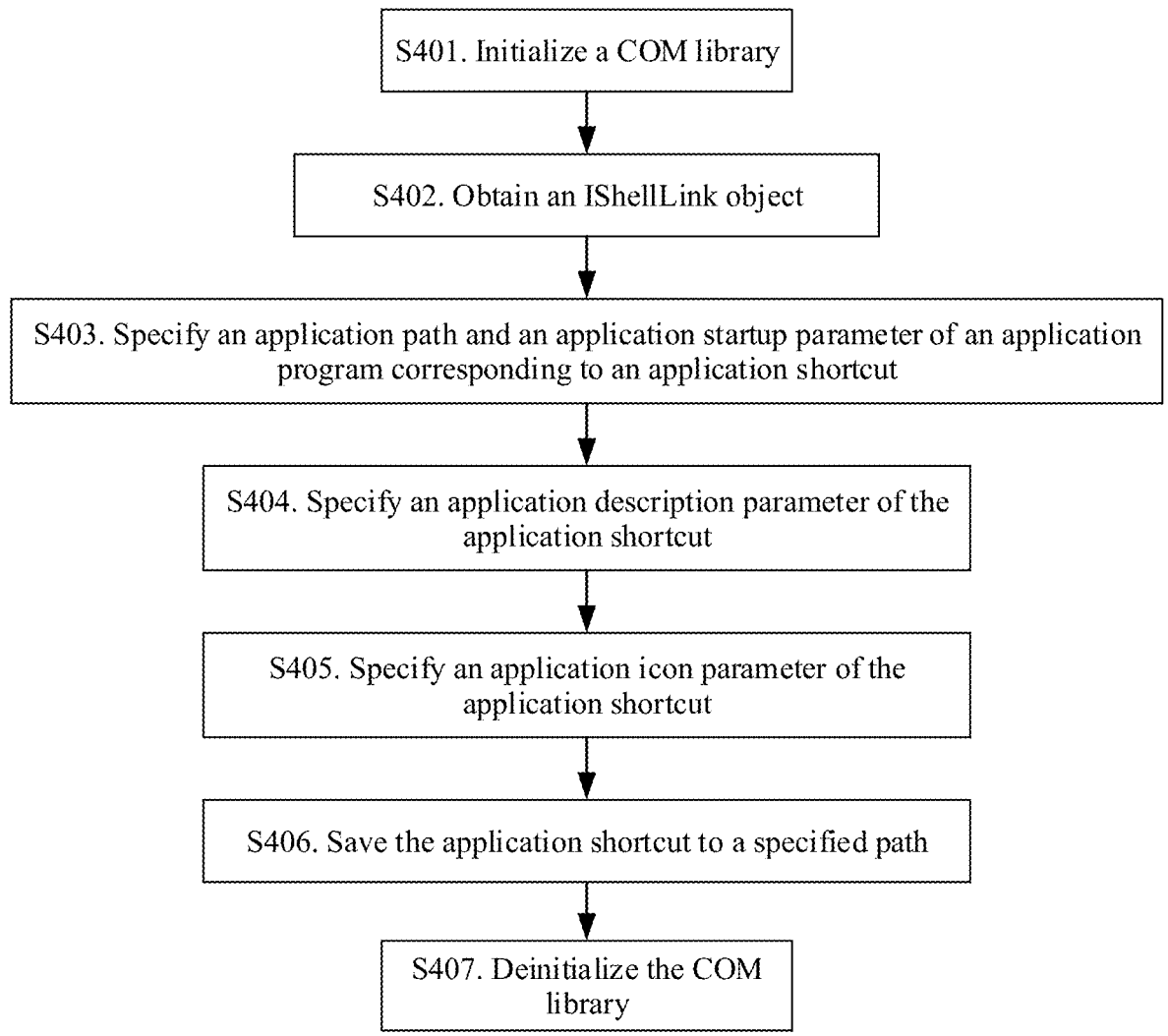
FIG. 18 is a flowchart of a method of creating an application shortcut in a conventional technology.

In an example, the host operating system of the first electronic device is a Windows® operating system, and a procedure of creating an application shortcut may be shown in FIG. 18. FIG. 18 shows a common method of creating an application shortcut in the Windows® operating system. A method of creating an application shortcut is not limited to the method shown in FIG. 18, and is not limited in this application.

S401. The first electronic device initializes a COM library.

The first electronic device initializes a COM interface environment. The Windows® operating system loads DLLs, usually by invoking CoInitialize (NULL) or other startup code in InitInstance( ) of a program. CoInitialize is a Windows-provided application programming interface (application programming interface, API) function that tells Windows to create a COM object in a single-threaded manner. The COM library needs to be initialized before an application program invokes a COM library function (other than CoGetMalloc and memory allocation functions).

S402. The first electronic device obtains an IShellLink object.

The first electronic device creates a COM object for establishing an application shortcut, and obtains an IShellLink interface, that is, the first electronic device may obtain an IShellLink object by using an API of CoCreateInstance.

S403. The first electronic device specifies an application path and an application startup parameter of an application program corresponding to the application shortcut.

The first electronic device sets, by invoking a SetPath( ) method of the IShellLink object, the target path and the application startup parameter, such as an application package name, of the application program corresponding to the application shortcut.

S404. The first electronic device specifies an application description parameter of the application shortcut.

The first electronic device sets the application description parameter of the application shortcut by invoking a SetDescription( ) method of the IShellLink object.

S405. The first electronic device specifies an application icon parameter of the application shortcut.

The first electronic device sets the application icon parameter of the application shortcut by invoking a SetIconLocation( ) method of the IShellLink object.

S406. The first electronic device saves the application shortcut to a specified path.

The first electronic device may obtain a Windows® desktop path by using APIs of SHGetSpecialFolderLocation and SHGetPathFromIDList, and then add an application name and an application shortcut suffix .lnk to the incomplete application shortcut in the foregoing step, to form a complete application shortcut path in combination. Then, the first electronic device saves the application shortcut by invoking a Save( ) method of an IPersistFile interface. An IPersistFile object may be obtained by using a QueryInterface( ) method of the IShellLink object. For example, the application shortcut may be saved to a Windows® desktop. If the application shortcut needs to be created at a position in a specific area such as a sidebar or a quick launch bar, position information of the area may be set and saved.

S407. The first electronic device deinitializes the COM library.

The first electronic device releases the object interface, releases the object, and releases the COM interface environment.

Based on some embodiments above, the following describes functional modules of a system for creating an application shortcut that is provided in this application.

Figure 19:
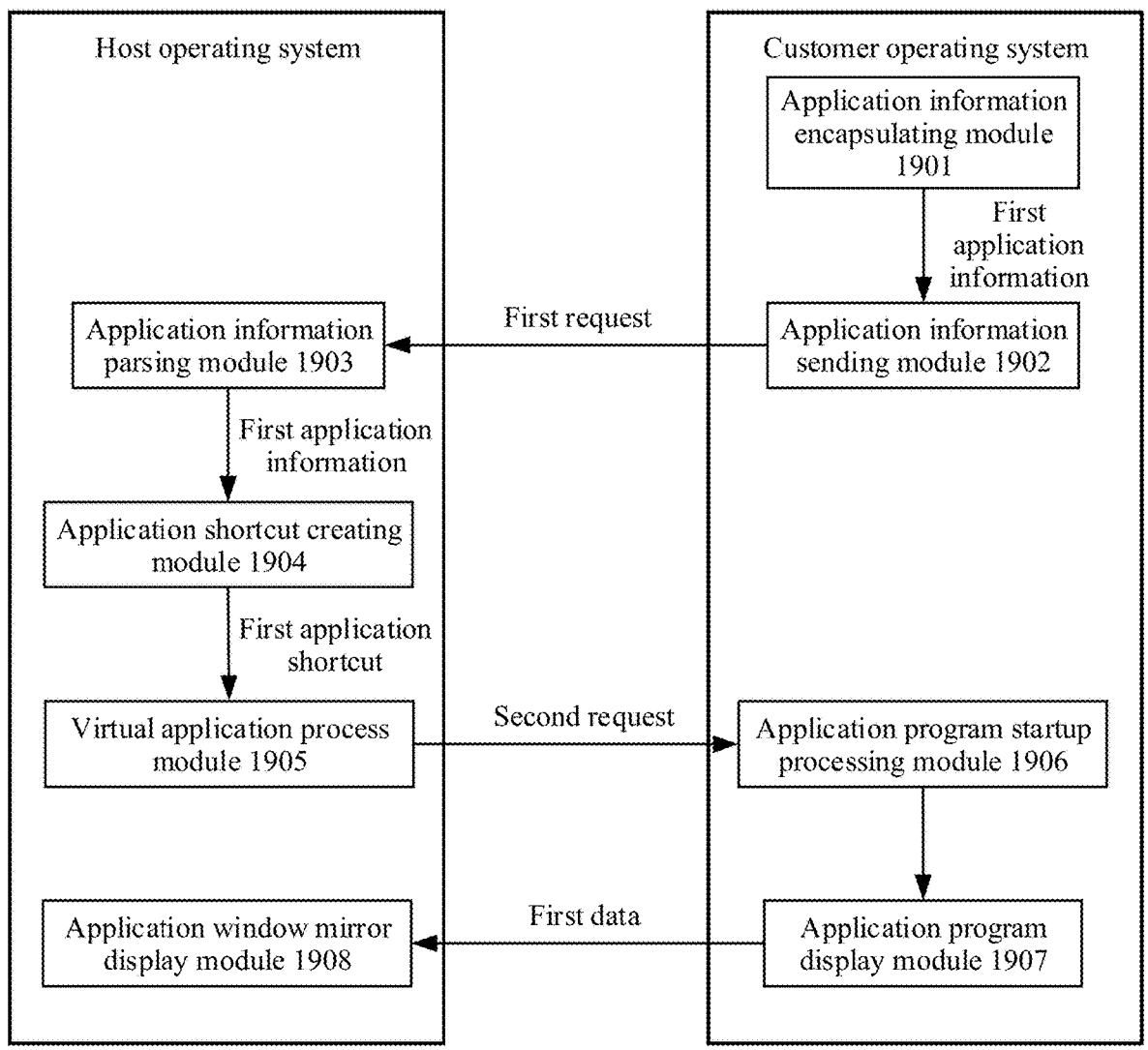
FIG. 19 is a block diagram of functional modules of a system for creating an application shortcut according to an embodiment of the present disclosure.

FIG. 19 is a block diagram of functional modules of a system for creating an application shortcut according to an embodiment of the present disclosure. The functional modules of the system may be implemented by hardware, software, or a combination of hardware and software. A person skilled in the art should understand that the functional modules described in FIG. 19 may be combined or separated into several sub-blocks to implement the solutions of the present disclosure. Therefore, the above described content in the present disclosure may support any possible combination or separation or further definition of the following functional modules.

The system may specifically include: an application information encapsulating module 1901, an application information sending module 1902, an application information parsing module 1903, an application shortcut creating module 1904, a virtual application process module 1905, an application program startup processing module 1906, an application program display module 1907, and an application window mirror display module 1908.

The application information encapsulating module 1901 is used by a guest operating system to obtain first application information of a first application program. Specifically, a user selects the first application program in a host operating system or the guest operating system, and it is detected that a corresponding first application shortcut needs to be created in the host operating system for the first application program. Herein, a manner, a quantity, and the like in selection are not limited in this application. Specifically, there may be a plurality of cases in specific implementation. In some embodiments, a hot area may be established in the guest operating system. In this embodiment, a form of the hot area is not limited. After the user drags an application icon of the first application program to the hot area, the guest operating system detects that the first application program is selected, and an application shortcut needs to be created in the host operating system. The guest operating system then performs a next operation. For specific examples, refer to the embodiments in FIG. 6A and FIG. 6B, FIG. 7A and FIG. 7B, and FIG. 13. Details are not described herein again. In some other embodiments, software that assists in managing the guest operating system may be used to select an application program in the guest operating system for which an application shortcut needs to be created in the host operating system, and in the software that assists in managing the guest operating system, the user may autonomously select an application program for which an application shortcut needs to be created in the host operating system. For specific examples, refer to the embodiments in FIG. 8A and FIG. 8B and FIG. 14. Details are not described herein again.

After detecting that the first application program is selected, the guest operating system parses out the first application information of the first application program. In some embodiments, the guest operating system may be a mobile phone operating system such as Android® or iOS®. In this case, the first application information parsed out by the guest operating system may include one or more items of information such as an application package name, an application icon, and an application name. The application package name (Package Name) is a unique identifier of an application program in the operating system. Two application programs cannot use a same application package name. The application package name is mainly used by the operating system to identify the application program and is generally not displayed in a user interface. For example, an application package name of WeChat® is "com.tencent.mm". The user identifies the application program in the user interface by using the application name and the application icon. The application name is a name that is usually used by the user to refer to the application program. For example, an application name of WeChat® is "WeChat". The application icon is a personalized image displayed to represent the application program. In an electronic device, the application icon is a piece of data stored in a binary form. When information about the application icon is transmitted, the application icon may be converted to a base64 encoding format. The base64 encoding is a common encoding manner for byte transmission.

After parsing out the first application information of the first application program, the guest operating system encapsulates the first application information to generate a first encapsulation package. In an example, the guest operating system may encapsulate the first application information in a JSON format. The JSON format is a common data exchange format for computer communication. The first application information may include the application package name, the application icon, the application name, and the like that correspond to the first application program. An encapsulation format of the first encapsulation package is not limited to the JSON format. This is not limited herein in this application.

After generating the first encapsulation package, the application information encapsulating module sends the first encapsulation package to the application information sending module 1802.

The application information sending module 1902 is configured to receive the first application information sent from the application information encapsulating module, and is further configured to send a first request to the host operating system. The first request may include a request for creating the first application shortcut and the first encapsulation package, and the first encapsulation package includes the first application information of the first application program. Specifically, a connection may be established between the host operating system and the guest operating system, so that the host operating system and the guest operating system can communicate with each other. The connection essentially means that communication parties transmit data to each other by using an agreed mechanism. A manner of establishing the connection between the host operating system and the guest operating system is not limited in this application. In some embodiments, the host operating system and the guest operating system may communicate with each other by using a socket (socket) mechanism. The socket is a common communication manner between application processes, and is an abstraction layer between an application layer and a transport layer, which abstracts complex operations at a TCP/IP layer into several simple interfaces for the application layer to invoke, to facilitate communication between the application processes. The communication between the host operating system and the guest operating system is not limited to the socket mechanism, and may alternatively be implemented by using a pipe (pipe) mechanism. This is not limited in this application.

Referring to the foregoing embodiment, the host operating system and the guest operating system may both run on a first electronic device, that is, the host operating system virtualizes a virtual hardware environment (including a processor, a memory, and an I/O device) independent of actual hardware for the guest operating system, and the guest operating system runs in the host operating system in a form such as an emulator or a virtual machine. If the host operating system runs on a first electronic device, the guest operating system runs on a second electronic device, and the first electronic device and the second electronic device are not a same electronic device, data may be transmitted between the first electronic device and the second electronic device in a wired communication manner (for example, a data cable), a wireless communication manner (for example, Bluetooth or Wi-Fi), or another manner such as a specific communications protocol.

After the application information sending module 1902 receives the first application information sent from the application information encapsulating module 1901, the guest operating system sends the first request to the host operating system through the established channel, such as a socket or a pipe. The first request may include the request for creating the first application shortcut and the first application information of the first application program. In an example, the first application information may include information such as the application package name, the application icon, and the application name that correspond to the first application program.

The application information parsing module 1903 is configured to receive the first request sent from the guest operating system, and parse out the first application information of the first application program. Similarly, the first application information may include information such as the application package name, the application icon, the application name, and an application parameter that correspond to the first application program.

In another embodiment, the application information parsing module 1903 may directly obtain the first application information from the host operating system, for example, directly download an installation file of the first application program from the host operating system and obtain the first application information of the first application program. The first application information includes information necessary for creating the first application shortcut. Then, the first application shortcut is created based on the first application information. That is, in this application, the application information encapsulating module 1901 and the application information sending module 1902 in the guest operating system are optional modules, and in the host operating system, the application information parsing module 1903 may be directly used to parse out the first application information.

The application shortcut creating module 1904 is configured to create the first application shortcut of the first application program in the host operating system. The host operating system creates the first application shortcut based on the first application information obtained by the application information parsing module 1903. The first application information may include one or more items of information such as the application package name, the application icon, and the application name that correspond to the first application program.

The first application shortcut is an application shortcut corresponding to the first application program, the first application program is installed in the guest operating system, the first application shortcut is created and displayed in the host operating system, a format of the first application shortcut is an application shortcut format applicable to the host operating system, and the user may start the first application shortcut in an interaction manner in the host operating system. When the first application shortcut located in the host operating system is opened by clicking, the corresponding first application program in the guest operating system is started.

Specifically, in some embodiments, the host operating system is a Windows® operating system, and the guest operating system is an Android® operating system. A startup manner of an application shortcut in the Windows® operating system may be double-clicking an application icon on a desktop, and a startup manner of an application shortcut in the Android® operating system may be single-tapping an application icon. The first application shortcut corresponding to the first application program in the Android® operating system is generated in the Windows® operating system, and the user may double-click the first application shortcut in the Windows® operating system by using a mouse, to start the first application program in the Android® operating system.

The virtual application process module 1905 is used by the host operating system to start a corresponding virtual application process, and send a second request for starting the first application program to the guest operating system. A form and content of the second request are not limited in this application. The second request may include a command for starting the first application program and the first application package name of the first application program. For example, when an application program in an Android® emulator is run on a computer with a Windows® operating system, a target located in the Windows® operating system and used to start an application shortcut of the application program in the Android® emulator may include a path of the application program in the Android® emulator, a LaunchApp command, an application package name, or an application parameter. For another example, if an application shortcut pointing to an application program of a mobile phone exists on the computer, and the computer and the mobile phone are connected wirelessly, the computer may send information to the mobile phone in a package sending manner. The sent information may include a command for starting the application program and a corresponding application package name and application parameter.

Specifically, the user clicks to open the created first application shortcut, and the host operating system starts the corresponding virtual application process. Specifically, in some embodiments, the host operating system is a Windows® operating system, and the guest operating system is an Android® operating system. In one case, the host operating system and the guest operating system are located on a same electronic device. For example, an Android® emulator is installed in a Windows® operating system of a first electronic device, and an Android® operating system may be run in the Android® emulator. In this case, the virtual application process module 1905 is used by the Windows® operating system to start an Android® emulator application process, and send the application package name and the application parameter of the to-be-started first program to the application program startup module 1906. In another case, the host operating system and the guest operating system are respectively located on different electronic devices. For example, the Windows® operating system runs on a first electronic device, such as a computer, and the Android® operating system runs on a second electronic device, such as a mobile phone or a tablet computer. In this case, the virtual application process startup module 1905 is configured to start a virtual application process in the Windows® operating system, and send the application package name and the application parameter of the to-be-started first program to the application program startup module 1906 of the second electronic device. The virtual application process may enable the user to perform management, control, or the like on the guest operating system from the host operating system, and implement data exchange between the host operating system and the guest operating system.

The application program startup processing module 1906 is configured to start the first application program in response to the second request sent from the virtual application process module 1905 of the host operating system. After receiving the second request that is sent by the host operating system and that is used for starting the first application program, the guest operating system finds a first application program process based on the application package name that is transferred from the host operating system and that corresponds to the first application program, and starts a corresponding application interface of the first application program based on a related application parameter. If there is no application parameter, a home page of the application program may be started by default.

The application program display module 1907 is configured to: after the first application program is started, display, in the guest operating system, a user interface in which the first application program runs and a response to interaction between the user and the first application program.

Optionally, if the host operating system and the application operating system are not on a same electronic device, a mirror user interface may need to be displayed in a user interface of the host operating system for a user interface of the application operating system, and the user may control an application program of the application operating system by using the mirror user interface. In this case, additional data transmission and data exchange are generated between the host operating system and the guest operating system.

Therefore, the application window mirror display module 1908 is configured to display, in the host operating system, the user interface in which the first application program runs and the response to interaction between the user and the first application program. Specifically, the application program display module 1907 transmits data such as graphic rendering data of the first application program or an instruction to the application window mirror display module 1908 of the host operating system, and the application window mirror display module 1908 receives and processes the data and displays the data in the mirror user interface of the host operating system. In this case, the mirror user interface of the host operating system is completely consistent with an interface image of the application program in the guest operating system. In addition, if the user performs an interaction operation in the mirror interface of the host operating system, the guest operating system detects the user operation and transmits an instruction to the first program of the guest operating system, the first program responds and provides feedback, and a newly generated user interface is synchronously transmitted to and displayed in the mirror user interface of the host operating system.

The following describes an electronic device 1900 related to the embodiments. In some embodiments, the electronic device may be an electronic device on which an operating system is installed. The installed operating system may be but is not limited to a common Windows® operating system, macOS® operating system, Android® operating system, iOS® operating system, or the like. The electronic device may be a desktop computer, a notebook computer, a mobile phone, a tablet computer, another portable electronic device, or the like.

Figure 20:
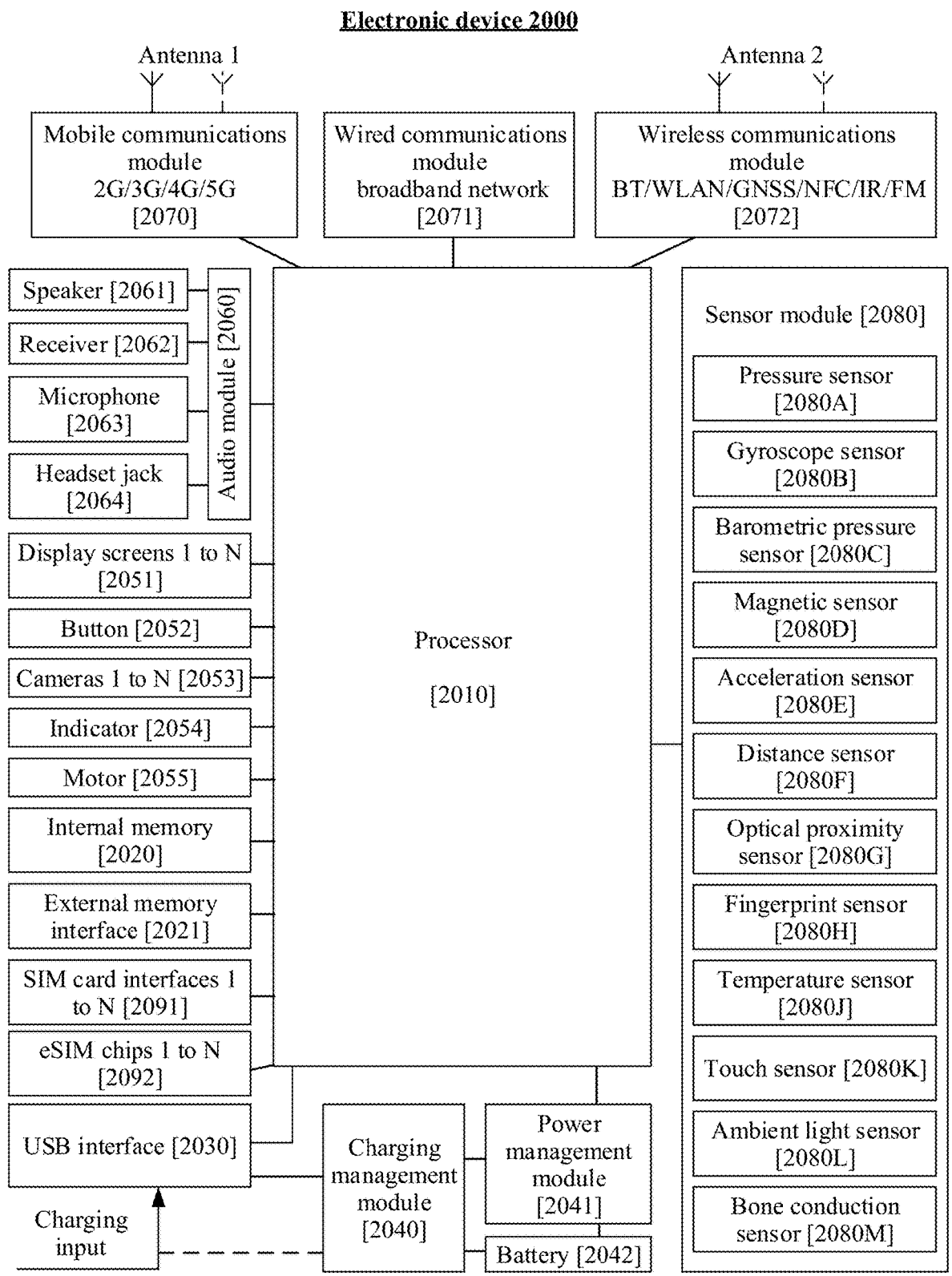
FIG. 20 is a schematic diagram of a hardware structure of an electronic device according to an embodiment of the present disclosure.

FIG. 20 is a schematic diagram of a hardware structure of an electronic device 2000. The electronic device 2000 may include a processor 2010, an internal memory 2020, an external memory interface 2021, a universal serial bus (universal serial bus, USB) interface 2030, a charging management module 2040, a power management module 2041, a battery 2042, a display screen 2051, a button 2052, a camera 2053, an indicator 2054, a motor 2055, an audio module 2060, a speaker 2061, a receiver 2062, a microphone 2063, a headset interface 2064, a mobile communications module 2070, a wired communications module 2071, a wireless communications module 2072, an antenna 1, an antenna 2, a sensor module 2080, a subscriber identification module (subscriber identification module, SIM) card interface 2091, an eSIM chip 2092, and the like. The sensor module 2080 may include a pressure sensor 2080A, a gyroscope sensor 2080B, a barometric pressure sensor 2080C, a magnetic sensor 2080D, an acceleration sensor 2080E, a distance sensor 2080F, an optical proximity sensor 2080G, a fingerprint sensor 2080H, a temperature sensor 2080J, a touch sensor 2080K, an ambient light sensor 2080L, a bone conduction sensor 2080M, and the like.

It may be understood that the structure shown in this embodiment of the present disclosure does not constitute a specific limitation on the electronic device 2000. In some other embodiments of this application, the electronic device 2000 may include more or fewer components than those shown in the figure, or some components may be combined, or some components may be split, or different component arrangements may be used. The components shown in the figure may be implemented by using hardware, software, or a combination of software and hardware. For example, in some embodiments, when the electronic device is a desktop computer or a notebook computer, the motor 2055, the mobile communications module 2070, the antenna 1, and the SIM card interface 2091, the eSIM chip 2092, and sensors with some functions in the sensor module 2080 may not exist in the foregoing hardware. In some embodiments, the electronic device is a mobile portable electronic device, such as a mobile phone or a tablet computer, and the foregoing hardware may include the motor 2055, the mobile communications module 2070, the antenna 1, and the SIM card interface 2091, the eSIM chip 2092, and sensors shown in the sensor module 2080. Therefore, a specific hardware structure of the electronic device 2000 may include more or fewer components than those shown in the figure, or combine some components, or split some components, or have different component arrangements based on specific situations.

The processor 2010 may include one or more processing units. For example, the processor 2010 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 2000. The controller may generate an operation control signal based on instruction operation code and a time sequence signal, to complete control of instruction reading and instruction execution.

A memory may be further disposed in the processor 2010, to store instructions and data. In some embodiments, the memory in the processor 2010 is a cache. The memory may store an instruction or data that has been used or cyclically used by the processor 2010. If the processor 2010 needs to use the instruction or the data again, the processor may directly invoke the instruction or the data from the memory. This avoids repeated access, reduces waiting time of the processor 2010, and improves system efficiency.

In some embodiments, the processor 2010 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, and includes a serial data line (serial data line, SDA) and a serial clock line (serial clock line, SCL). In some embodiments, the processor 2010 may include a plurality of groups of I2C buses. The processor 2010 may be separately coupled to the touch sensor 2080K, a charger, a flashlight, the camera 2053, and the like through different I2C bus interfaces. For example, the processor 2010 may be coupled to the touch sensor 2080K through the I2C interface, so that the processor 2010 communicates with the touch sensor 2080K through the I2C bus interface, to implement a touch function of the electronic device 2000.

The I2S interface may be configured to perform audio communication. In some embodiments, the processor 2010 may include a plurality of groups of I2S buses. The processor 2010 may be coupled to the audio module 2060 through the I2S bus, to implement communication between the processor 2010 and the audio module 2060. In some embodiments, the audio module 2060 may transmit an audio signal to the wireless communications module 2072 through the I2S interface, to implement a function of answering a call through a Bluetooth headset.

The PCM interface may also be used to perform audio communication, and sample, quantize, and code an analog signal. In some embodiments, the audio module 2060 may be coupled to the wireless communications module 2070 through a PCM bus interface. In some embodiments, the audio module 2060 may alternatively transmit an audio signal to the wireless communications module 2070 through the PCM interface, to implement a function of answering a call through a Bluetooth headset. Both the I2S interface and the PCM interface may be configured to perform the audio communication.

The UART interface is a universal serial data bus, and is used to perform asynchronous communication. The bus may be a two-way communications bus. The bus converts to-be-transmitted data between serial communication and parallel communication. In some embodiments, the UART interface is usually configured to connect the processor 2010 to the wired communications module 2072 and the wireless communications module 2072. For example, the processor 2010 communicates with a Bluetooth module in the wireless communications module 2072 through the UART interface, to implement a Bluetooth function. In some embodiments, the audio module 2060 may transmit an audio signal to the wireless communications module 2072 through the UART interface, to implement a function of playing music through the Bluetooth headset.

The MIPI interface may be configured to connect the processor 2010 to a peripheral component such as the display screen 2051 or the camera 2053. The MIPI interface includes a camera serial interface (camera serial interface, CSI), a display serial interface (display serial interface, DSI), and the like. In some embodiments, the processor 2010 communicates with the camera 2053 through the CSI, to implement a photographing function of the electronic device 2000. The processor 2010 communicates with the display screen 2051 through the DSI interface, to implement a display function of the electronic device 2000.

The GPIO interface may be configured by using software. The GPIO interface may be configured as a control signal, or may be configured as a data signal. In some embodiments, the GPIO interface may be configured to connect the processor 2010 to the camera 2053, the display screen 2051, the wired communications module 2071, the wireless communications module 2072, the audio module 2060, the sensor module 2080, and the like. The GPIO interface may be further configured as the I2C interface, the I2S interface, the UART interface, the MIPI interface, or the like.

The USB interface 2030 is an interface that conforms to a USB standard specification, and may be specifically a mini USB interface, a micro USB interface, a USB Type-C interface, or the like. The USB interface 2030 may be configured to connect to a charger to charge the electronic device 2000, or may be configured to transmit data between the electronic device 2000 and a peripheral device, or may be configured to connect to a headset, to play audio by using the headset. The interface may be further configured to connect to another electronic device such as an AR device.

It may be understood that an interface connection relationship between the modules that is shown in this embodiment of the present disclosure is merely an example for description, and does not constitute a limitation on a structure of the electronic device 2000. In some other embodiments of this application, the electronic device 2000 may alternatively use an interface connection manner different from that in the foregoing embodiment, or use a combination of a plurality of interface connection manners.

The internal memory 2020 may be configured to store computer-executable program code. The executable program code includes instructions. The processor 2010 runs the instructions stored in the internal memory 2020, to perform various function applications of the electronic device 2000 and data processing. The internal memory 2020 may include a program storage area and a data storage area. The program storage area may store an operating system, an application program required by at least one function (for example, a sound playing function or an image playing function), and the like. The data storage area may store data (for example, audio data and an address book) created in a process of using the electronic device 2000, and the like. In addition, the internal memory 2020 may include a high-speed random access memory, and may further include a nonvolatile memory, for example, at least one magnetic disk storage device, a flash memory device, or a universal flash storage (universal flash storage, UFS).

The external memory interface 2021 may be configured to connect to an external memory card, for example, a microSD card, to expand a storage capability of the electronic device 2000. The external memory card communicates with the processor 2010 through the external memory interface 2021, to implement a data storage function. For example, data such as music, a photo, and a video is stored in the external memory card.

The charging management module 2040 is configured to receive a charging input from a charger. The charger may be a wireless charger or a wired charger. In some embodiments of wired charging, the charging management module 2040 may receive a charging input of a wired charger through the USB interface 2030. In some embodiments of wireless charging, the charging management module 2040 may receive a wireless charging input through a wireless charging coil of the electronic device 2000. The charging management module 2040 supplies power to the electronic device through the power management module 2041 while charging the battery 2042.

The power management module 2041 is configured to connect the battery 2042, the charging management module 2040, and the processor 2010. The power management module 2041 receives input of the battery 2042 and/or the charging management module 2040, to supply power to the processor 2010, the internal memory 2020, an external memory 2021, the display screen 2051, the camera 2053, the wireless communications module 2072, and the like. The power management module 2041 may be configured to monitor parameters such as a battery capacity, a battery cycle count, and a battery state of health (electric leakage and impedance). In some other embodiments, the power management module 2041 may alternatively be disposed in the processor 2010. In some other embodiments, the power management module 2041 and the charging management module 2040 may alternatively be disposed in a same component.

The electronic device 2000 may implement a display function through the GPU, the display screen 2051, the application processor, and the like. The GPU is a microprocessor for image processing, and is connected to the display screen 2051 and the application processor. The GPU is configured to perform mathematical and geometric computation, and render an image. The processor 2010 may include one or more GPUs, which execute an instruction to generate or change display information.

The display screen 2051 is configured to display an image, a video, and the like. The display screen 2051 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, quantum dot light emitting diodes (quantum dot light emitting diodes, QLED), or the like. In some embodiments, the electronic device 2000 may include one or N display screens 2051, where N is a positive integer greater than 1.

The button 2052 includes a power button, a volume button, and the like. The button 2052 may be a mechanical button, or may be a touch button. The electronic device 2000 may receive a key input, and generate a key signal input related to a user setting and function control of the electronic device 2000.

The electronic device 2000 may implement an image shooting function through the camera 2053, the ISP, the video codec, the GPU, the display screen 2051, the application processor and the like.

The ISP may be configured to process the image data collected by the camera 2053. For example, during image shooting, when a shutter is opened, light is transferred to a photosensitive element of the camera through a lens, an optical signal is converted into an electrical signal, and the photosensitive element of the camera transfers the electrical signal to the ISP for processing, to convert the electrical signal into an image visible to a naked eye. The ISP may further optimize an algorithm for noise, brightness, and complexion of an image. The ISP may further optimize parameters such as exposure and a color temperature of a photographing scenario. In some embodiments, the ISP may be disposed in the camera 1393.

The camera 2053 may be configured to capture a static image or a video. An optical image of an object is generated through the lens, and projected to the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 2000 may include one or N camera modules 2053, where N is a positive integer greater than 1.

The digital signal processor is configured to process a digital signal. In addition to the digital image signal, the digital signal processor may further process another digital signal. For example, when the electronic device 2000 selects a frequency, the digital signal processor is configured to perform Fourier transformation on frequency energy.

The video codec is configured to compress or decompress a digital video. The electronic device 2000 may support one or more video codecs. In this way, the electronic device 2000 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, which quickly processes input information by referring to a biological neural network structure, for example, referring to a mode of transfer between human brain neurons, and may further continuously perform self-learning. Applications such as intelligent cognition of the electronic device 2000 may be implemented through the NPU, for example, image recognition, facial recognition, speech recognition, and text understanding.

The indicator 2054 may be an indicator light, and may be configured to indicate a charging status and a power change, or may be configured to indicate a message, a missed call, a notification, and the like.

The motor 2055 may generate a vibration prompt. The motor 2055 may be configured to provide an incoming call vibration prompt and a touch vibration feedback. For example, touch operations performed on different applications (for example, an image shooting application and an audio playing application) may correspond to different vibration feedback effects. The motor 2055 may also correspond to different vibration feedback effects for touch operations performed on different areas of the display screen 2051. Different application scenarios (for example, time reminding, information receiving, an alarm clock, and a game) may also correspond to different vibration feedback effects. A touch vibration feedback effect may be further customized.

A network communication function of the electronic device 2000 may be implemented by using the mobile communications module 2070, the wired communications module 2071, the wireless communications module 2072, the antenna 1, the antenna 2, the modem processor, the baseband processor, and the like.

The antenna 1 and the antenna 2 are configured to transmit and receive an electromagnetic wave signal. Each antenna in the electronic device 2000 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 2070 may provide a wireless communication solution that is applied to the electronic device 2000 and that includes 2G/3G/4G/5G and the like. The mobile communications module 2070 may include at least one filter, a switch, a power amplifier, a low noise amplifier (low noise amplifier, LNA), and the like. The mobile communications module 2070 may receive an electromagnetic wave through the antenna 1, perform processing such as filtering or amplification on the received electromagnetic wave, and transmit the electromagnetic wave to the modem processor for demodulation. The mobile communications module 2070 may further amplify a signal modulated by the modem processor, and convert the signal into an electromagnetic wave for radiation through the antenna 1. In some embodiments, at least some functional modules in the mobile communications module 2070 may be disposed in the processor 2010. In some embodiments, at least some functional modules in the mobile communications module 2070 may be disposed in a same component as at least some modules in the processor 2010.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 2061, the receiver 2062, and the like), or displays an image or a video on the display screen 2051. In some embodiments, the modem processor may be an independent component. In some other embodiments, the modem processor may be independent of the processor 2010, and is disposed in the same device as the mobile communications module 2070 or another functional module.

The wired communications module 2071 may provide a wired communication solution that is applied to the electronic device 2000 and that includes an Ethernet, a local area network, the Internet, and the like. The wired communications module 2071 may be one or more components integrating at least one communication processing module.

The wireless communications module 2072 may provide wireless communication solution that is applied to the electronic device 2000, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), infrared (infrared, IR) technology, and the like. The wireless communications module 1360 may be one or more components integrating at least one communication processing module. The wireless communications module 2072 receives an electromagnetic wave by the antenna 2, performs frequency modulation and filtering processing on an electromagnetic wave signal, and sends a processed signal to the processor 2010. The wireless communications module 2072 may further receive a to-be-sent signal from the processor 2010, perform frequency modulation and amplification on the signal, and convert a processed signal into an electromagnetic wave for radiation through the antenna 2.

In some embodiments, the antenna 1 and the mobile communications module 2070 in the electronic device 2000 are coupled, and the antenna 2 and the wireless communications module 2072 in the electronic device 2000 are coupled, so that the electronic device 2000 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS). The electronic device 2000 may implement an audio function by using the audio module 2060, the speaker 2061, the receiver 2062, the microphone 2063, the headset jack 2064, the application processor, and the like, for example, music playing or recording.

The audio module 2060 is configured to convert digital audio information into an analog audio signal for output, and convert an analog audio input into a digital audio signal. The audio module 2060 may be further configured to code and decode an audio signal. In some embodiments, the audio module 2060 may be disposed in the processor 2010, or some functional modules in the audio module 2060 are disposed in the processor 2010.

The speaker 2061, also referred to as a "loudspeaker", is configured to convert an audio electrical signal into a sound signal. The electronic device 2000 may listen to music or listen to a hands-free call by using the speaker 2061.

The receiver 2062, also referred to as a "phone receiver", is configured to convert an electrical audio signal into a sound signal. When the electronic device 2000 answers a call or receives a voice message, the receiver 2062 may be placed close to a human ear to listen to a voice.

The microphone 2063, also referred to as "mike" or "mic", is configured to convert a sound signal into an electrical signal. When making a call or sending voice information, a user may make a sound by moving a human mouth close to the microphone 2063, to input the sound signal to the microphone 2063. At least one microphone 2063 may be disposed in the electronic device 2000. In some other embodiments, two microphones 2063 may be disposed in the electronic device 2000, to collect a sound signal and implement a noise reduction function. In some other embodiments, three, four, or more microphones 2063 may alternatively be disposed in the electronic device 2000, to collect a sound signal, implement noise reduction, and identify a sound source, so as to implement a directional recording function and the like.

The headset jack 2064 is configured to connect to a wired headset. The headset jack 2064 may be the USB interface 2030 or a 3.5 mm open mobile terminal platform (open mobile terminal platform, OMTP) standard interface or a Cellular Telecommunications Industry Association of the USA (Cellular Telecommunications Industry Association of the USA, CTIA) standard interface.

The pressure sensor 2080A is configured to sense a pressure signal, and may convert the pressure signal into an electrical signal. In some embodiments, the pressure sensor 2080A may be disposed on the display screen 2051. There are many types of pressure sensors 2080A, for example, a resistive pressure sensor, an inductive pressure sensor, and a capacitive pressure sensor. The capacitive pressure sensor may include at least two parallel plates made of conductive materials. When a force is applied to the pressure sensor 2080A, capacitance between electrodes changes. The electronic device 2000 determines pressure intensity based on the change in the capacitance. When a touch operation is performed on the display screen 2051, the electronic device 2000 detects intensity of the touch operation through the pressure sensor 2080A. The electronic device 2000 may also calculate a touch location based on a detection signal of the pressure sensor 2080A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyroscope sensor 2080B may be configured to determine a moving posture of the electronic device 2000. In some embodiments, an angular velocity of the electronic device 2000 around three axes (namely, axes x, y, and z) may be determined through the gyro sensor 2080B. The gyroscope sensor 2080B may be configured for image stabilization during photographing. For example, when the shutter is pressed, the gyroscope sensor 2080B detects an angle at which the electronic device 2000 jitters, calculates, based on the angle, a distance for which a lens module needs to compensate, and allows the lens to cancel the jitter of the electronic device 2000 through reverse motion, to implement image stabilization. The gyroscope sensor 2080B may also be used in a navigation scenario and a somatic game scenario.

The barometric pressure sensor 2080C is configured to measure barometric pressure. In some embodiments, the electronic device 2000 calculates an altitude through the barometric pressure measured by the barometric pressure sensor 2080C, to assist in positioning and navigation.

The magnetic sensor 2080D includes a Hall effect sensor. The electronic device 2000 may detect, by using the magnetic sensor 2080D, whether a flip leather case is opened or closed.

In some embodiments, when the electronic device 2000 is a clamshell phone, the electronic device 2000 may detect opening and closing of a flip cover based on the magnetic sensor 2080D. Further, a feature such as automatic unlocking of the flip cover is set based on a detected opening or closing state of the leather case or a detected opening or closing state of the flip cover.

The acceleration sensor 2080E may detect magnitudes of accelerations in different directions (generally on three axes) of the electronic device 2000, and may detect a magnitude and a direction of gravity when the electronic device 2000 is stationary. The acceleration sensor 2080E may be further configured to identify a posture of the electronic device, and is used in an application such as switching between a landscape mode and a portrait mode or a pedometer.

The distance sensor 2080F is configured to measure a distance. The electronic device 2000 may measure the distance by using infrared or laser light. In some embodiments, in an image shooting scenario, the electronic device 2000 may measure a distance through the distance sensor 2080F to implement quick focusing.

The optical proximity sensor 2080G may include, for example, a light emitting diode (LED) and an optical detector, for example, a photodiode. The light emitting diode may be an infrared light emitting diode. The electronic device 2000 emits infrared light by using the light-emitting diode. The electronic device 2000 detects infrared reflected light from a nearby object through the photodiode. When sufficient reflected light is detected, it may be determined that there is an object near the electronic device 2000. When detected reflected light is insufficient, the electronic device 2000 may determine that there is no object near the electronic device 2000. The electronic device 2000 may detect, by using the optical proximity sensor 2080G, that the user holds the electronic device 2000 close to an ear to make/answer a call, to automatically turn off the screen for power saving. The optical proximity sensor 2080G may also be used in a smart cover mode or a pocket mode to automatically perform screen unlocking or locking.

The ambient light sensor 2080L is configured to sense ambient light brightness. The electronic device 2000 may adaptively adjust luminance of the display screen 2051 based on the sensed ambient light brightness. The ambient light sensor 2080L may also be configured to automatically adjust white balance during image shooting. The ambient light sensor 2080L may further cooperate with the optical proximity sensor 2080G to detect whether the electronic device 2000 is in a pocket, to prevent accidental touch.

The fingerprint sensor 2080H is configured to collect a fingerprint. The electronic device 2000 may use a feature of the collected fingerprint to implement fingerprint-based unlocking, application lock access, fingerprint-based image shooting, fingerprint-based call answering, and the like.

The temperature sensor 2080J is configured to detect a temperature. In some embodiments, the electronic device 2000 executes a temperature processing policy through the temperature detected by the temperature sensor 2080J. For example, when the temperature reported by the temperature sensor 2080J exceeds a threshold, the electronic device 2000 lowers performance of a processor nearby the temperature sensor 2080J, to reduce power consumption for thermal protection. In some other embodiments, when a temperature is lower than another threshold, the electronic device 2000 heats the battery 2042 to prevent the low temperature from causing the electronic device 2000 to shut down abnormally. In some other embodiments, when the temperature is lower than still another threshold, the electronic device 2000 boosts an output voltage of the battery 2042 to avoid abnormal shutdown caused by a low temperature.

The touch sensor 2080K is also referred to as a touch panel. The touch sensor 2080K may be disposed on the display screen 2051, and the touch sensor 2080K and the display screen 2051 constitute a touchscreen. The touch sensor 2080K is configured to detect a touch operation on or near the touch sensor. The touch sensor may transfer the detected touch operation to the application processor to determine a type of the touch event. A visual output related to the touch operation may be provided through the display screen 2051. In some other embodiments, the touch sensor 2080K may also be disposed on a surface of the electronic device 2000 at a location different from that of the display screen 2051.

The bone conduction sensor 2080M may obtain a vibration signal. In some embodiments, the bone conduction sensor 2080M may obtain a vibration signal of a vibration bone of a human vocal-cord part. The bone conduction sensor 2080M may also be in contact with a body pulse to receive a blood pressure beating signal. In some embodiments, the bone conduction sensor 2080M may also be disposed in the headset, to obtain a bone conduction headset. The audio module 2060 may obtain a speech signal through parsing based on the vibration signal that is of the vibration bone of the vocal-cord part and that is obtained by the bone conduction sensor 2080M, to implement a speech function. The application processor may parse heart rate information based on the blood pressure beating signal obtained by the bone conduction sensor 2080M, to implement a heart rate detection function.

The SIM card interface 2091 is configured to connect to a SIM card. The SIM card may be inserted into the SIM card interface 2091 or removed from the SIM card interface 2091 to implement contact with and separation from the electronic device 2000. The electronic device 2000 may support one or N SIM card interfaces, where N is a positive integer greater than 1. The SIM card interface 2091 may support a nano-SIM card, a micro-SIM card, a SIM card, and the like. A plurality of cards may be inserted into a same SIM card interface 2091 at the same time. The plurality of cards may be of a same type or different types. The SIM card interface 2091 may be compatible with different types of SIM cards. The SIM card interface 2091 may also be compatible with an external memory card. The electronic device 2000 interacts with a network through the SIM card, to implement functions such as conversation and data communication. In some embodiments, the electronic device 2000 uses the eSIM chip 2092, that is, an embedded SIM card. The eSIM chip 2092 may be embedded into the electronic device 2000, and cannot be separated from the electronic device 2000.

A software system of the electronic device 2000 may use a layered architecture, an event-driven architecture, a microkernel architecture, a micro service architecture, or a cloud architecture. In this embodiment of the present disclosure, an Android system with a layered architecture is used as an example to describe a software structure of the electronic device 2000.

Figure 21:
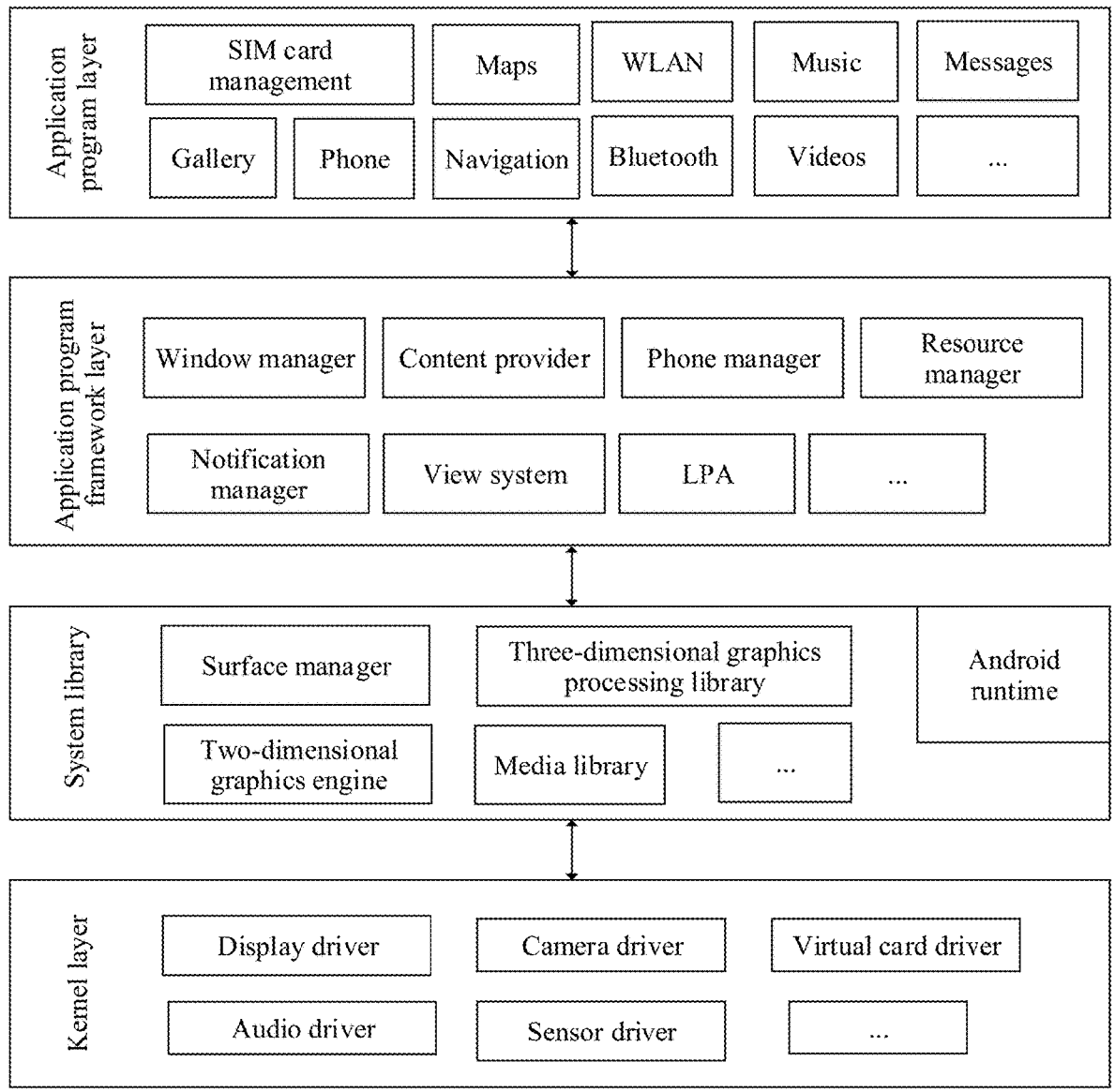
FIG. 21 is a block diagram of a software structure of an electronic device according to an embodiment of the present disclosure.

FIG. 21 is a block diagram of the software structure of the electronic device 2000 according to an embodiment of this application.

The layered architecture divides software into several layers, each with clear roles and responsibilities. The layers communicate with each other through a software interface. In some embodiments, the Android system is divided into four layers from top to bottom: an application program layer, an application program framework layer, an Android runtime (Android runtime) and system library, and a kernel layer.

The application layer may include a series of application program packages.

As shown in FIG. 21, the application program package may include application programs such as SIM card management, camera, gallery, calendar, call, map, navigation, WLAN, Bluetooth, music, video, and SMS.

The application program framework layer provides an application programming interface (application programming interface, API) and a programming framework for an application program at the application program layer. The application program framework layer includes some predefined functions.

As shown in FIG. 21, the application program framework layer may include a window manager, a content provider, a view system, a phone manager, a resource manager, a notification manager, and the like.

The window manager is configured to manage a window program. The window manager may obtain a size of the display screen, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application program. A display interface may include one or more views. For example, a display interface including a notification icon of Messages may include a text display view and a picture display view.

The phone manager is configured to provide a communication function of the electronic device 2000, for example, call status management (including call connection and call disconnection).

The resource manager provides, for an application program, various resources such as a localized character string, an icon, a picture, a layout file, and a video file.

The notification manager enables an application program to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scrollbar text, for example, a notification of an application program that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application program layer and the application program framework layer run on a virtual machine. The virtual machine executes Java files of the application program layer and the application program framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of common audio and video formats, static image files, and the like. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like. The 2D graphics engine is a drawing engine for 2D drawing.

The kernel layer is a layer between hardware and software. The kernel layer includes at least a display driver, a camera driver, an audio driver, and a sensor driver.

By implementing embodiments of the inventive method of this application, a corresponding application shortcut may be created in a user interface of a host operating system for an application program in a guest operating system, and a user may start the application program in the guest operating system by clicking the application shortcut on a desktop of the host operating system. Startup modes of application programs are coordinated and unified, and user operation interfaces are converged and unified, so that the user does not feel confused about experience of starting application icons. This application provides a friendly operation environment for the user, thereby improving use experience of the user.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

A person skilled in the art should understand that embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

It is clearly that, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method, the method comprising:
    establishing, by a first electronic device, a first connection to a second electronic device;
    displaying, by the first electronic device, a first user interface comprising a first display area, with the first display area comprising a same display content as display content on a display screen of the second electronic device;
    obtaining, by the first electronic device, first application information of a first application program from the second electronic device through the first connection, wherein the first application information comprises one or more of the following items: an application package name, an application icon, or an application name;
    detecting, by the first electronic device in the first user interface, a first operation of dragging an application icon corresponding to the first application program installed in the second electronic device to a first area and releasing;
    creating, by the first electronic device in response to the first operation, a first application shortcut that comprises the application icon corresponding to the first application program installed in the second electronic device;
    displaying, by the first electronic device, the first application shortcut in a third display area of the first user interface while continuing to display, in the first display area of the first user interface, the same display content or an updated display content on the display screen of the second electronic device, wherein the third display area is a display area different from the first display area and displayed in the first user interface independently from the first display area;

detecting, by the first electronic device, a first user operation that acts on the first application shortcut in the third display area of the first user interface;

sending, by the first electronic device in response to the first user operation, a first instruction to the second electronic device through the first connection, wherein the first instruction is used to trigger the second electronic device to start the first application program;

receiving, by the first electronic device through the first connection, first data sent from the second electronic device, wherein the first data indicate a user interface of the first application program; and displaying, by the first electronic device based on the first data, the user interface of the first application program in the first display area, wherein the user interface of the first application program is also displayed on the display screen of the second electronic device.

2. The method according to claim 1, wherein a first operating system runs on the first electronic device, a second operating system runs on the second electronic device, and the first user interface further comprises application icons of applications of the first operating system.

3. The method according to claim 2, wherein the application icons of applications of the first operating system are displayed in an area of the first user interface other than the first display area and the third display area.

4. The method according to claim 1, wherein the first area is an area of the first display area and is mapped from the second area on the display screen of the second electronic device.

5. The method according to claim 1, wherein a shape style and position of the first area are in correspondence with that of the second area.

6. The method according to claim 1, wherein the third display area is a sidebar which can be hidden at a side, an upper part or a corner of the first user interface, and when the sidebar is hidden at the side, the upper part or the corner of the first user interface, the method further comprises:

in response to moving a mouse pointer to an edge of the first user interface, calling out, by the first electronic device, the third display area.

7. The method according to claim 1, further comprising: after receiving a second operation applied on a second application icon of a second application program displayed in the third display area, displaying, by the first electronic device, the second application program's user interface.

8. The method according to claim 1, further comprising: displaying, by the first electronic device, a first list comprising indication information of one or more first application programs;

detecting, by the first electronic device in the first list, a fifth user operation of selecting indication information of the first application program; and sending, by the first electronic device, a request for obtaining the first application information to the second electronic device through the first connection in response to the fifth user operation, wherein the first application information is application information of the first application program indicated by indication information selected in response to the fifth user operation.

9. The method according to claim 1, wherein the first application information is obtained by the first electronic device when it is detected that the first electronic device establishes the first connection to the second electronic device for the first time.

10. The method according to claim 1, wherein the first application information is obtained by the first electronic device when the second electronic device detects that the first application is installed or updated.

11. The method according to claim 1, the method further comprising:

detecting, by the second electronic device, a fourth user operation of dragging an application icon of the first application program displayed on the display screen of the second electronic device to a second area on the display screen of the second electronic device; and sending, by the second electronic device, the first application information to the first electronic device through the first connection in response to the fourth user operation.

12. The method according to claim 1, wherein in the first display area of the first user interface, a mirror user interface of the second electronic device is displayed.

13. The method according to claim 12, wherein in the third display area of the first user interface, the first application shortcut that is the application icon corresponding to the first application program installed in the second electronic device and one or more application icons corresponding one or more application programs installed in the first electronic device.

14. An electronic device, wherein the electronic device comprises a processor and a memory, wherein executable instructions are stored in the memory, and the processor is configured to execute the executable instructions stored in the memory, causing the electronic device to execute the method of claim 1.

15. The electronic device according to claim 14, wherein in the first display area of the first user interface, a mirror user interface of the second electronic device is displayed; and in the third display area of the first user interface, the first application shortcut that is the application icon corresponding to the first application program installed in the second electronic device and one or more application icons corresponding one or more application programs installed in the first electronic device.

* * * * *